US011951906B2

(12) United States Patent
Price et al.

(10) Patent No.: US 11,951,906 B2
(45) Date of Patent: Apr. 9, 2024

(54) SYSTEMS AND METHODS FOR DEPLOYING EMERGENCY ROADSIDE SIGNALING DEVICES

(71) Applicant: TuSimple, Inc., San Diego, CA (US)

(72) Inventors: Charles A Price, San Diego, CA (US);
Todd B. Skinner, San Diego, CA (US);
Juexiao Ning, Tucson, AZ (US); Yishi Liu, Tucson, AZ (US); Qiwei Li, Tucson, AZ (US); Raymond Alan Thomas, Tucson, AZ (US); Alan Camyre, Tucson, AZ (US); Jim Giglio, Tucson, AZ (US); Robert Patrick Brown, Tucson, AZ (US)

(73) Assignee: TuSimple, Inc., San Diego, CA (US)

( * ) Notice: Subject to any disclaimer, the term of this patent is extended or adjusted under 35 U.S.C. 154(b) by 149 days.

(21) Appl. No.: 17/304,538

(22) Filed: Jun. 22, 2021

(65) Prior Publication Data

US 2021/0394674 A1    Dec. 23, 2021

Related U.S. Application Data

(60) Provisional application No. 63/042,979, filed on Jun. 23, 2020.

(51) Int. Cl.
*B60Q 7/00* (2006.01)
*B60W 60/00* (2020.01)
(Continued)

(52) U.S. Cl.
CPC ............ *B60Q 7/00* (2013.01); *B60W 60/0015* (2020.02); *E01F 9/619* (2016.02); *E01F 9/629* (2016.02);
(Continued)

(58) Field of Classification Search
None
See application file for complete search history.

(56) References Cited

U.S. PATENT DOCUMENTS

| 5,412,370 A | 5/1995 | Berman et al. |
| 9,437,109 B1 | 9/2016 | Stafford et al. |
| (Continued) | | |

FOREIGN PATENT DOCUMENTS

| AU | 2017100463 B4 | 3/2018 |
| CA | 3004651 | 7/2018 |
| (Continued) | | |

OTHER PUBLICATIONS

Extended European Search Report issued in corresponding European patent application No. 21181045.2, dated Feb. 22, 2022.
(Continued)

*Primary Examiner* — Omeed Alizada
(74) *Attorney, Agent, or Firm* — Knobbe, Martens, Olson & Bear, LLP

(57) ABSTRACT

Systems and methods for deploying emergency roadside signaling devices are disclosed. In one aspect, system for an autonomous vehicle includes one or more signaling devices configured to visually notify other vehicles when placed on or near a roadway, and an object placing device configured to place the one or more signaling devices. The system further includes a processor and a computer-readable memory in communication with the processor and having stored thereon computer-executable instructions to cause the processor to: determine that the autonomous vehicle has experienced a malfunction, and provide instructions to the object placing device to place the one or more signaling devices on or near the roadway.

19 Claims, 53 Drawing Sheets

(51) Int. Cl.
  *E01F 9/619* (2016.01)
  *E01F 9/627* (2016.01)
  *E01F 9/70* (2016.01)
  *G07C 5/08* (2006.01)
  *G09F 13/16* (2006.01)

(52) U.S. Cl.
  CPC .............. *E01F 9/70* (2016.02); *G07C 5/0816* (2013.01); *G09F 13/16* (2013.01); *B60W 2556/50* (2020.02)

(56) References Cited

U.S. PATENT DOCUMENTS

| | | |
|---|---|---|
| 9,451,020 B2 | 9/2016 | Liu et al. |
| 10,625,662 B1 | 4/2020 | Wechsler |
| 10,773,643 B1 * | 9/2020 | Patnaik ............. B60W 50/0205 |
| 11,276,337 B1 | 3/2022 | Yavruyan |
| 11,291,014 B1 | 3/2022 | Croswell et al. |
| 11,366,476 B2 * | 6/2022 | Vawter ................... B60Q 1/525 |
| 2011/0089876 A1 | 4/2011 | Patel et al. |
| 2012/0118192 A1 | 5/2012 | Nopper |
| 2013/0233964 A1 | 9/2013 | Woodworth et al. |
| 2014/0058671 A1 | 2/2014 | Ichikawa et al. |
| 2017/0088035 A1 | 3/2017 | Williams et al. |
| 2017/0160738 A1 | 6/2017 | Ganz et al. |
| 2018/0015937 A1 | 1/2018 | Woo et al. |
| 2018/0024549 A1 | 1/2018 | Hurd |
| 2018/0061235 A1 | 3/2018 | Goldberg et al. |
| 2018/0186283 A1 * | 7/2018 | Fischer .................. G07C 5/008 |
| 2018/0190042 A1 | 7/2018 | Gordon et al. |
| 2018/0197410 A1 | 7/2018 | Stafford et al. |
| 2018/0199398 A1 | 7/2018 | Dao et al. |
| 2018/0363256 A1 | 12/2018 | Acosta Rodriguez et al. |
| 2019/0048639 A1 | 2/2019 | Lickfelt et al. |
| 2019/0049954 A1 | 2/2019 | Mitchell et al. |
| 2019/0071013 A1 | 3/2019 | Adam et al. |
| 2019/0176862 A1 | 6/2019 | Kumar et al. |
| 2019/0220026 A1 | 7/2019 | Vawter et al. |
| 2020/0114816 A1 | 4/2020 | Morimura |
| 2020/0125089 A1 | 4/2020 | Matsumoto et al. |
| 2020/0149316 A1 | 5/2020 | Parker et al. |
| 2020/0180720 A1 | 6/2020 | Davila |
| 2020/0283038 A1 | 9/2020 | Woo et al. |
| 2020/0307454 A1 | 10/2020 | Winberg et al. |
| 2020/0337018 A1 | 10/2020 | Feng et al. |
| 2021/0155343 A1 | 5/2021 | Ogden et al. |
| 2021/0373575 A1 | 12/2021 | Manjunath et al. |
| 2021/0394674 A1 | 12/2021 | Price et al. |
| 2022/0126769 A1 | 4/2022 | Tucker et al. |
| 2022/0135079 A1 | 5/2022 | Ito et al. |
| 2022/0144166 A1 | 5/2022 | Hamm |
| 2022/0171389 A1 | 6/2022 | Strobel |
| 2022/0317690 A1 | 10/2022 | Vawter et al. |
| 2022/0348223 A1 | 11/2022 | Zhao et al. |
| 2023/0124231 A1 | 4/2023 | Lim |
| 2023/0139933 A1 | 5/2023 | Tam |

FOREIGN PATENT DOCUMENTS

| | | |
|---|---|---|
| DE | 102016015008 A1 | 6/2017 |
| DE | 102018206257 | 10/2019 |
| JP | 2016-16708 | 2/2016 |
| KR | 10-1249926 | 11/2015 |
| WO | WO 2019/125429 | 6/2019 |

OTHER PUBLICATIONS

Partial European Search Report issued in application No. 21181045.2, dated Nov. 19, 2021.
Velvac, Emergency Triangle Kit (Year: 2013).
Michael Grossman, A look at Commercial Truck Emergency Signal Regulations (Year: 2017).
"Are You Placing Your Warning Triangles Properly?" CDL Life [online] CUB Ventures, May 16, 2017 [retrieved on Apr. 7, 2023] Retrieved from the internet: https://cdllife.com/2017/placing-warning-triangles-property/.
"Robot in action: warning triangle 4.0" [online] Mercedes-Benz Group AG, May 20, 2019 [retrieved on Apr. 7, 2023] Retrieved from the internet: https://media.daimler.com/marsMediaSite/en/instance/ko/Robot-in-action-warning-triangle-40.xhtml?old=43381826.
Communication Pursuant to Article 94(3) EPC in Application No. 21181045.2, dated Mar. 31, 2023.

* cited by examiner

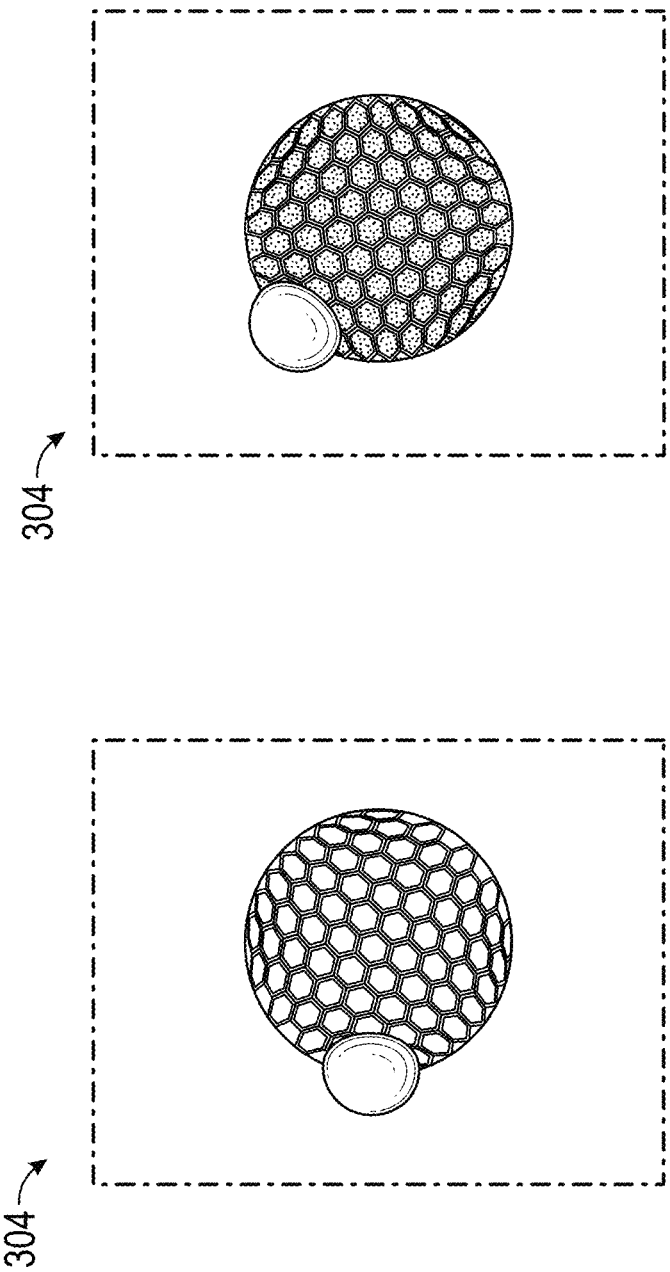

SYSTEMS AND METHODS FOR DEPLOYING EMERGENCY ROADSIDE SIGNALING DEVICES

CROSS-REFERENCE TO RELATED APPLICATION(S)

This application claims the benefit of U.S. Provisional Application No. 63/042,979, filed Jun. 23, 2020, which is hereby incorporated by reference in its entirety.

BACKGROUND

Technological Field

The described technology generally relates to systems and methods for autonomous driving, and more particularly, to deploying emergency roadside signaling devices.

Description of the Related Technology

Control systems for autonomous vehicles can control the driving of autonomous vehicles on public roadways with little to no intervention from a human occupant. As these control systems improve, it may be possible to drive an autonomous vehicle without any human occupants. If such a fully-autonomous vehicle experiences a mechanical failure, the control system must be able to safely park the autonomous vehicle until the mechanical failure can be addressed.

SUMMARY OF CERTAIN INVENTIVE ASPECTS

One inventive aspect is a system for an autonomous vehicle, comprising: one or more signaling devices configured to visually notify other vehicles when placed on or near a roadway; an object placing device configured to place the one or more signaling devices; a processor; and a computer-readable memory in communication with the processor and having stored thereon computer-executable instructions to cause the processor to: determine that the autonomous vehicle has experienced a malfunction, and provide instructions to the object placing device to place the one or more signaling devices on or near the roadway.

In some embodiments, the object placing device comprises one or more signaling device transportation vehicles configured to transport the one or more signaling devices, wherein the object placing device further comprises a housing configured to house the one or more signaling device transportation vehicles.

In some embodiments, the memory further has stored thereon computer-executable instructions to cause the processor to: determine one or more locations to place the one or more signaling devices, wherein the instructions provided to the object placing device comprise the determined one or more locations.

In some embodiments, the system further comprises: a first Global Positioning System (GPS) transceiver configured to determine a current location of the autonomous vehicle, wherein the determining of the one or more locations is further based on the current location of the autonomous vehicle.

In some embodiments, the memory further has stored thereon a map of the roadway and computer-executable instructions to cause the processor to: select the one or more locations within the map based at least in part on the current location of the autonomous vehicle and regulations for the placement of the one or more signaling devices.

In some embodiments, the one or more signaling device transportation vehicles comprises a second GPS transceiver, the one or more signaling device transportation vehicles configured to place the one or more signaling devices based on information received from the second GPS transceiver.

In some embodiments: the one or more signaling device transportation vehicles comprise a plurality of signaling device transportation vehicles, the one or more signaling devices comprise a plurality of signaling devices, and each of the signaling devices is mounted on an outer surface of one of the plurality of signaling device transportation vehicles.

In some embodiments, the housing comprises a dock located on the exterior of the autonomous vehicle, wherein each of the one or more signaling device transportation vehicles comprises a battery and is configured to be electrically connected to the dock to charge the battery.

In some embodiments, the memory further has stored thereon computer-executable instructions to cause the processor to: determine a first location at which the autonomous vehicle will stop, and determine one or more second locations at which to place the one or more signaling devices based on the first location.

In some embodiments, the memory further has stored thereon computer-executable instructions to cause the processor to: determine a timing at which to drop the one or more signaling devices to land at the one or more second locations based on one or more of the following: a current speed of the autonomous vehicle, a rate of deceleration of the autonomous vehicle, a distance between a current location of the autonomous vehicle and the first location, and a distance between the object placing device and the roadway.

Another inventive is a non-transitory computer readable storage medium having stored thereon instructions that, when executed, cause at least one computing device to: determine that an autonomous vehicle has experienced a malfunction, the autonomous vehicle comprising an emergency signaling system comprising: one or more signaling devices configured to visually notify other vehicles when placed on or near a roadway, and an object placing device configured to place the one or more signaling devices; and provide instructions to the object placing device to place the one or more signaling devices on or near the roadway.

In some embodiments, the non-transitory computer readable storage medium further has stored thereon instructions that, when executed, cause at least one computing device to: determine one or more locations to place the one or more signaling devices, wherein the instructions provided to the object placing device comprise the determined one or more locations, wherein the one or more locations to place the one or more signaling devices comprise: a first location on the traffic side of and approximately 10 feet from the autonomous vehicle in a direction of approaching traffic, a second location at approximately 100 feet from the autonomous vehicle in a center of the traffic lane or a shoulder occupied by the autonomous vehicle and in the direction of approaching traffic, and a third location approximately 200 feet from the autonomous vehicle in a center of the traffic lane or a shoulder occupied by the autonomous vehicle and in the direction of approaching traffic.

In some embodiments, the object placing device comprises one or more signaling device transportation vehicles configured to transport the one or more signaling devices, wherein each of the one or more signaling devices is mounted in an unobstructed location on the corresponding signaling device transportation vehicle and above other components of the corresponding signaling device transportation vehicle.

In some embodiments, the object placing device is a signaling device housing further configured to house the one or more signaling devices.

In some embodiments, the signaling device housing comprises a door configured to be opened to allow the one or more signaling devices to be placed onto the roadway, or a shutter configured to drop the one or more signaling devices onto the roadway.

Yet another aspect is a method comprising: determining that an autonomous vehicle has experienced a malfunction, the autonomous vehicle comprising an emergency signaling system comprising: one or more signaling devices configured to visually notify other vehicles when placed on or near the roadway; and an object placing device configured to place the one or more signaling devices; and providing instructions to the object placing device to place the one or more signaling devices on or near the roadway.

In some embodiments, the object placing device comprises one or more signaling device transportation vehicles configured to transport the one or more signaling devices, wherein the method further comprises: receiving a signal from a sensor indicative of a current location of the one or more signaling device transportation vehicles, wherein the sensor comprises at least one of the following: camera, radar, and lidar; and wirelessly providing the current location to the one or more signaling device transportation vehicles.

In some embodiments, each of the one or more signaling devices comprises a weighted bottom configured to orient the one or more signaling devices in a correct orientation after being dropped from the autonomous vehicle.

In some embodiments, each of the one or more signaling devices comprises a spring loaded tube and a delay mechanism configured to release the spring after the one or more signaling devices has been dropped onto the roadway.

In some embodiments, each of the one or more signaling devices is configured to have a first size prior to being placed on or near the roadway and have a second size after being placed on or near the roadway, the second size being larger than the first size to increase visibility of the one or more signaling devices after being placed.

Still yet another aspect is a control system for an object placing device of an autonomous vehicle, the system comprising: a processor; and a computer-readable memory in communication with the processor and having stored thereon computer-executable instructions to cause the processor to: receive a signal comprising instructions to activate the object placing device; and provide instructions to the object placing device to place a plurality of signaling devices in accordance with predetermined criteria.

In some embodiments, the predetermined criteria comprise at least one of: a first set of criteria for the placement of the plurality of signaling devices when the autonomous vehicle is located on a two-way or undivided highway, a second set of criteria for the placement of the plurality of signaling devices when the autonomous vehicle is located on a hill, on a curve, or withing a predetermined distance of a visual obstruction, or a third set of criteria for the placement of the plurality of signaling devices when the autonomous vehicle is located on a divided or one-way roadway.

In some embodiments, the predetermined criteria comprises at least the first set of criteria, and wherein the first set of criteria comprise: a first location for a first one of the plurality of signaling devices to be placed on a traffic side of a stopped location at which the autonomous vehicle is stopped and about 10 feet from the stopped location in a direction of approaching traffic, a second location for a second one of the plurality of signaling devices to be placed at about 100 feet from the stopped location in a center of the traffic lane or shoulder of the stopped location and in the direction of approaching traffic, and a third location for a third one of the plurality of signaling devices to be placed at about 100 feet from the stopped location in the center of a traffic lane or the shoulder of the stopped location and in a direction away from approaching traffic.

In some embodiments, the first set of criteria further comprise criteria for placement of all of the first, second, and third signaling devices at the first, second, and third locations, respectively, within 10 minutes.

In some embodiments: each of the plurality of signaling devices comprises a reflective side having a reflective material, and the first set of criteria further comprise criteria for placing the first, second, and third signaling devices such that the reflective side of the first, second, and third signaling devices faces the direction of approaching traffic.

In some embodiments, the object placing device comprises one or more signaling device ground transportation vehicles configured to transport the first, second, and third signaling devices to the first, second, and third locations, respectively.

In some embodiments, the object placing device comprises one or more battery powered air vehicles configured to transport the first, second, and third signaling devices to the first, second, and third locations, respectively.

In some embodiments, the predetermined criteria comprises at least the second set of criteria, and wherein the second set of criteria comprises: a first location for a first one of the signaling devices to be placed on a traffic side of a stopped location at which the autonomous vehicle is stopped and about 10 feet from the stopped location in a direction of approaching traffic, and a second location for a second one of the signaling devices to be placed at about 100 feet to about 500 feet from the stopped location in the direction of approaching traffic.

In some embodiments, the memory further has stored thereon computer-executable instructions to cause the processor to: predict the stopped location at which the autonomous vehicle will stop prior to reaching the stopped location, and provide the instructions to the object placing device to place the first one of the plurality of signaling devices and the second one of the plurality of signaling devices before the autonomous vehicle stops at the stopped location.

In some embodiments, the memory further has stored thereon computer-executable instructions to cause the processor to: determine a timing at which to drop the first one of the plurality of signaling devices and the second one of the plurality of signaling devices to land at the first and second locations, respectively.

In some embodiments, the predetermined criteria comprises at least the third set of criteria, and wherein the third set of criteria comprises: a first location for a first one of the plurality of signaling devices to be placed on a traffic side of a stopped location at which the autonomous vehicle is stopped and about 10 feet from the stopped location in a direction of approaching traffic, a second location for a second one of the plurality of signaling devices to be placed at about 100 feet from the stopped location in a center of the traffic lane or shoulder of the stopped location and in the direction of approaching traffic, and a third location for a third one of the plurality of signaling devices to be placed at about 200 feet from the stopped location in a center of the traffic lane or shoulder of the stopped location and in the direction of approaching traffic.

In some embodiments, the predetermined criteria further comprise a fourth set of criteria for the placement of the plurality of signaling devices when the autonomous vehicle is: i) located in a business district or residential area, ii) at a time when lighted lamps are required, and iii) when street or highway lighting is insufficient to make the autonomous vehicle clearly discernable at a distance of 500 feet from the autonomous vehicle.

Another aspect is a non-transitory computer readable storage medium having stored thereon instructions that, when executed, cause at least one computing device to: receive a signal comprising instructions to activate the object placing device; and provide instructions to the object placing device to place a plurality of signaling devices in accordance with predetermined criteria.

In some embodiments, the non-transitory computer readable storage medium further causes at least one computing device to: determine a plurality of locations to place the plurality of signaling devices in accordance with the predetermined criteria, wherein the instructions provided to the object placing device comprise the determined locations.

In some embodiments, the plurality of signaling devices comprise three bidirectional emergency reflective triangles that conform to the requirements of Federal Motor Vehicle Safety Standard.

In some embodiments, the plurality of signaling devices further comprise one or more additional signaling devices configured to not decrease the effectiveness of the three bidirectional emergency reflective triangles.

Yet another aspect is a method comprising: receiving a signal comprising instructions to activate the object placing device; providing instructions to the object placing device to place a plurality of signaling devices in accordance with predetermined criteria.

In some embodiments, the further comprises: determining a current location of the autonomous vehicle based on a signal received from a Global Positioning System (GPS) transceiver; determining a type of roadway associated with the current location of the autonomous vehicle; and selecting predetermined criteria for the placement of the plurality of signaling devices from a plurality of different predetermined criteria based on the determined type of roadway.

In some embodiments, the plurality of signaling devices comprise at least six fuses or at least three liquid-burning flares.

In some embodiments, the predetermined criteria define at least one of a size, a reflectivity, a color, a stability, a luminance, a configuration, and a storage of the plurality of signaling devices.

BRIEF DESCRIPTION OF THE DRAWINGS

FIGS. 24A-24F illustrate yet another embodiment of a signaling device and signaling device housing in accordance with aspects of this disclosure.

DETAILED DESCRIPTION OF CERTAIN INVENTIVE EMBODIMENTS

Introduction to In-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

An example embodiment disclosed herein can be used in the context of an in-vehicle control system 150 in a vehicle ecosystem 101. In one example embodiment, the in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
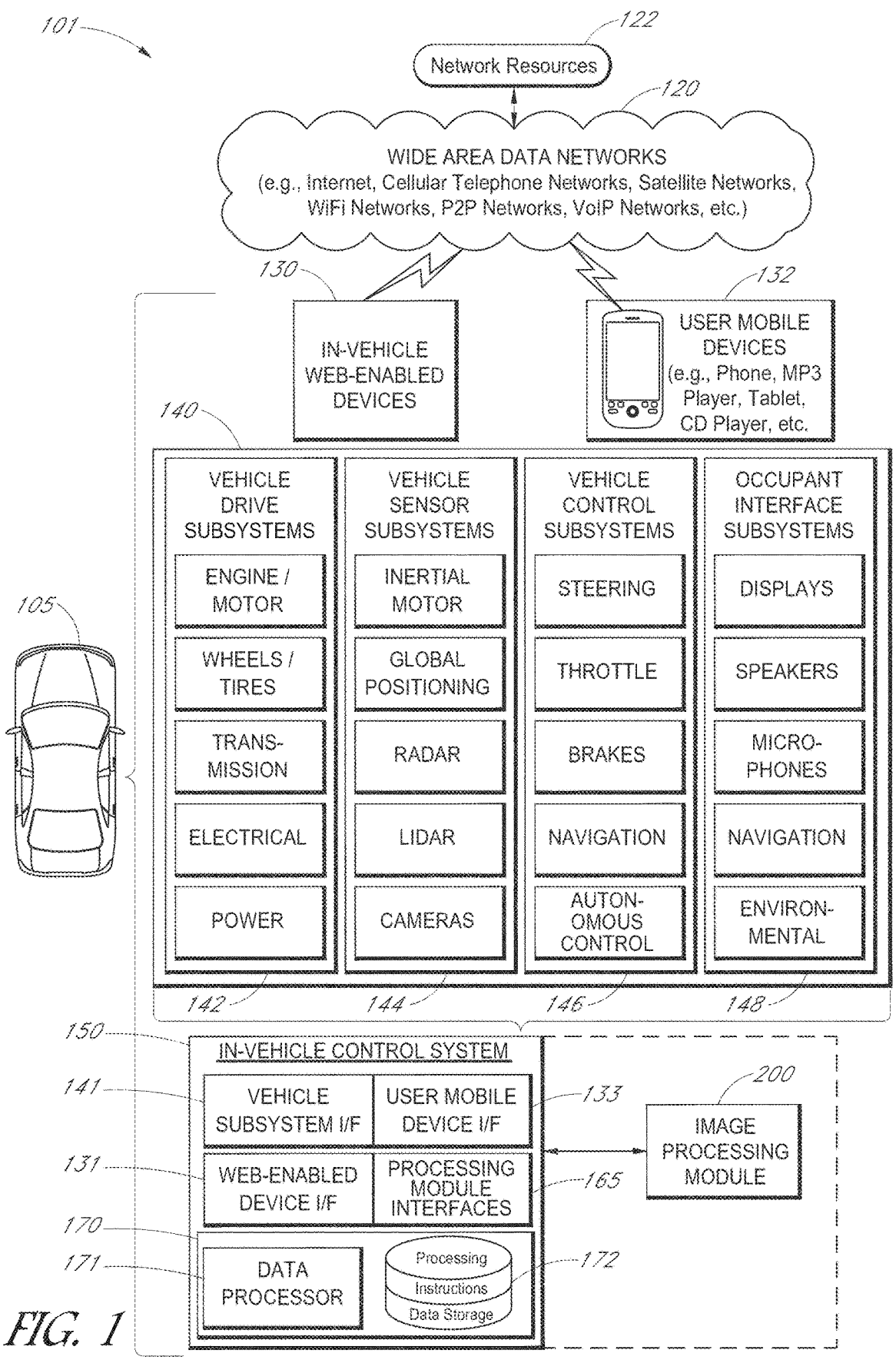
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles.

In an example embodiment as described herein, the in-vehicle control system 150 can be in data communication with a plurality of vehicle subsystems 140, all of which can reside in the vehicle 105. In certain embodiments, a vehicle subsystem interface 141 is provided to facilitate data communication between the in-vehicle control system 150 and the plurality of vehicle subsystems 140. In certain embodiments, the in-vehicle control system 150 can include a data processor 171 configured to execute the image processing module 200 for processing image data received from one or more of the vehicle subsystems 140. In certain embodiments, the data processor 171 can be combined with a data storage device 172 (e.g., a non-transitory computer-readable memory) as part of a computing system 170 in the in-vehicle control system 150. In certain embodiments, the data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by the data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

In certain embodiments, the in-vehicle control system 150 can be configured to receive or transmit data to/from a wide-area network 120 and network resources 122 connected thereto. In certain embodiments, an in-vehicle web-enabled device 130 and/or the mobile device 132 can be used to communicate via the network 120. In certain embodiments, a web-enabled device interface 131 can be used by the in-vehicle control system 150 to facilitate data communication between the in-vehicle control system 150 and the network 120 via the in-vehicle web-enabled device 130. Similarly, the mobile device interface 133 can be used by the in-vehicle control system 150 to facilitate data communication between the in-vehicle control system 150 and the network 120 via the mobile device 132. In this manner, the in-vehicle control system 150 can obtain real-time access to network resources 122 via the network 120. The network resources 122 can be used to obtain processing modules for execution by the data processor 171, data content to train internal neural networks, system parameters, and/or other data.

The ecosystem 101 can include the wide area network 120. In certain embodiments, the network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. In certain embodiments, one or more of these networks 120 can be used to connect a user or client system with network resources 122, such as websites, servers, central control sites, or the like. In certain embodiments, the network resources 122 can generate and/or distribute data, which can be received in the vehicle 105 via the in-vehicle web-enabled devices 130 or the mobile device 132. In certain embodiments, the network resources 122 can also host network cloud services, which can support the functionality used to compute or assist in processing image input or image input analysis. In certain embodiments, antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via the web-enabled device interface 131, which can be used to connect with the in-vehicle web-enabled devices 130 and the network 120. In this manner, the in-vehicle control system 150 and the image processing module 200 can support a variety of network-connectable in-vehicle devices and systems from within the vehicle 105.

As shown in FIG. 1, the in-vehicle control system 150 and the image processing module 200 can also receive data, image processing control parameters, and training content from the mobile device 132, which can be located inside or proximately to the vehicle 105. The mobile device 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile device 132 can also be in data communication with the network cloud 120. The mobile device 132 can source data and content from internal memory components of the mobile device 132 itself or from network resources 122 via network 120. Additionally, the mobile device 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile device 132 as shown in FIG. 1.

Referring still to FIG. 1, the example embodiment of the ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications. However, such network communications are not required.

Referring still to FIG. 1, the example embodiment of the ecosystem 101, and the vehicle operational subsystems 140 therein, can include a variety of vehicle subsystems in support of the operation of the vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and/or control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

In certain embodiments, the vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. In certain embodiments, the optical sensor may be embodied as a LiDAR detector or a camera (e.g., a conventional visible wavelength camera). In certain embodiments, the vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. In certain embodiments, the GPS transceiver may be any sensor configured to estimate a geographic location of the vehicle 105. For this purpose, the GPS transceiver may include a receiver/transmitter operable to provide information regarding the position of the vehicle 105 with respect to the Earth. In certain embodiments, the RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. In certain embodiments, the laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. In certain embodiments, the laser range finder/LIDAR unit can be configured to operate in a coherent (e.g., using heterodyne detection) or an incoherent detection mode. In certain embodiments, the cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. In certain embodiments, the throttle may be configured to control, for instance, the operating speed of the engine and, in turn, control the speed of the vehicle 105. In certain embodiments, the brake unit can include any combination of mechanisms configured to decelerate the vehicle 105. In certain embodiments, the brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. At least a portion of these maps can be also stored in a memory of a control system 308 of an emergency roadside signaling system 300, described below in connection with FIGS. 2-5.

In certain embodiments, the autonomous control unit of the vehicle control subsystems 146 may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

In certain embodiments, an occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. In certain embodiments, the visual display devices can also be operable to accept input from the user via a touchscreen. The touchscreen may be configured to sense at least one of a position and a movement of a user's finger via capacitive sensing, resistance sensing, or a surface acoustic wave process, among other possibilities. In certain embodiments, the touchscreen may be capable of sensing finger movement in a direction parallel or planar to the touchscreen surface, in a direction normal to the touchscreen surface, or both, and may also be capable of sensing a level of pressure applied to the touchscreen surface. In certain embodiments, the touchscreen may be formed of one or more translucent or transparent insulating layers and one or more translucent or transparent conducting layers. The touchscreen may take other forms as well.

In certain embodiments, the occupant interface subsystems 148 may provide capabilities for the vehicle 105 to communicate with devices within its environment. In certain embodiments, the microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, 4G cellular communication, such as WiMAX or LTE, or 5G cellular communication. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of the vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of the vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile device 132 and/or the network resources 122 via network 120. The in-vehicle control system 150 can periodically query the mobile device 132 or a network resource 122 for updates or updates can be pushed to the in-vehicle control system 150.

Introduction to Systems and Methods for Deploying Emergency Roadside Signaling Devices In the various example embodiments disclosed herein, systems and methods are provided for deploying emergency roadside signaling devices. Due to continuing improvements in autonomous vehicles 105, and in particular the in-vehicle control system 150, autonomous vehicles 105 will soon be operable in the so-called fully autonomous (e.g., level 5) mode, without the need for a human operator or human supervision. For such fully-autonomous vehicles 105 (also referred to hereinafter simply as autonomous vehicles), it may be possible for the autonomous vehicles 105 to drive between an initial location and a destination without any human occupants. This may be particularly advantageous for certain applications, such as for long haul freight trucking, which would allow goods to be shipped between locations fully-autonomously.

However, certain tasks related to driving on public roads are traditionally performed by a human operator, even for autonomous vehicles 105. For example, if the autonomous vehicle experiences a mechanical failure that requires the autonomous vehicle 105 to pull off to the side of the roadway, the operator may manually place emergency roadside signaling devices on the road to warn other drivers that the autonomous vehicle 105 is parked on the side of the road. Depending on where the autonomous vehicle 105 is operating, there may be regulations (e.g., Department of Transportation (DOT) regulations) that require the placement of signaling devices in the event a vehicle (including autonomous vehicles 105) is parked on or near the roadway. However, without the presence of an operator, there is still a need for emergency signals to be placed during an unplanned stop.

Thus, in order to comply with the appropriate regulations and to improve the safety of other roadway 310 users (e.g., other manual and/or autonomous vehicles on the road), it is important that autonomous vehicles 105 are able to deploy emergency roadside signaling devices in the event that the autonomous vehicle 105 needs to be stopped on or near the roadway 310. For example, an unplanned stop may be due to mechanical failure, unsafe driving conditions (e.g., poor visibility, heavy rain, icy roadways, strong winds, etc.), or any other situation in which the autonomous vehicle 105 is forced to stop on or near a roadway 310. Aspects of this disclosure relate to systems and methods for autonomously deploying emergency roadside signaling devices.

Figure 2:
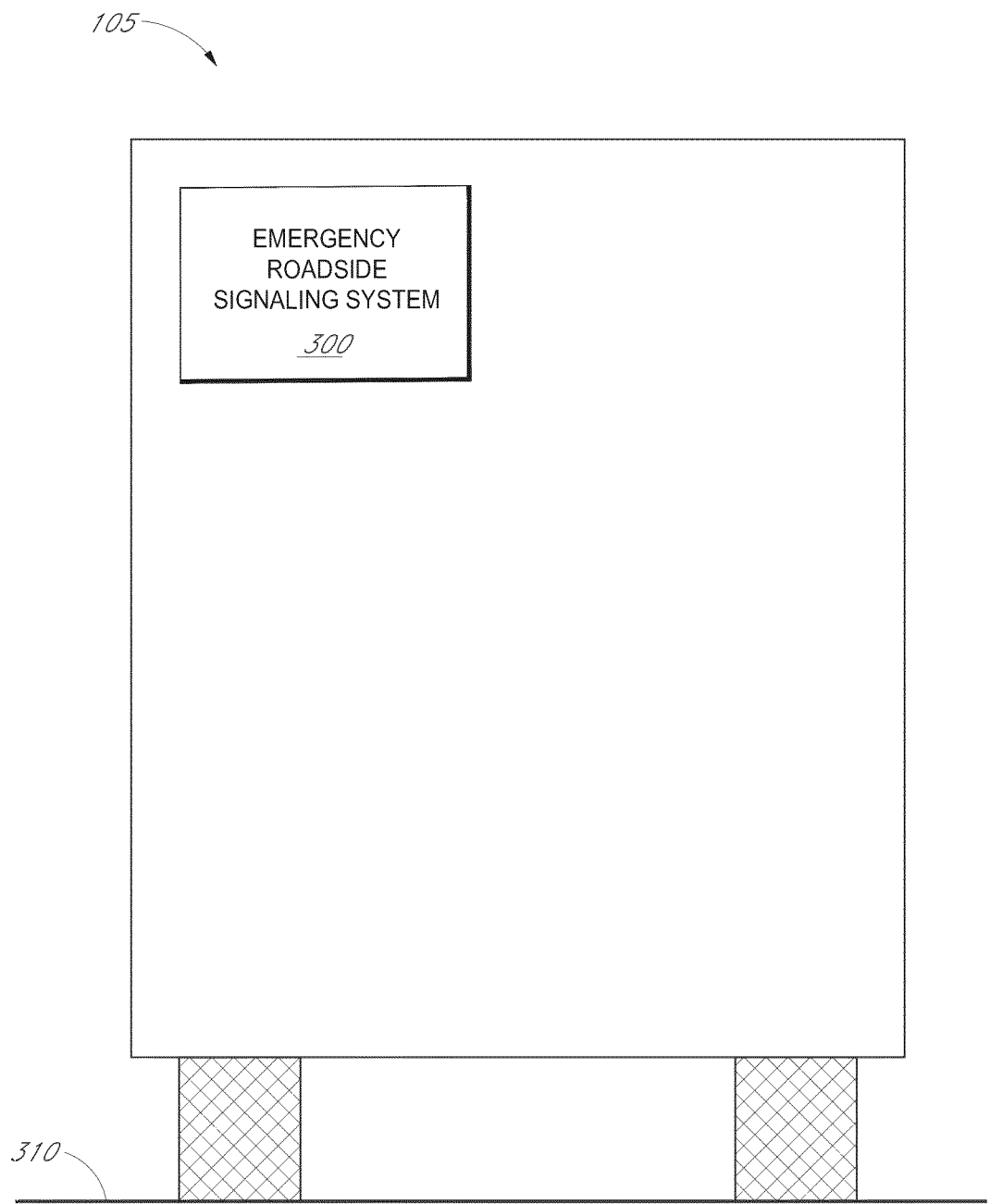
FIG. 2 illustrates an autonomous vehicle having an emergency roadside signaling system in accordance with aspects of this disclosure.

FIG. 2 illustrates an autonomous vehicle 105 on the roadway 310 and having an emergency roadside signaling system 300 (also referred to as an object placing device 300) in accordance with aspects of this disclosure. As shown in FIG. 2, the emergency roadside signaling system 300 may be located on the exterior of the autonomous vehicle 105, for example, on the back end of a trailer of the autonomous vehicle 105. However, depending on the implementation, the roadside signaling system 300 can be located in a different location on the exterior or interior of the autonomous vehicle 105. For example, the roadside signaling system 300 can be located on the top, bottom, or on a side of the trailer of the autonomous vehicle 105. The roadside signaling system 300 can be located on an exterior of the cab of the autonomous vehicle 105. For example, the roadside signaling system 300 can be located on the top, bottom, or on a side of the cab of the autonomous vehicle 105. In still other implementations, the roadside signaling system 300 can be located inside the trailer. For example, in certain embodiments, the emergency roadside signaling devices can be deployed by first opening a door in the trailer to gain access to the exterior of the trailer. In these implementations, the roadside signaling system 300 may have a dedicated door allowing for only the emergency roadside signaling devices to gain access to the exterior of the trailer. In certain embodiments, the roadside signaling system 300 can use the same door as used to load and unload cargo from the trailer.

As is described in detail herein, in some embodiments the object placing device 300 may comprise one or more signaling device transportation vehicles and a housing (e.g., as illustrated in at least FIGS. 11A-12C and 26A-27D). In other embodiments, the object placing device 300 may comprise a signaling device housing (e.g., as illustrated in FIGS. 13A-14B, 17A-18I, and 24A-25H).

Figure 3:
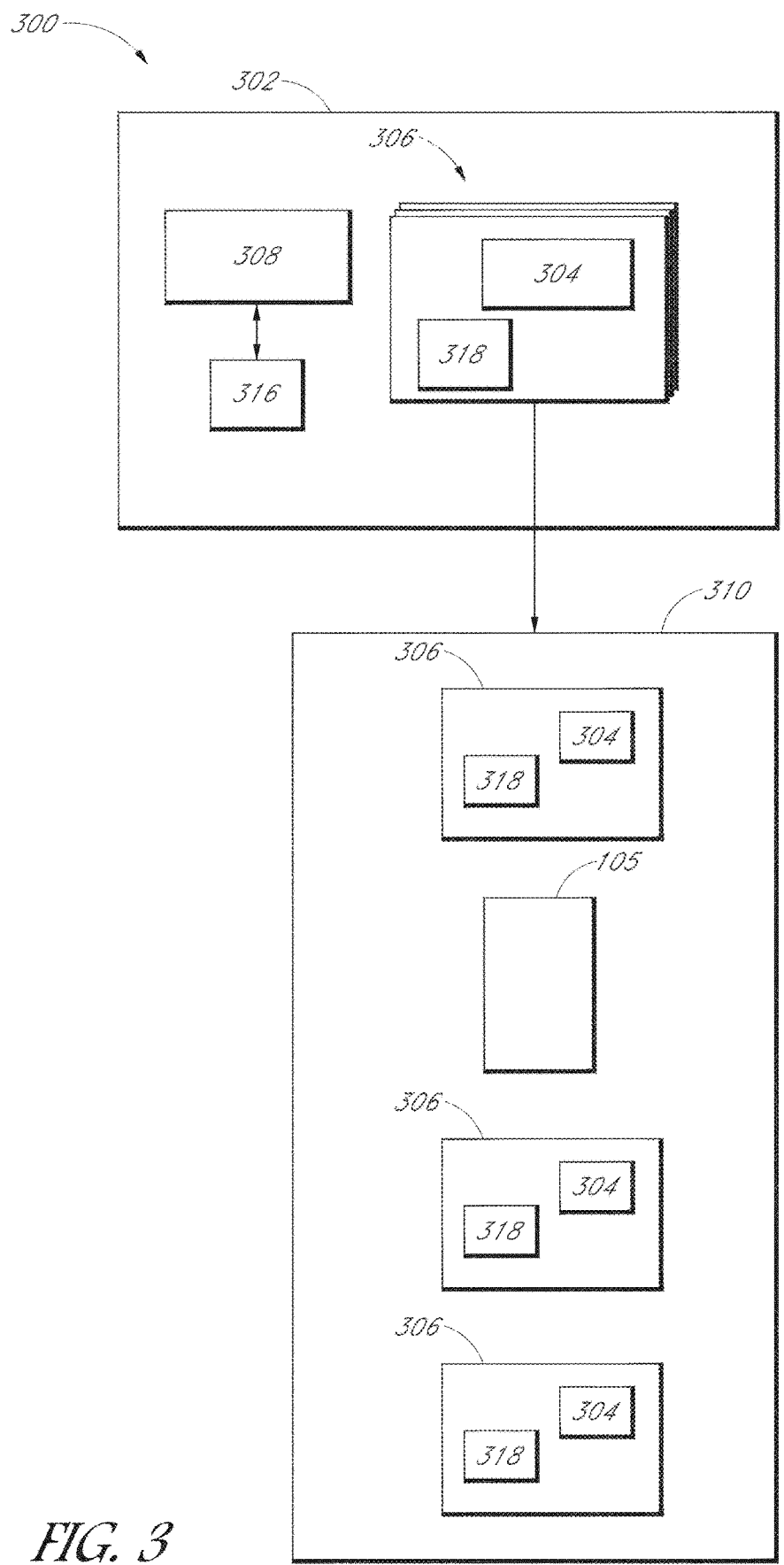
FIG. 3 is a block diagram illustrating exemplary components of the roadside signaling system in accordance with aspects of this disclosure.

FIG. 3 is a block diagram illustrating exemplary components of the roadside signaling system 300 in accordance with aspects of this disclosure. In certain embodiments, the roadside signaling system 300 includes a signaling device housing 302, one or more signaling device(s) 304, one or more signaling device transportation vehicle(s) 306, and a control system 308. Each of the signaling device(s) 304 can be mounted to one of the signaling device transportation vehicles 306. In certain embodiments, the signaling device transportation vehicle(s) 306 comprises one or more sensor(s) 318. In certain embodiments, the roadside signaling system 300 comprises one or more sensor(s) 316.

In certain embodiments, during normal operation of the autonomous vehicle 105, the signaling device transportation vehicle(s) 306 can be housed within the housing 302. In some embodiments, the housing 302 can comprise a dock (which can also be referred to as a "base station") configured to house some or all of the components of the roadside signaling system 300 when not in use (e.g., during normal operating conditions of the autonomous vehicle 105). However, in some implementations, one or more components of the roadside signaling system 300 may be located separately from the dock or housing 302. For example, the control system 308 can be included as part of the in-vehicle control system 150 illustrated in FIG. 1. As discussed herein, the control system 308 can be configured to control the signaling device transportation vehicle(s) 306 to transport the signaling device(s) 304. In some embodiments, the control system 308 can include a data processor and a non-transitory computer-readable memory in order to process signals received from the sensor(s) 316 and to provide instructions to the signaling device transportation vehicle(s) 306.

In certain embodiments, the dock of the housing 302 can be mounted to the autonomous vehicle 105, for example, as described in connection with FIG. 2 above. Thus, in the event that the autonomous vehicle 105 is parked on or near the roadway 310 (e.g., due to a mechanical failure) in certain embodiments, the signaling device transportation vehicle(s) 306 can be deployed onto or near the roadway 310. The signaling device(s) 304 can be used to visually notify other drivers or vehicles on the road of the parked autonomous vehicle 105.

In certain embodiments, the dock of the housing 302 functions as a charging station for the signaling device transportation vehicle(s) 306. For example, in embodiments where each of the signaling device transportation vehicle(s) 306 includes a battery configured to power the signaling device transportation vehicle(s) 306, the signaling device transportation vehicle(s) 306 can further include electrodes which can be electrically connected to respective charging terminals (not illustrated) on the dock in order to charge the batteries. In other aspects, the dock may include a wireless power transmitter and the signaling device transportation vehicle(s) 306 may include wireless power receivers configured to receive power wirelessly from the wireless power transmitter of the dock.

The housing 302 can further include the one or more sensor(s) 316 configured to communicate with the control system 308. For example, the sensor(s) 316 may include a GPS transceiver configured to generate a signal indicative of the location of the housing 302. In certain embodiments, the one or more sensor(s) 316 can further include additional types of sensors, such as cameras, radar, lidar, etc., which may be used to determine the locations of the signaling device transportation vehicle(s) 306 when not mounted to the housing 302. In certain embodiments, the control system 308 may receive signals from sensors included in the vehicle sensor subsystems 144 rather than including dedicated sensor(s) 316 in the housing 302. Thus, the control system 308 may be able to determine the locations of the signaling device transportation vehicle(s) 306 based at least in part on sensor signals received from the sensor(s) 316 and/or the sensors included in the vehicle sensor subsystems 144.

Figure 4:
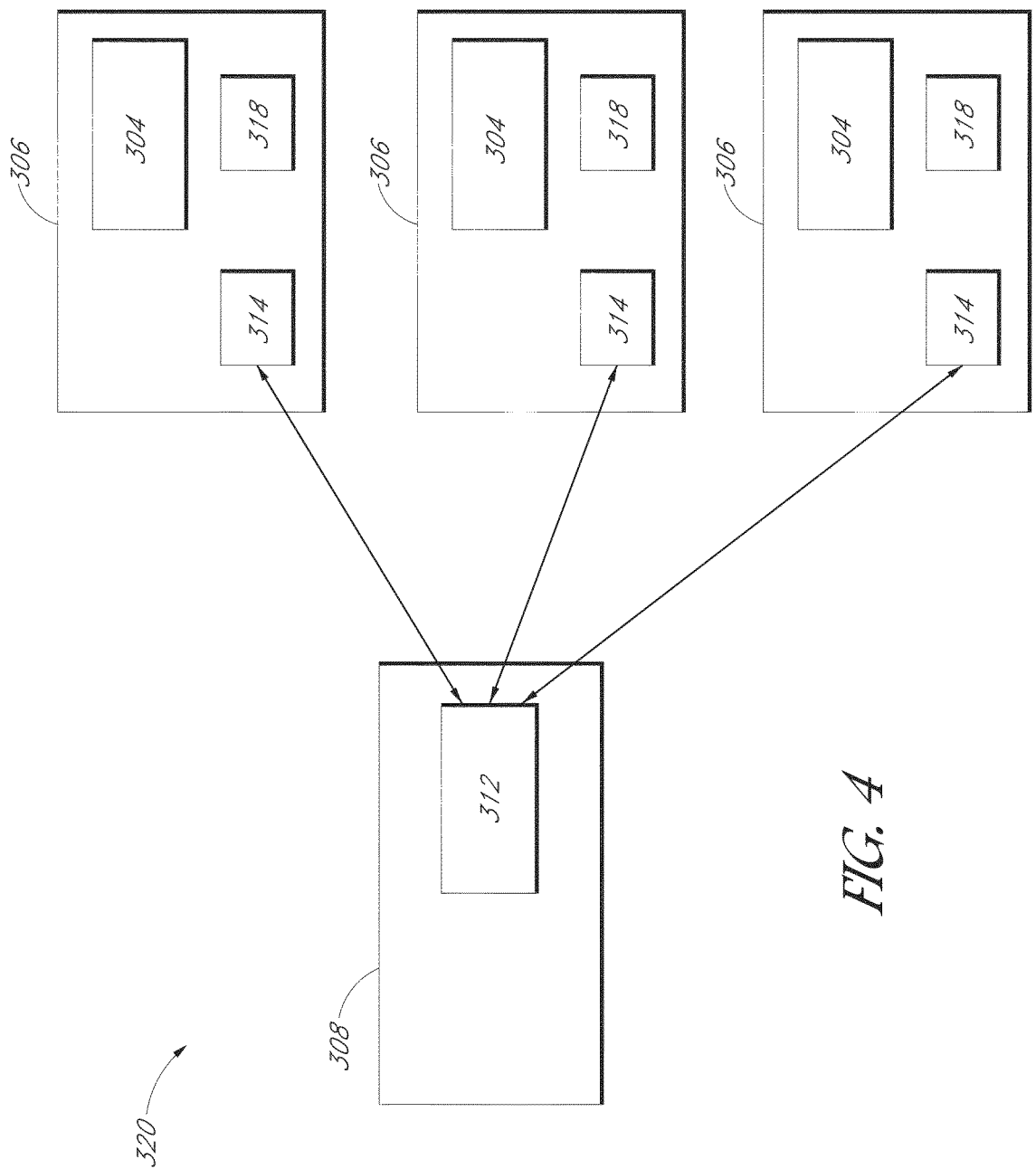
FIG. 4 illustrates a communication system that can be used for communication between the control system and the signaling device transportation vehicles.

FIG. 4 illustrates a communication system 320 that can be used for communication between the control system 308 and the signaling device transportation vehicle(s) 306. For example, the control system 308 can include a wireless transceiver 312 and each of the signaling device transportation vehicle(s) 306 can also include a wireless transceiver 314. Accordingly, the control system 308 can communicate with each of the signaling device transportation vehicle(s) 306 via the wireless transceivers 312 and 314. The control system 300 may further be configured to communicate with the in-vehicle control system 150 shown in FIG. 1, either via the wireless transceiver 312 or a wired connection (not illustrated).

With reference to FIGS. 3 and 4, the signaling device(s) 304 can include, for example, a light, flare, or reflective shape (e.g., a reflective triangle, square, or other shape) that can be used to visually notify nearby drivers and/or other vehicles that the autonomous vehicle 105 is stopped on or near the roadway 310. In some aspects, each of the signaling device(s) 304 can be mounted in a highly visible location on one of the signaling device transportation vehicle(s) 306 (e.g., in an unobstructed location on and above other components of the signaling device transportation vehicle(s) 306) such that when the signaling device transportation vehicle(s) 306 are deployed to their respective locations with respect to the parked autonomous vehicle 105, the signaling device(s) 304 are visible to the nearby drivers and vehicles. In other aspects, the signaling device(s) 304 may be detachable from the signaling device transportation vehicle(s) 306 and the signaling device transportation vehicle(s) 306 may be configured to place the signaling device(s) 304 directly on the ground. Thus, in certain embodiments, a single signaling device transportation vehicle 306 may be configured to place all of the signaling device(s) 304 in the prescribed locations (e.g., in compliance with the applicable regulations).

In certain aspects, the signaling device transportation vehicle(s) 306 can include air or ground vehicles suitable for operation in extreme environments such as wind, rain, snow, cold, and/or heat. That is, the signaling device transportation vehicle(s) 306 can be configured to operate in extreme weather and/or roadway conditions that may be at least partially responsible for the autonomous vehicle 105 being stopped on or near the roadway 310. Thus, it can be advantageous for the signaling device transportation vehicle(s) 306 to be able to navigate extreme environmental conditions so that the signaling device(s) 304 can be properly positioned in these conditions.

According to some aspects, the signaling device transportation vehicle(s) 306 may include battery powered air vehicles (also referred to as unmanned aerial vehicles (UAVs) or drones). For example, the signaling device transportation vehicle(s) 306 may include one or more rotary wings configured to lift the signaling device transportation vehicle(s) 306 and the corresponding signaling device(s) 304 for placement on or near the roadway 310. When implemented as a UAV, the signaling device transportation vehicle(s) 306 may include sensors configured to provide feedback for control of the signaling device transportation vehicle(s) 306.

The signaling device transportation vehicle(s) 306 can also include battery powered land vehicles in accordance with aspects of this disclosure. For example, the signaling device transportation vehicle(s) 306 may include two or more wheels, one or more continuous tracks, or another land-based vehicle propulsion system. In aspects where the signaling device transportation vehicle(s) 306 include land based vehicles, the dock of the housing 302 may be located within a predetermined distance from the ground so that the signaling device transportation vehicle(s) 306 can be undocked and redocked to the dock from the ground.

As shown in FIG. 4, each of the signaling device transportation vehicle(s) 306 can include the one or more sensor(s) 318. The sensor(s) 318 can include camera(s), GPS, radar, and/or lidar sensors. The signaling device transportation vehicle(s) 306 can use the signals received from the sensor(s) 318 to determine the relative position between the autonomous vehicle 105 and the signaling device transportation vehicle(s) 306, so as to position the signaling device(s) 304 on or near the roadway 310 in the desired locations (e.g., in compliance with regulations). In certain aspects, the signaling device transportation vehicle(s) 306 can determine the relative locations of the signaling device transportation vehicle(s) 306 with respect to the autonomous vehicle 105 without communicating with the control system 308.

However, in other aspects, the control system 308 may also be able to determine the locations of the signaling device transportation vehicle(s) 306 using, for example, the sensor(s) 316 and/or one or more of the sensors included in the vehicle sensor subsystems 144. Thus, the signaling device transportation vehicle(s) 306 may use signals received from the control system 308 in determining the current locations of the signaling device transportation vehicle(s) 306 with respect to the autonomous vehicle 105. Each of the signaling device transportation vehicle(s) 306 can therefore be semi-autonomously controlled via the control system 308.

Figure 5:
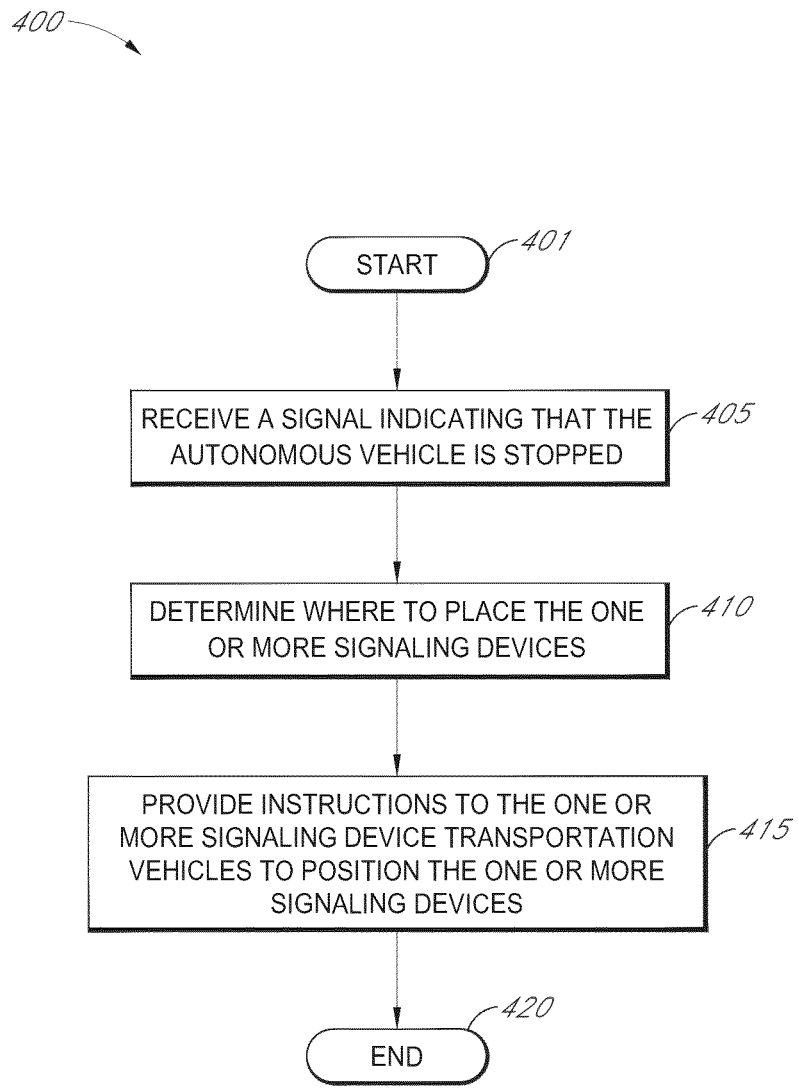
FIG. 5 illustrates an example method for deploying emergency roadside signaling devices in accordance with aspects of this disclosure.

FIG. 5 illustrates an example method 400 for deploying emergency roadside signaling device(s) 304 in accordance with aspects of this disclosure. In some implementations, certain blocks of the method 400 may be performed by the control system 308, the signaling device transportation vehicle(s) 306, or any other module executed by a processor on the autonomous vehicle 105. For simplicity, the method 400 will be described as performed by the control system 308.

The method 400 begins at block 401. At block 405, the control system 308 receives a signal that the autonomous vehicle 105 is stopped. For example, the control system 308 may receive a signal from the in-vehicle control system 150 indicating that the autonomous vehicle 105 has parked on or near the roadway 310. In some aspects, the in-vehicle control system 150 may generate the signal when the autonomous vehicle 105 is forced to make an unplanned stop. The unplanned stop may be due to mechanical failure, unsafe driving conditions (e.g., poor visibility, heavy rain, icy roadways, strong winds, etc.), or any other situation in which the autonomous vehicle is forced to stop on or near the roadway 310.

In certain embodiments, the control system 308 may receive the signal indicating that the autonomous vehicle 105 is stopped from the sensor(s) 316. For example, the sensor(s) 316 may detect when the autonomous vehicle 105 has stopped. In certain embodiments, there may be certain circumstances in which the control system 308 has lost communication with the in-vehicle control system 150, for example, if the wiring between the control system 308 and the in-vehicle control system 150 is damaged due to a collision or mechanical failure. Thus, the control system 308 may determine that the autonomous vehicle 105 is stopped on or near the roadway 310 when the sensor(s) 316 produces a signal that the autonomous vehicle 105 is stationery and communication with the in-vehicle control system 150 has been inhibited or lost. Further, in some aspects, the control system 308 may not include a dedicated sensor 316, and thus, the control system 308 can determine that the autonomous vehicle 105 is stationary based on a signal received from one of the sensor(s) 318 located on the signaling device transportation vehicle(s) 306.

At block 410, the control system 308 determines where to place the signaling device(s) 304. For example, the control system 308 can access the current location using GPS (e.g., from the sensor(s) 316 or from the GPS sensor included in the vehicle sensor subsystem 144) and predetermined maps of the roadways 310 to determine locations at which to place the signaling device(s) 304. For example, the control system 308 may select certain locations within the maps based on the position of the autonomous vehicle 105 using the GPS signal and select locations for the signaling devices using criteria such as DOT regulations (e.g., United States 39 C.F.R. § 392.22) for the placement of the signaling device(s) 304. The DOT regulations may include a predetermined time by which the signaling device(s) 304 must be placed once the autonomous vehicle 105 is stopped.

In certain embodiments, the control system 308 can be configured to, within, for example, 10 minutes of the autonomous vehicle 105 stopping, place the signaling devices 304 such that: (i) a first one of the signaling devices 304 is on the traffic side of and approximately 3 meters or 10 feet from the stopped autonomous vehicle 105 in the direction of approaching traffic, (ii) a second one of the signaling devices 304 is at approximately 30 meters or 100 feet from the stopped autonomous vehicle 105 in the center of the traffic lane or shoulder occupied by the stopped autonomous vehicle 105 and in the direction of approaching traffic, and (iii) a third one of the signaling devices 304 is at approximately 30 meters or 100 feet from the stopped autonomous vehicle 105 in the center of the traffic lane or shoulder occupied by the autonomous vehicle 105 and in the direction away from approaching traffic. 39 C.F.R. § 392.22 provides an example criteria for the placement of signaling device(s) 304 with respect to a stopped autonomous vehicle 105 in accordance with aspects of this disclosure. There may be special rules depending on the circumstances in which the autonomous vehicle 105 has been stopped.

In some circumstances, one or more of the GPS signal and/or the maps may not be available. Thus, the control system 308 may not be able to provide specific locations (e.g., GPS coordinates) as instructions to the signaling device transportation vehicle(s) 306.

At block 415, the control system 308 provides instructions to the signaling device transportation vehicle(s) 306 to position the signaling device(s) 304. The signaling device transportation vehicle(s) 306 can also supplement the signals received from the sensor on the signaling device transportation vehicle(s) 306 with signals received from sensor(s) 316 of the control system 308 and/or one or more of the or more of the sensors included in the vehicle sensor subsystem 144. When the control system 308 has access to the current GPS location of the autonomous vehicle 105 and the maps, the instructions may include GPS coordinates for positioning each of the signaling device(s) 304. Thus, the signaling device transportation vehicle(s) 306 can autonomously or semi-autonomously drive the signaling device(s) 304 to the positions indicated by the instructions.

However, when the control system 308 does not have access to at least one of the current GPS location of the autonomous vehicle 105 or the maps, the instructions may not include the GPS coordinates for positioning the signaling device(s) 304. In these circumstances, the signaling device transportation vehicle(s) 306 can rely at least in part on location information obtained from sensor(s) 318 (e.g., camera(s), radar, and/or lidar) to position the signaling device(s) 304 with respect to the autonomous vehicle 105. The method 400 ends at block 420.

Example Criteria for the Placement of the Signaling Device(s)

As described above, there may be predefined criteria for the placement of the signaling device(s) 304, for example, the DOT regulations (e.g., United States 39 C.F.R. § 392.22) provide one set of predefined criteria for the placement of the signaling device(s) 304. However, other regulations may be used for the predefined criteria including national highway traffic safety administration (NHTSA) regulations, federal motor carrier safety administration (FMCSA) regulations, federal motor vehicle safety standard (FMVSS) regulations, code of federal regulations (CFR) regulations, etc.

The FMCSA guidelines for placing warning devices are governed by the Code of Federal Regulations 39 C.F.R. § 392.22. "Whenever a commercial motor vehicle is stopped upon the traveled portion of a highway or the shoulder of a highway for any cause other than necessary traffic stops, the driver of the stopped commercial motor vehicle shall immediately activate the vehicular hazard warning signal flashers and continue the flashing until the driver places the warning devices (triangles)." 39 C.F.R. § 392.22. The warning devices must be placed within 10 minutes or as quickly as possible. In addition, the warning device must be oriented such that the reflective side is facing oncoming traffic so that the warning devices are easier to see.

The predefined criteria for the placement of the signaling device(s) 304 may vary depending on the specific configuration of the roadway 310 on which the autonomous vehicle 105 is travelling. For example, the predefined criteria may vary based on whether the autonomous vehicle 105 is stopped on: i) a two-way or undivided highway; ii) a hill, curve, or near (e.g., with a predetermined distance of) a visual obstruction; or iii) a divided or one-way roadway 310.

Figure 6:
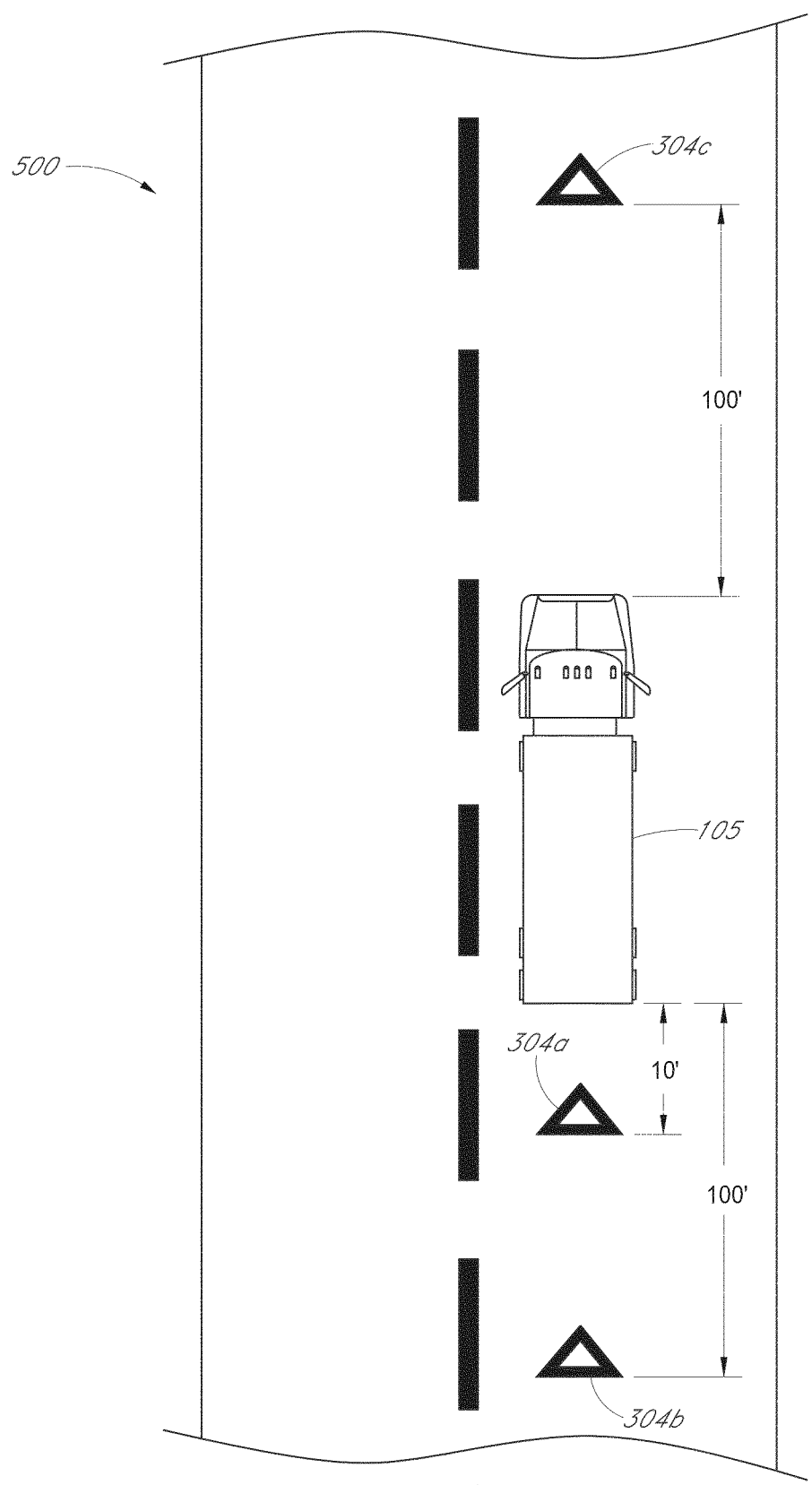
FIG. 6 illustrates an example predefined criteria for the placement of the signaling device(s) when the autonomous vehicle is stopped on a two-way or undivided highway in accordance with aspects of this disclosure.

FIG. 6 illustrates an example predefined criteria 500 for the placement of the signaling device(s) 304 when the autonomous vehicle is stopped on a two-way or undivided highway in accordance with aspects of this disclosure. For example, the predefined criteria 500 illustrated in FIG. 6 may correspond to the requirements of the DOT regulations, and other predefined criteria may apply depending on the regulations applicable to the autonomous vehicle 105.

With reference to FIG. 6, the predefined criteria 500 may define criteria for the placement of three signaling devices 304a, 304b, and 304c. An exemplary predefined criteria will now be described. In particular, a first one of the signaling devices 304a is placed on the traffic side of and 4 paces (approximately 3 meters or 10 feet) from the stopped autonomous vehicle 105 in the direction of approaching traffic. A second one of the signaling devices 304b is placed at 40 paces (approximately 30 meters or 100 feet) from the stopped autonomous vehicle 105 in the center of the traffic lane or shoulder occupied by the autonomous vehicle 105 and in the direction of approaching traffic. A third one of the signaling device 304c is placed at 40 paces (approximately 30 meters or 100 feet) from the stopped autonomous vehicle 105 in the center of the traffic lane or shoulder occupied by the autonomous vehicle 105 and in the direction away from approaching traffic. In other words, if the autonomous vehicle 105 is stopped on a 2-lane road carrying traffic in both directions or on an undivided highway, the predefined criteria 500 includes criteria for placing three signaling devices 304a-304c within 10 feet of the front or rear corners to mark the location of the autonomous vehicle 105 and 100 feet behind and ahead of the autonomous vehicle 105, on the shoulder or in the lane in which the autonomous vehicle 105 is stopped.

Figure 7A:
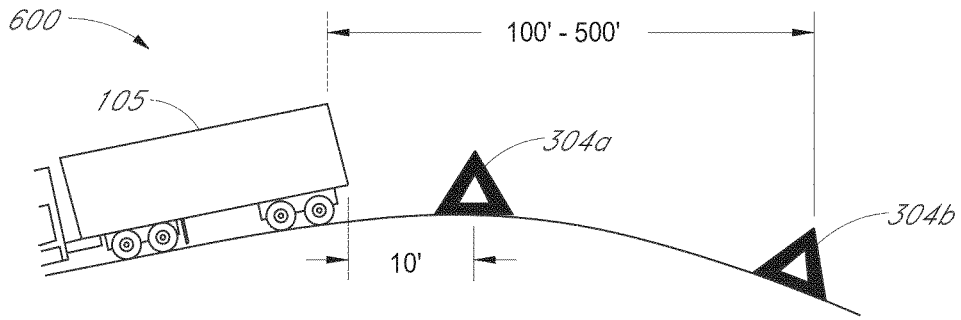
FIGS. 7A and 7B illustrate an example predefined criteria for the placement of the signaling device(s) when the autonomous vehicle is stopped on a hill, curve, or near a visual obstruction.
Figure 7B:
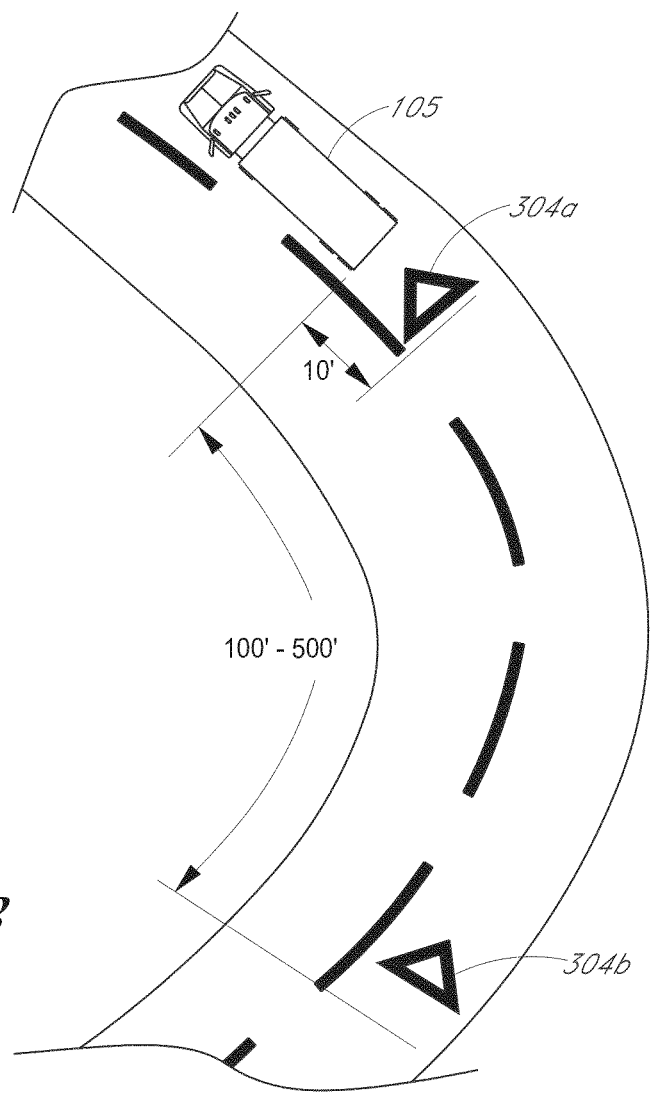

FIGS. 7A and 7B illustrate an example predefined criteria 600 for the placement of the signaling device(s) 304 when the autonomous vehicle 105 is stopped near a hill, curve, or near a visual obstruction. In particular, FIG. 7A illustrates the autonomous vehicle 105 stopped on a hill and FIG. 7B illustrates the autonomous vehicle 105 stopped on a curve. For example, the predefined criteria 600 illustrated in FIGS. 7A and 7B may correspond to the requirements of the DOT regulations, and other predefined criteria may apply depending on the regulations applicable to the autonomous vehicle 105.

With reference to FIGS. 7A and 7B, the predefined criteria 600 may define criteria for the placement of two signaling devices 304a and 304b when the autonomous vehicle 105 is stopped on within 500 feet of a hill, curve, or near an obstruction to view. In particular, a first one of the signaling devices 304a is placed on the traffic side of and 4 paces (approximately 3 meters or 10 feet) from the stopped autonomous vehicle 105 in the direction of approaching traffic. A second one of the signaling devices 304b is placed in the direction of the obstruction to view a distance of 100 feet to 500 feet from the stopped autonomous vehicle 105 so as to afford ample warning to other users of the highway.

Figure 8:
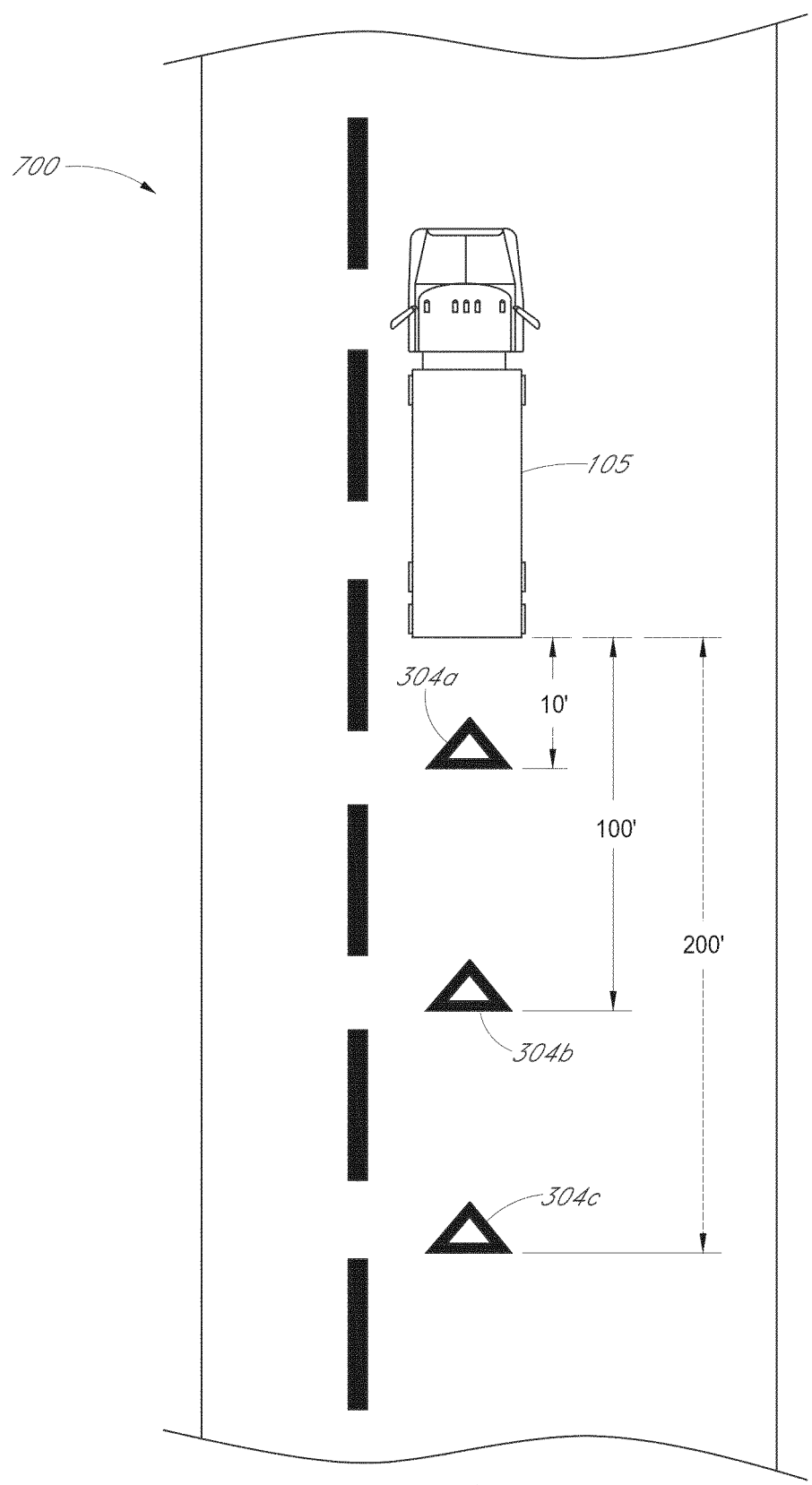
FIG. 8 illustrates an example predefined criteria for the placement of the signaling device(s) when the autonomous vehicle is stopped on a divided or one-way roadway.

FIG. 8 illustrates an example predefined criteria 700 for the placement of the signaling device(s) 304 when the autonomous vehicle 105 is stopped on a divided or one-way roadway 310. For example, the predefined criteria 700 illustrated in FIG. 8 may correspond to the requirements of the DOT regulations, and other predefined criteria may apply depending on the regulations applicable to the autonomous vehicle 105.

With reference to FIG. 8, the predefined criteria 700 may define criteria for the placement of three signaling devices 304a, 304b, and 304c. In particular, a first one of the signaling devices 304a is placed at the traffic side of the autonomous vehicle 105 within 10 feet of the rear of the autonomous vehicle 105. A second one of the signaling devices 304b is placed at a distance of 100 feet in a direction toward approaching traffic in the center of the lane or shoulder occupied by the autonomous vehicle 105. A third one of the signaling devices 304c is placed at a distance of 200 feet in the direction toward approaching traffic in the center of the lane or shoulder occupied by the autonomous vehicle 105.

It may not be required to place signaling devices 304 when the autonomous vehicle 105 is stopped in a business district or residential area, except during time(s) when lighted lamps are required and when street or highway lighting is insufficient to make the autonomous vehicle 105 clearly discernable at a distance of 500 feet to persons on the highway. Regulations governing the use of the autonomous vehicle 105 may also impose requirements on the signaling devices 304. For example, in certain embodiments, the signaling device can comply with at least one of the following: (1) Three bidirectional emergency reflective triangles that conform to the requirements of Federal Motor Vehicle Safety Standard, (2) At least 6 fuses or 3 liquid-burning flares, and (3) Other signaling devices 304 may be used in addition to, but not in lieu of, the required signaling devices, provided those signaling devices do not decrease the effectiveness of the required signaling devices.

Figure 9:
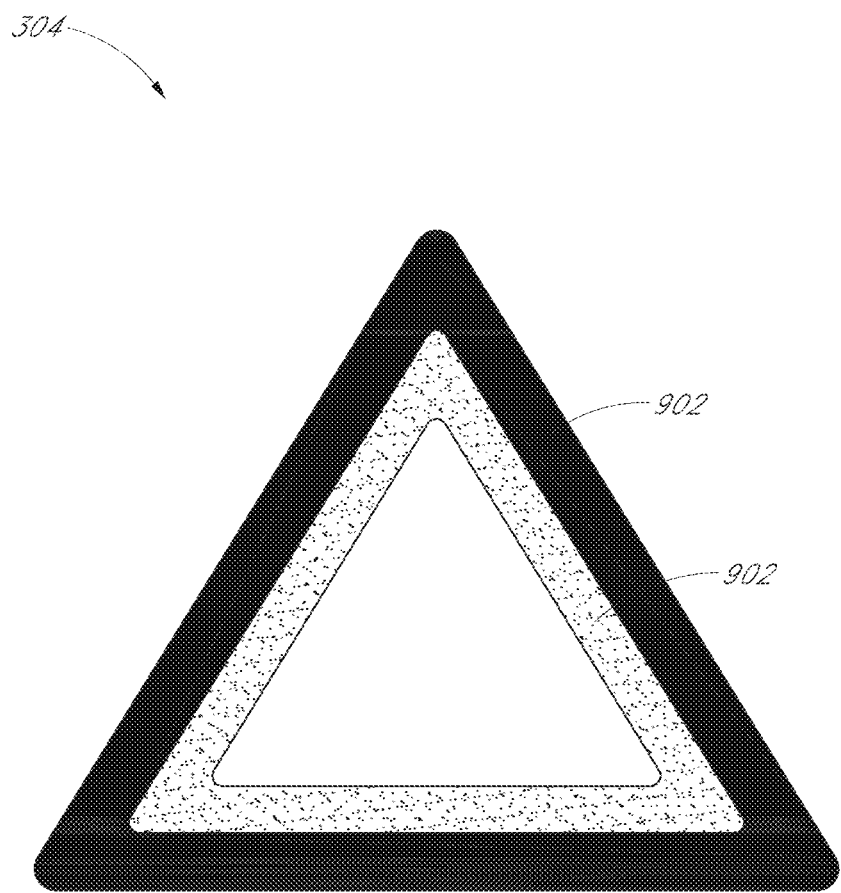
FIG. 9 is an example signaling device in accordance with aspects of this disclosure.

FIG. 9 is an example signaling device 304 in accordance with aspects of this disclosure. In certain embodiments, the signaling device 304 is formed of a first material 902 formed around the perimeter of the device and a second material 904 located inside of the first material and forming an open inner shape. In certain embodiments, the first material 902 may be a red reflective material and the second material 904 may be an orange fluorescent material. In certain embodiments, the signaling device 304 may be configured to be folded for storage such that the signaling device 304 takes up less space when not in use. In some embodiments, one or more of the size, reflectivity, color, stability (e.g., in windy or other adverse conditions), luminance, configuration, and storage of the signaling device 304 may be compliant with traffic regulations (e.g., DOT FMVSS requirements).

Figure 10A:
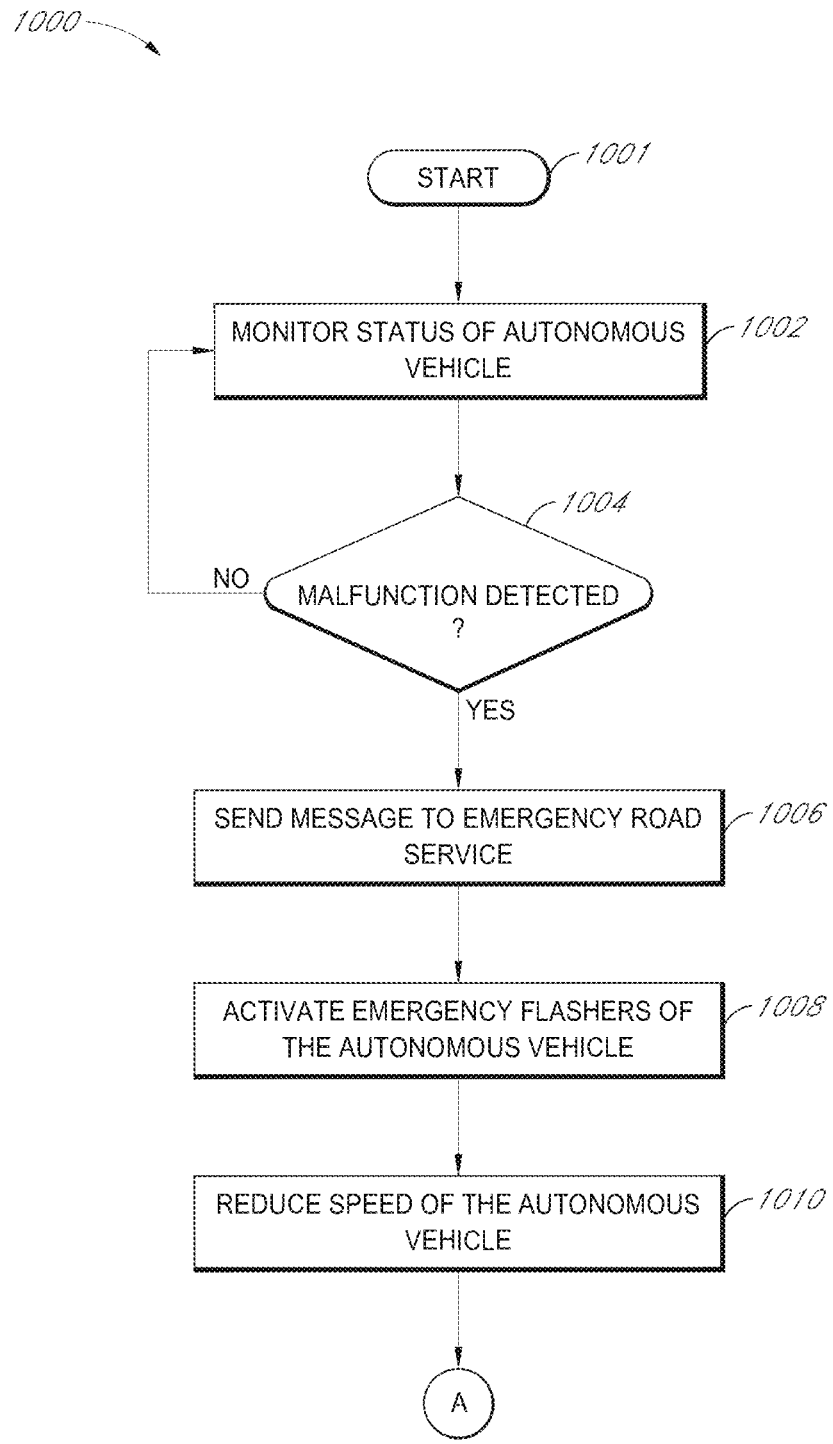
FIGS. 10A-10C illustrate example methods for deploying emergency roadside signaling devices in accordance with aspects of this disclosure.
Figure 10B:
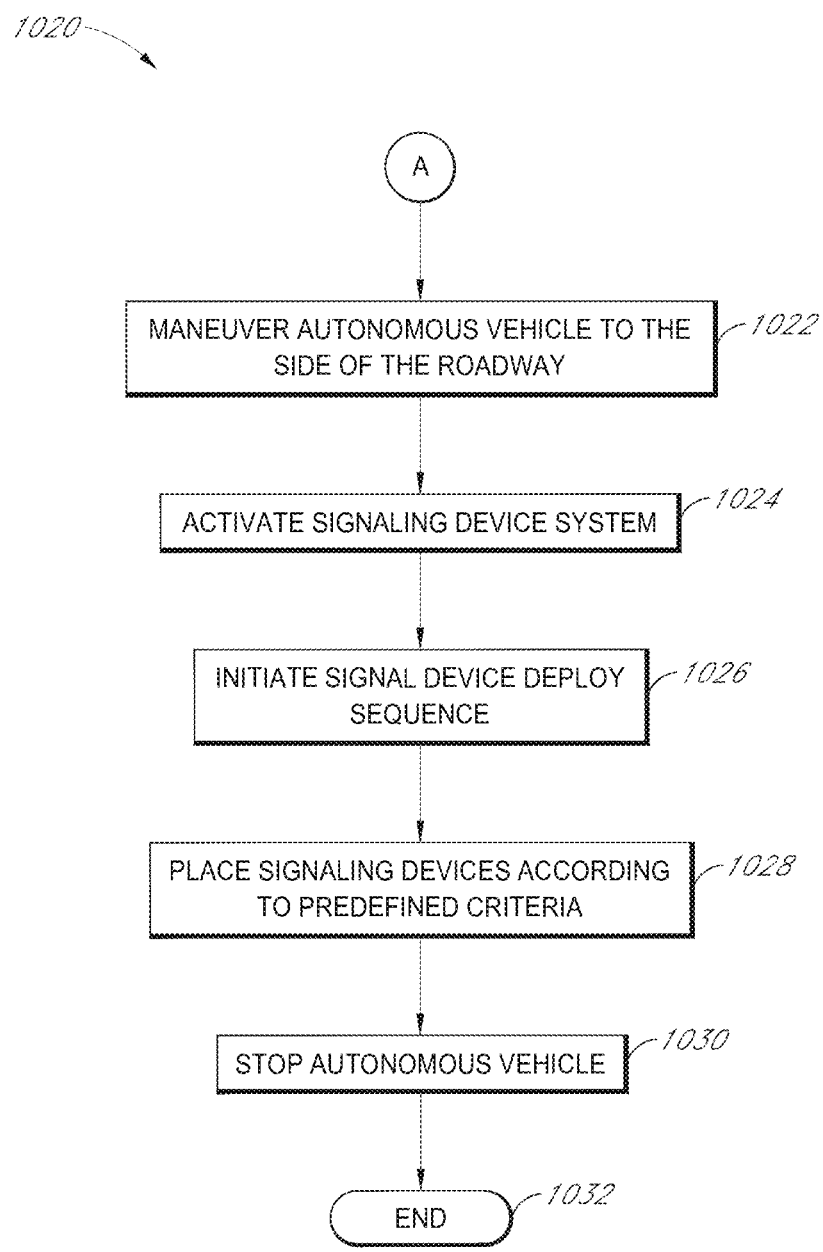
Figure 10C:
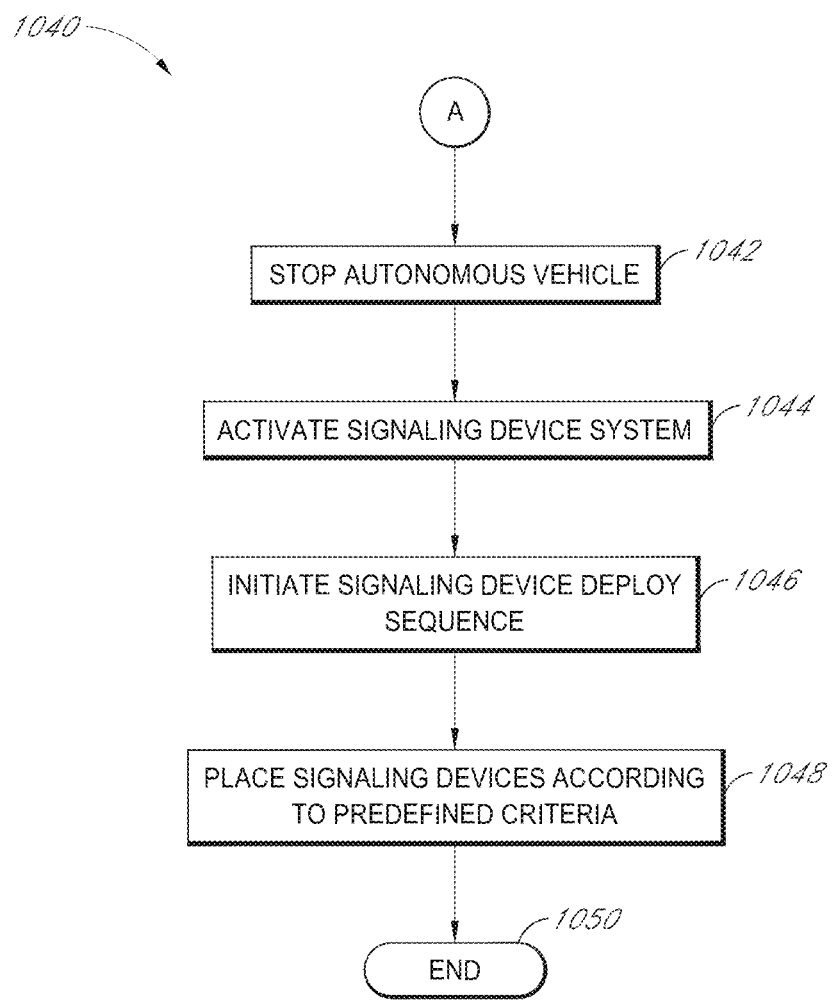

FIGS. 10A-10C illustrate example methods for deploying emergency roadside signaling devices 304 in accordance with aspects of this disclosure. In particular, FIG. 10A illustrates a method 1000 for detecting a malfunction of an autonomous vehicle 105. FIG. 10B illustrates a first method 1020 for deploying the signaling devices 304. FIG. 10C illustrates a second method 1040 for deploying the signaling devices 304. In some implementations, certain blocks of the methods 1000, 1020, and 1040 may be performed by the control system 308, the signaling device transportation vehicle(s) 306, or any other module executed by a processor on the autonomous vehicle 105. For simplicity, the methods 1000, 1020, and 1040 will be described as performed by the control system 308.

With reference to FIG. 10A, the method 1000 starts at block 1001. At block 1002, the method 1000 involves monitoring the status of the autonomous vehicle 105. At block 1004, the method 1000 involves determining whether a malfunction has occurred. A malfunction may refer to a malfunction requiring the autonomous vehicle 105 to stop driving at least temporarily, for example, the malfunction may affect the ability of the autonomous vehicle 105 to continue safely driving on the roadway 310. If no malfunction has occurred, the method 1000 returns to block 1002. In response to detecting that a malfunction has occurred, the method 1000 proceeds to block 1006. At block 1006, the method 1000 involves sending a message to an emergency road service.

At block 1008, the method 1000 involves activating emergency flashers of the autonomous vehicle 105. At block 1010, the method 1000 involves reducing the speed of autonomous vehicle 105. Although blocks 1006 to 1010 are illustrated in a particular order, these blocks may be performed substantially simultaneously or in other orders without departing from aspects of this disclosure.

With reference to FIG. 10B, the first method 1020 for deploying signaling devices 304 continues from FIG. 10A. The first method 1020 involves deploying the signaling devices before the autonomous vehicle 105 comes to a stop. The first method 1020 may be performed in situations in which one or more of the signaling devices 304 can be deployed while the autonomous vehicle 105 is still in motion. For example, the autonomous vehicle 105 can be configured to drop one or more of the signaling devices 304 from the housing 302 such that the signaling devices 304 land on the roadway 310 in accordance with the predefined criteria for the placement of the signaling devices 304.

At block 1022, the method 1020 involves maneuvering the autonomous vehicle 105 to the side of the roadway 310. At block 1024, the method 1020 involves activating the signaling device system 300. At block 1026, the method 1020 involves initiating the signaling device deploy sequence. As part of the signaling device deploy sequence, the autonomous vehicle 105 may determining the timing required for dropping the signaling devices in accordance with the predefined criteria for the placement of the signaling devices. In some implementations, the system may determine the timing at which to drop the signaling devices 304 based on one or more of the following: a current speed of the autonomous vehicle 105, a rate of deceleration of the autonomous vehicle 105, a distance between a current location of the autonomous vehicle 105 and the first location, and a distance between the signaling device housing 302 and the roadway 310.

At block 1028, the method 1020 involves placing the signaling devices 304 according to the predefined criteria. In some implementations, the placing of the signaling devices 304 may include dropping the signaling devices 304 at the timings determined in block 1026. At block 1030, the method 1020 involves stopping the autonomous vehicle 105. The method 1020 ends at block 1032.

With reference to FIG. 10C, the second method 1040 for deploying the signaling devices 304 continues from FIG. 10A. The second method 1040 involves a method for deploying the signaling devices 304 after the autonomous vehicle 105 comes to a stop. The second method 1040 may be performed in situations in which one or more of the signaling devices 304 can be deployed using one or more signaling device transportation vehicle(s) 306. For example, the signaling device transportation vehicle(s) 306 can be configured to place one or more of the signaling devices 304 on the roadway 310 in accordance with the predefined criteria for the placement of the signaling devices 304.

At block 1042, the method 1040 involves stopping the autonomous vehicle 105 on the roadway 310 (e.g., on the shoulder of the roadway 310 or within a lane on the roadway 310). At block 1044, the method 1040 involves activating the signaling device system 300. At block 1046, the method 1040 involves initiating the signaling device deploy sequence. Activating the signaling device deploy sequence may involve determining the locations at which to place the signaling devices 304, for example, based on the location of the stopped autonomous vehicle 105, GPS signals, and the predefined criteria for the placement of the signaling devices 304. At block 1048, the method 1040 involves placing the signaling devices 304 according to the predefined criteria using one or more signaling devices transportation vehicles 306. The method 1040 ends at block 1050.

Figure 11A:
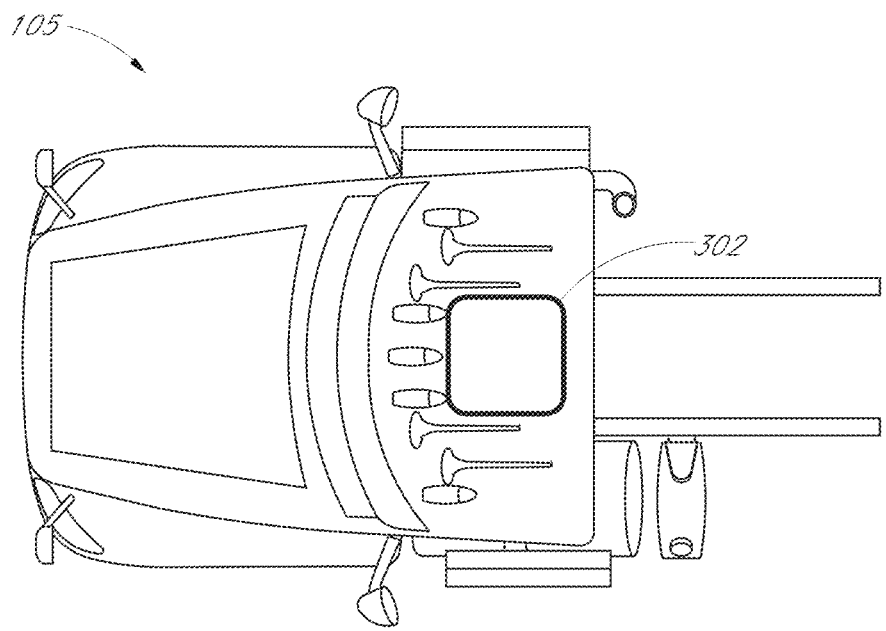
FIGS. 11A-11C illustrate an exemplary location of the signaling device housing with respect to the autonomous vehicle in accordance with aspects of this disclosure.
Figure 11B:
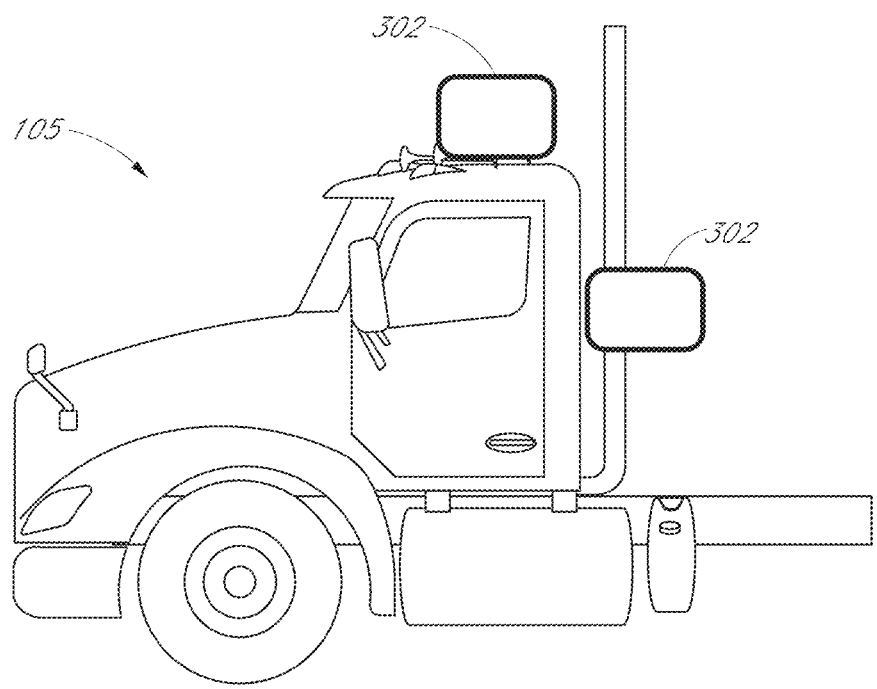
Figure 11C:
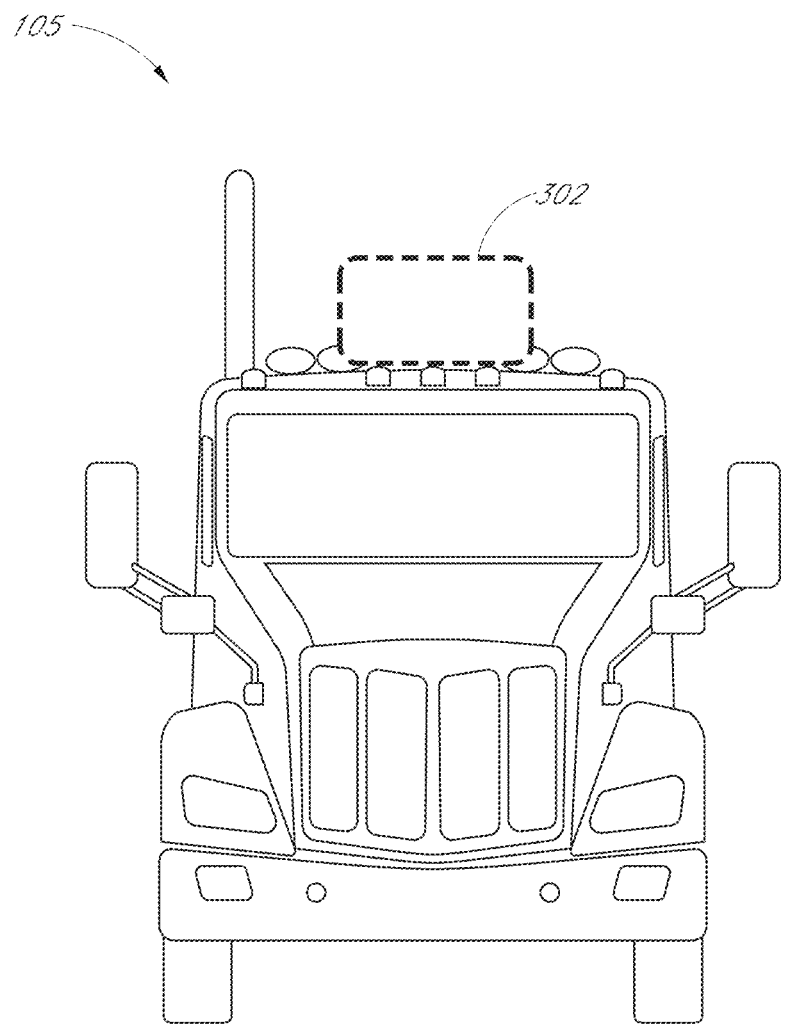

FIGS. 11A-11C illustrate exemplary locations for the signaling device housing 302 with respect to the autonomous vehicle 105 in accordance with aspects of this disclosure. As shown in FIGS. 11A-11C, the signaling device housing 302 can be located above the cab of the autonomous vehicle 105 and/or behind the cab. However, the location of the signaling device housing 302 is not limited to the locations illustrated in FIGS. 11A-11C and the signaling device housing 302 can be located in other locations on the exterior or interior of the cab or another portion of the autonomous vehicle 105 without departing from aspects of this disclosure.

The example locations for the signaling device housing 302 shown in FIGS. 11A-11C may be employed for embodiments in which one or more signaling device transportation vehicle(s) 306 are used to deploy the signaling devices 304. In some implementations, the signaling device transportation vehicles 306 may be embodied as drones 306, for example, as illustrated in FIGS. 12A-12C.

Figure 12A:
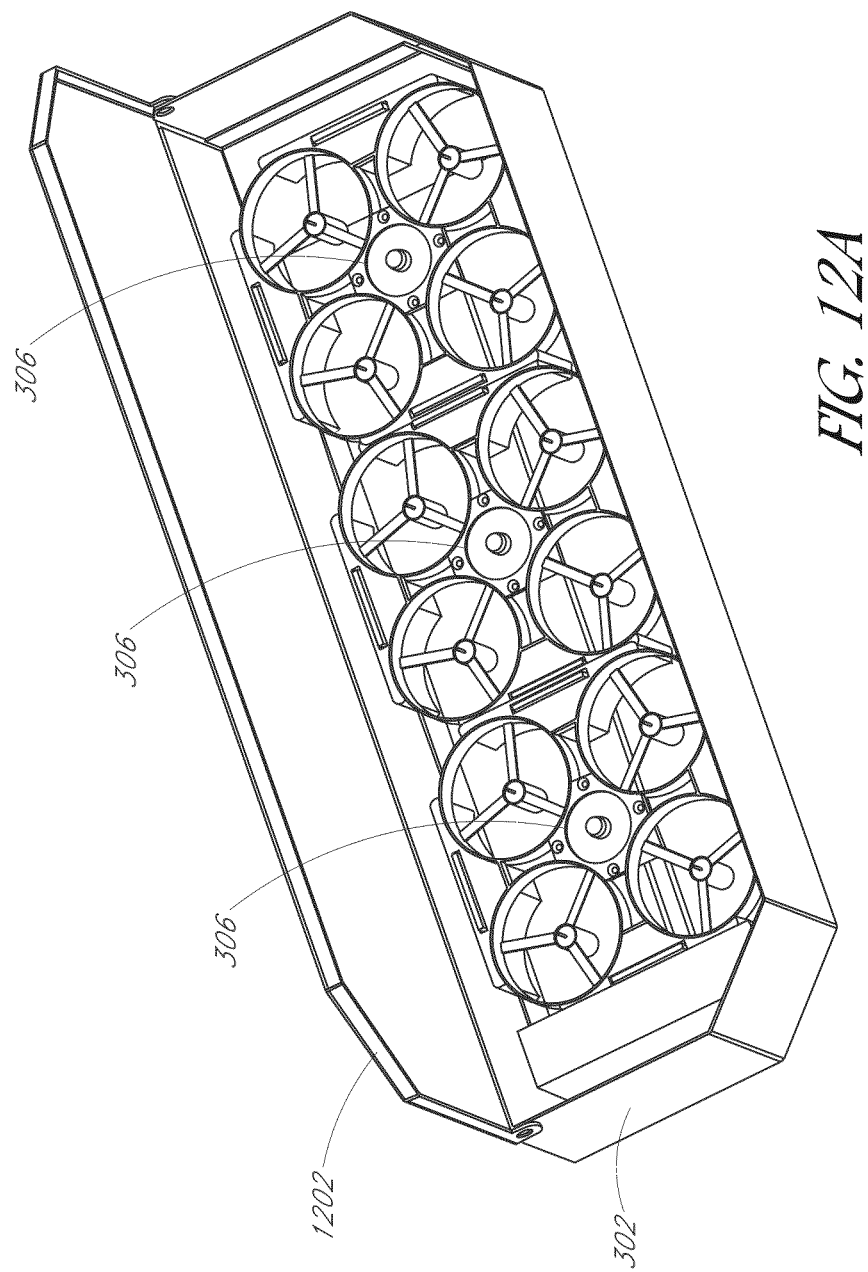
FIGS. 12A-12C illustrate an embodiment of the signaling device housing configured to house a plurality of drones which can be used to deploy one or more signaling devices.
Figure 12B:
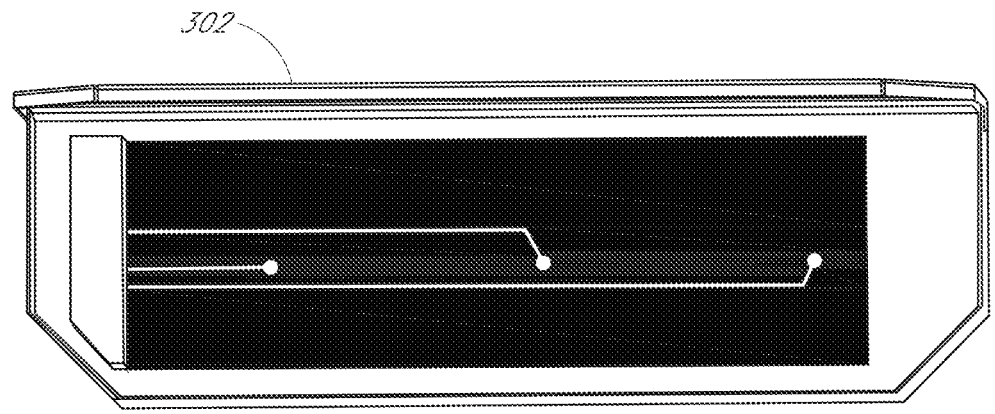
Figure 12C:
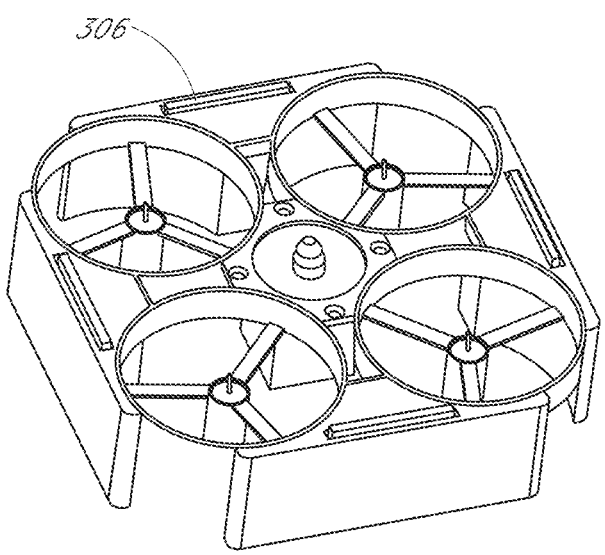

FIGS. 12A-12C illustrate an embodiment of the signaling device housing 302 configured to house a plurality of drones 306 which can be used to deploy one or more signaling devices 304. In certain embodiments, the signaling device housing 302 can include a door 1202 which can be opened to allow the drones 306 to be deployed. As shown in FIGS. 12A-12C, the drones 306 can be housed within the signaling device housing 302 when not in use. After the autonomous vehicle 105 stops on the roadway 310 (e.g., in response to a malfunction at block 1042 of FIG. 10C), the signaling device system 300 is configured to open the door 1202 and control the drones 306 to power on as part of the activating of the signaling device system 300 (e.g., as part of blocks 1044 and 1046 of FIG. 10C).

In certain embodiments, each of the drones 306 can include a GPS configured to acquire a GPS signal. In certain embodiments, the drone 306 is further configured to pick up one or more signaling devices 304 and fly to one of the locations defined by the predefined criteria for the placement of the signaling devices 304. The drone 306 can then place the signaling device 304 at the signaling device location and return to the signaling device housing 302. After returning to the signaling device housing 302, the drone 304 can then power off. In some implementations, the signaling device housing 302 can house three drones 304, each of which is configured to deploy one of the signaling devices 304 in accordance with the predefined criteria for the placement of the signaling devices 304. Of course, the signaling device housing 302 can house more or less than three signaling devices 304.

FIGS. 13A-13D illustrate another embodiment of the signaling device housing 302 configured to deploy a plurality of signaling devices 304. The signaling device housing 302 can be located on the back of the cab of the autonomous vehicle 105 such that there is no interfering structure that would prevent access of the signaling device housing 302 to the roadway 310.

In certain embodiments, the signaling device housing 302 can include a door 1302 (such as a shutter). In certain embodiments, the door 1302 can be opened to allow the signaling device 304 to be deployed onto the roadway 310. As shown in FIGS. 13A-13D, the signaling devices 304 can be housed within the signaling device housing 302 when not in use. As the autonomous vehicle 105 slows down to stop on the roadway 310 (e.g., in response to a malfunction detected at block 1042 of FIG. 10C), the signaling device system 300 can be configured to actuate the door 1302 to place the signaling devices 304 onto the roadway 310 in accordance with the predefined criteria (e.g., as part of blocks 1024, 1026, and 1028 of FIG. 10B).

Figure 13A:
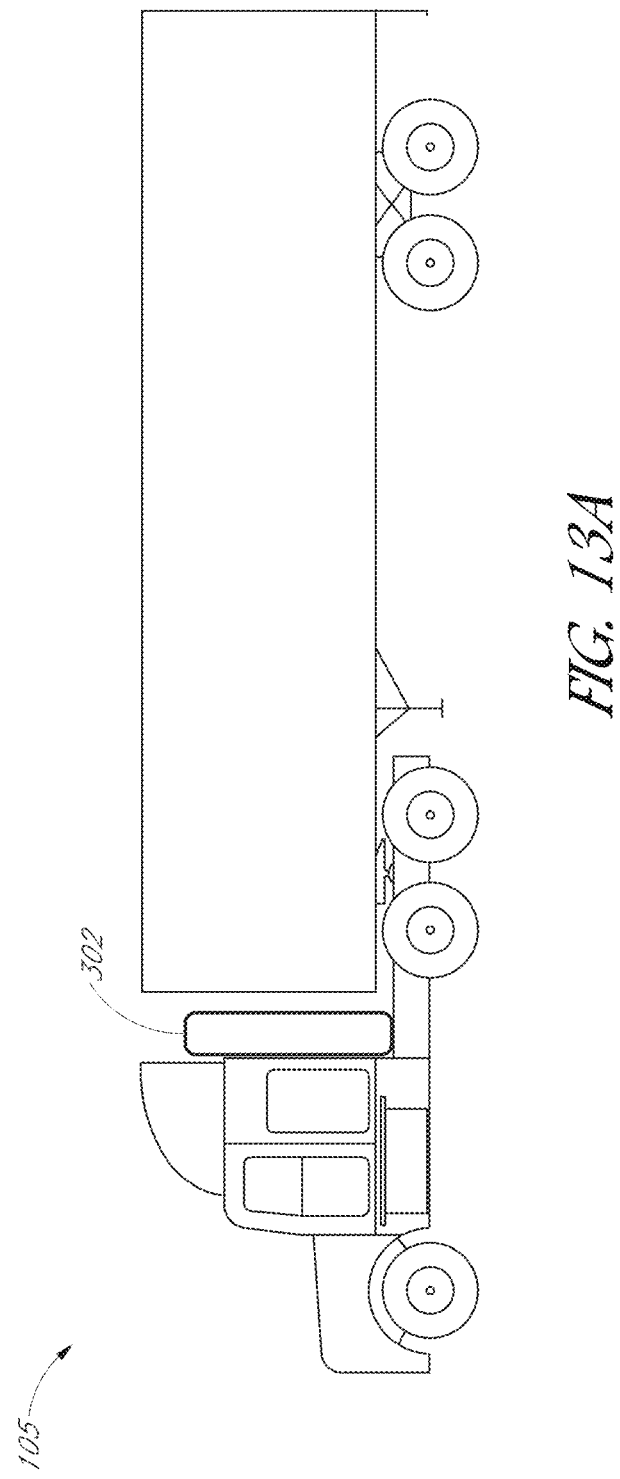
FIGS. 13A-13D illustrate another embodiment of the signaling device housing configured to deploy a plurality of signaling devices.
Figure 13B:
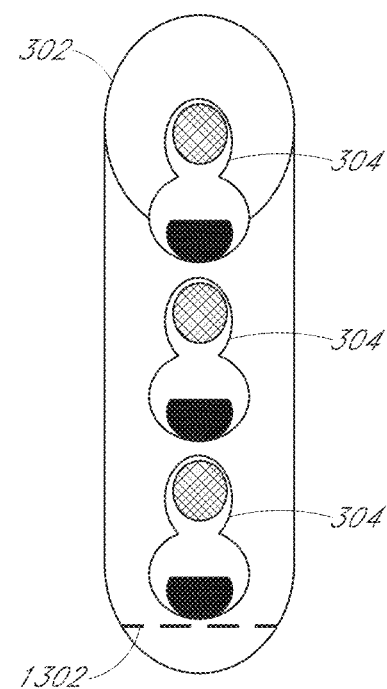
Figure 13C:
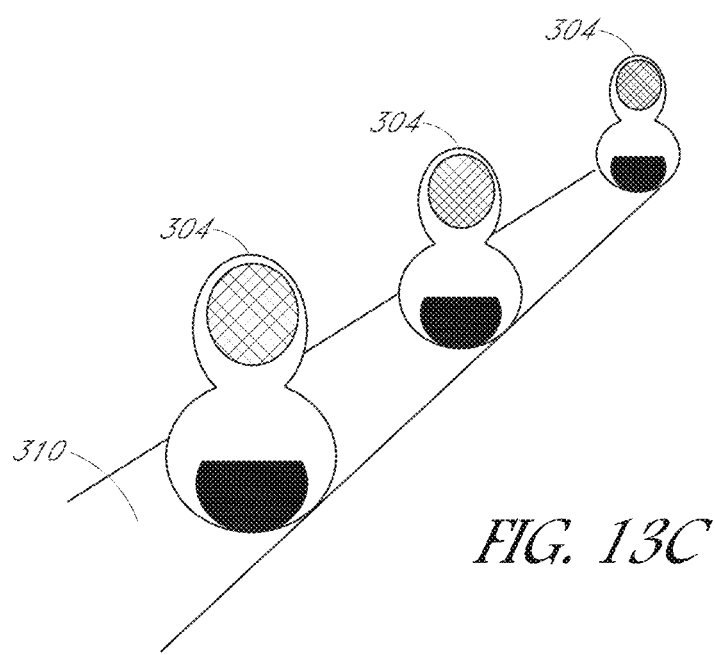
Figure 13D:
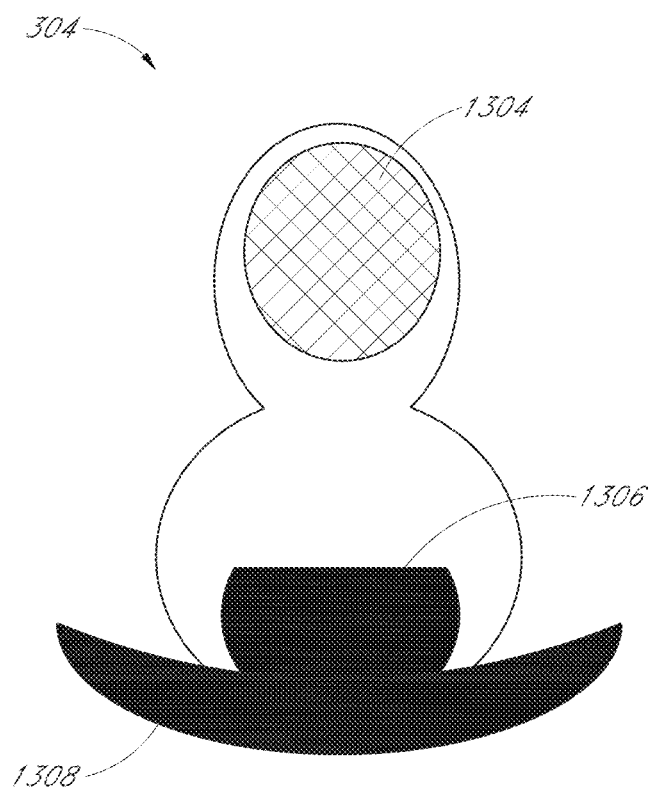

In some implementations and as shown in FIG. 13D, the signaling devices 304 can include one or more of a reflector or light (e.g., LED) 1304, a weighted bottom 1306, and a rubber base 1308. In certain embodiments, the weighted bottom 1360 can be configured to orient the signaling device 304 in the correct orientation as the signaling device 304 is dropped from the autonomous vehicle 105. In certain embodiments, the weighted bottom 1360 can help maintain the correct orientation of the signaling device 304 in various environmental conditions (e.g., wind, rain, etc.).

Some of the advantages associated with using the signaling device system 300 configured to drop the signaling devices 304 include: increased control of the placement of the signaling devices 304, the ability to use the signaling device system 300 on any road surface, the ease of deployment of the signaling devices 304, the low cost of the signaling device system 300, the ability to use disposable signaling devices 304, the ability to store the signaling device system 300 and signaling devices 304 on the autonomous vehicle 105, the ability to include a plurality of signaling device systems 300 on the autonomous vehicle 105, the symmetric design of the signaling device system 300 and signaling devices 304, and the weather resistance of the signaling device system 300 and signaling devices 304.

Figure 14A:
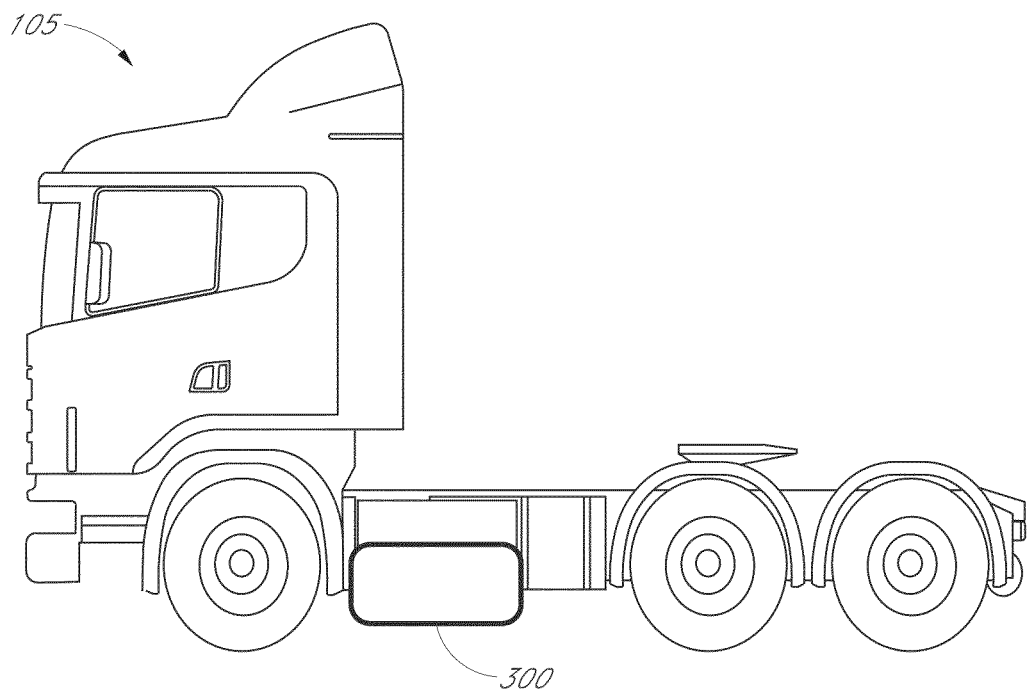
FIGS. 14A and 14B illustrate alternate locations in which the signaling device system described in connection with FIGS. 13A-13D may be stored on the autonomous vehicle.
Figure 14B:
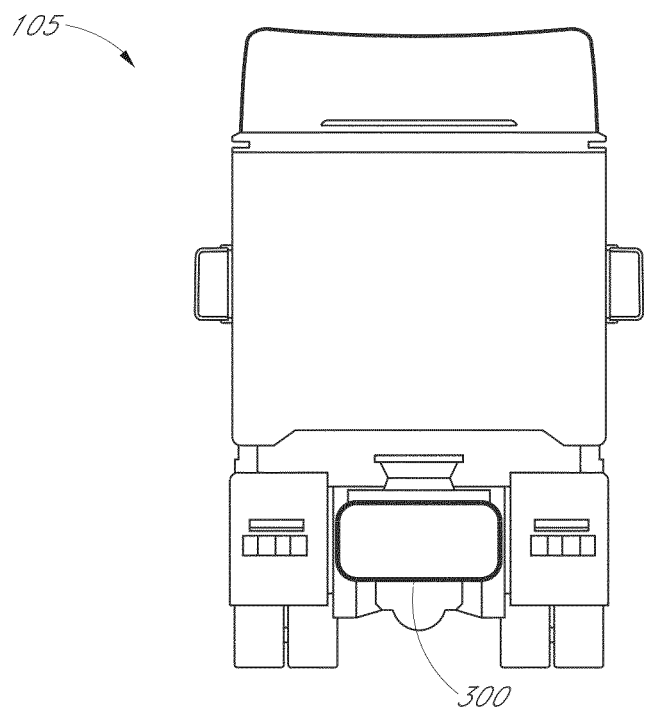

FIGS. 14A and 14B illustrate alternate locations in which the signaling device system 300 described in connection with FIGS. 13A-13D may be stored on the autonomous vehicle 105.

FIGS. 15A-15D illustrate embodiments of a signaling device 304 in accordance with aspects of this disclosure. In some implementations, the signaling devices 304 of FIGS. 15A-15D can be used in the signaling device housing 302 described in connection with FIGS. 13A-13B.

Figure 15A:
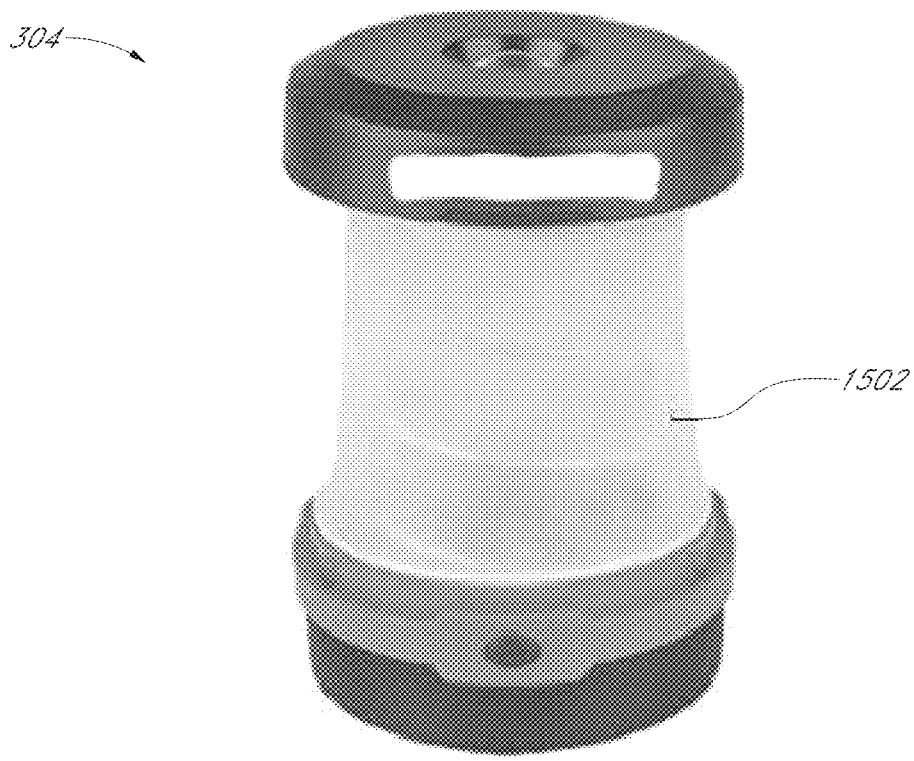
FIGS. 15A-15E illustrate embodiments of a signaling device in accordance with aspects of this disclosure.
Figure 15B:
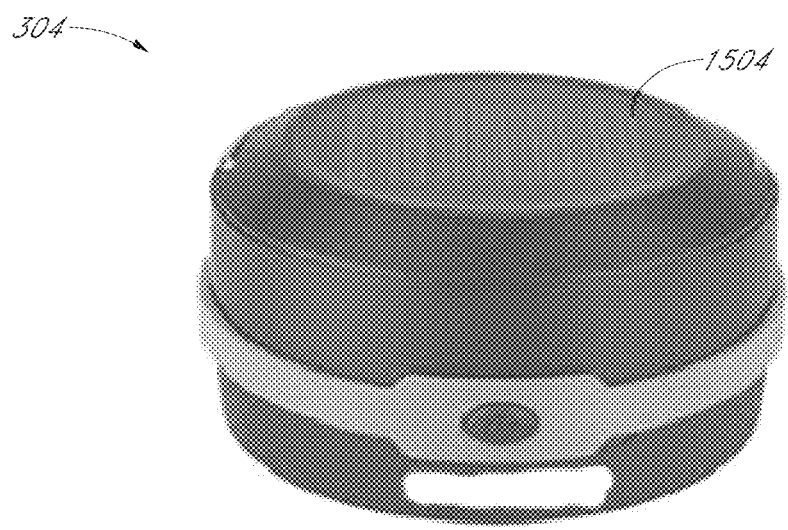
Figure 15D:
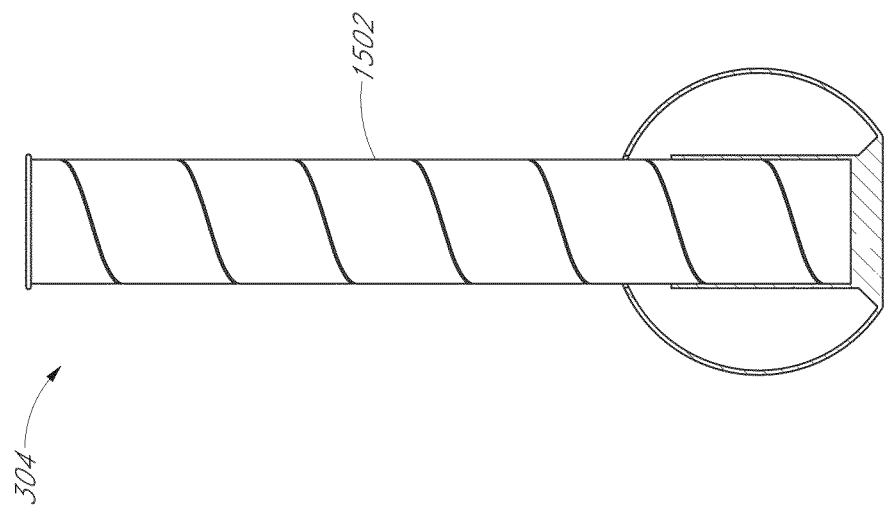
Figure 15C:
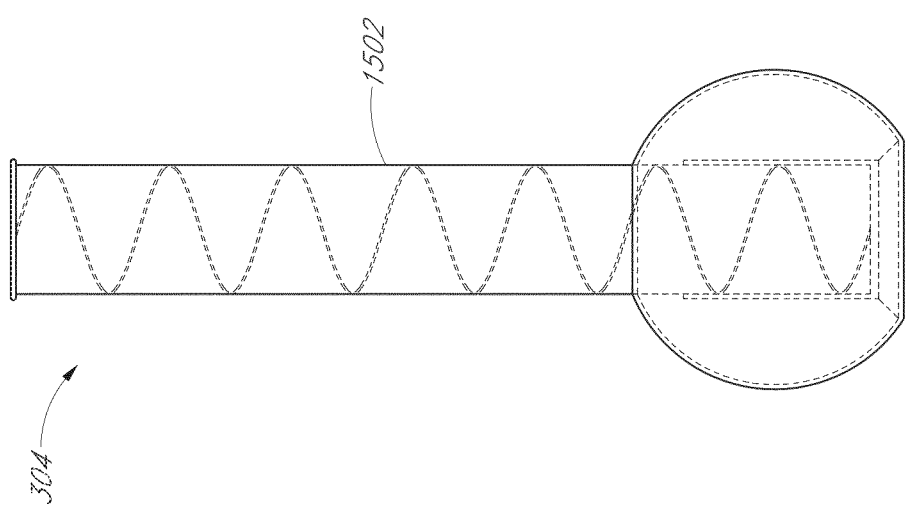
Figure 15E:
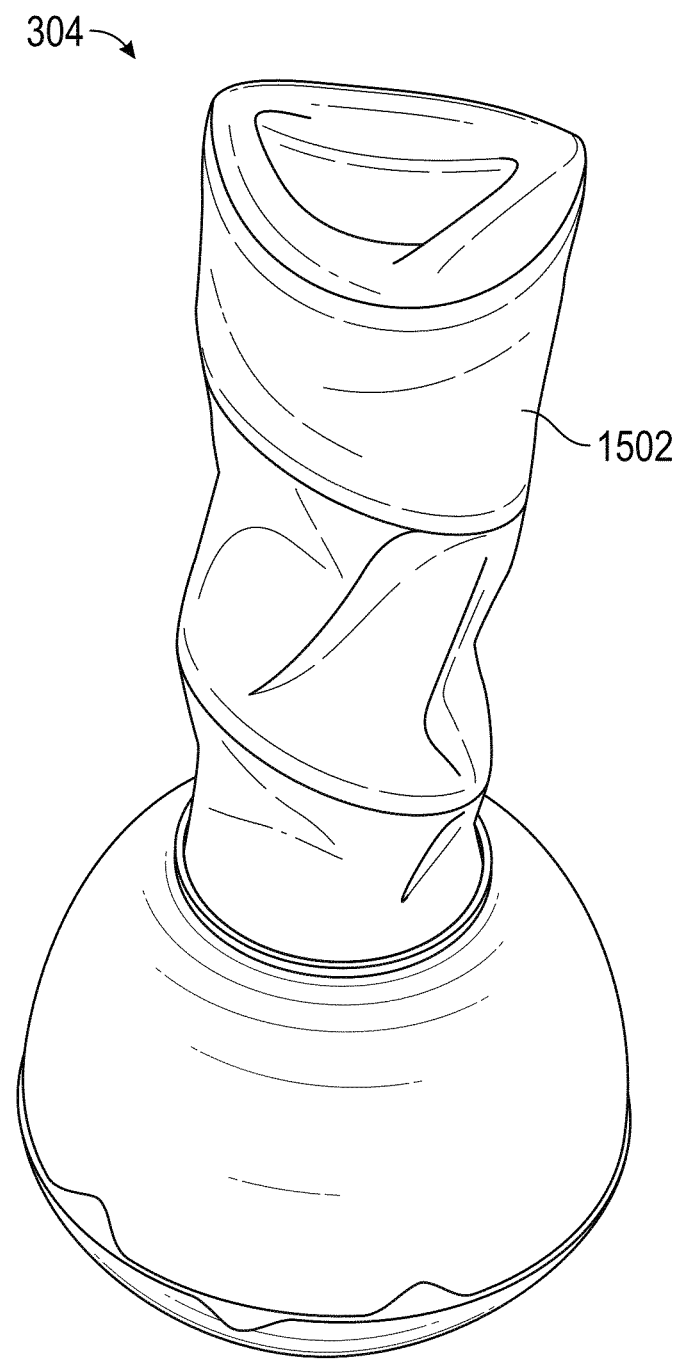

In more detail, FIGS. 15A and 15B illustrate a first embodiment of the signaling device 304 and FIGS. 15C-15E illustrate a second embodiment of the signaling device 304 having similar features to the first embodiment.

Both of the first and second embodiments illustrated in FIGS. 15A-15E can include a spring loaded ball configured to correctly orient the signaling device 304 and to increase the visibility of the signaling device 304 by increasing the size of the device 304 to a size that is larger than the stored size of the device 304. For example, the signaling device 304 according to the illustrated embodiments has the shape of a ball when stored in the signaling device housing 302 as shown in FIG. 15B. After deployment, the ball will land with the weighted side down to ensure that the signaling device 304 is correctly oriented. In certain embodiments, the signaling device 304 can include a soft rubber exterior configured to minimize bounce of the signaling device 304 when dropped, and thus, ensure that the signaling device 304 does not unintentionally roll away from the intended drop location.

In certain embodiments, the signaling device 304 further includes a spring loaded tube 1502. In certain embodiments, the spring loaded tube 1502 can include a delay mechanism to release the spring after a predetermined length of time has elapsed after the signaling device 304 is deployed. For example, the delay may provide sufficient time to allow the signaling device 304 to stop moving after being dropped from the autonomous vehicle 105. In certain embodiments, the signaling device 304 can include a light (e.g., an LED) configured to light the body of the tube 1502 when deployed. In certain embodiments, the signaling device can include a solar panel 1504 configured to charge a battery or directly power the light.

Figure 16A:
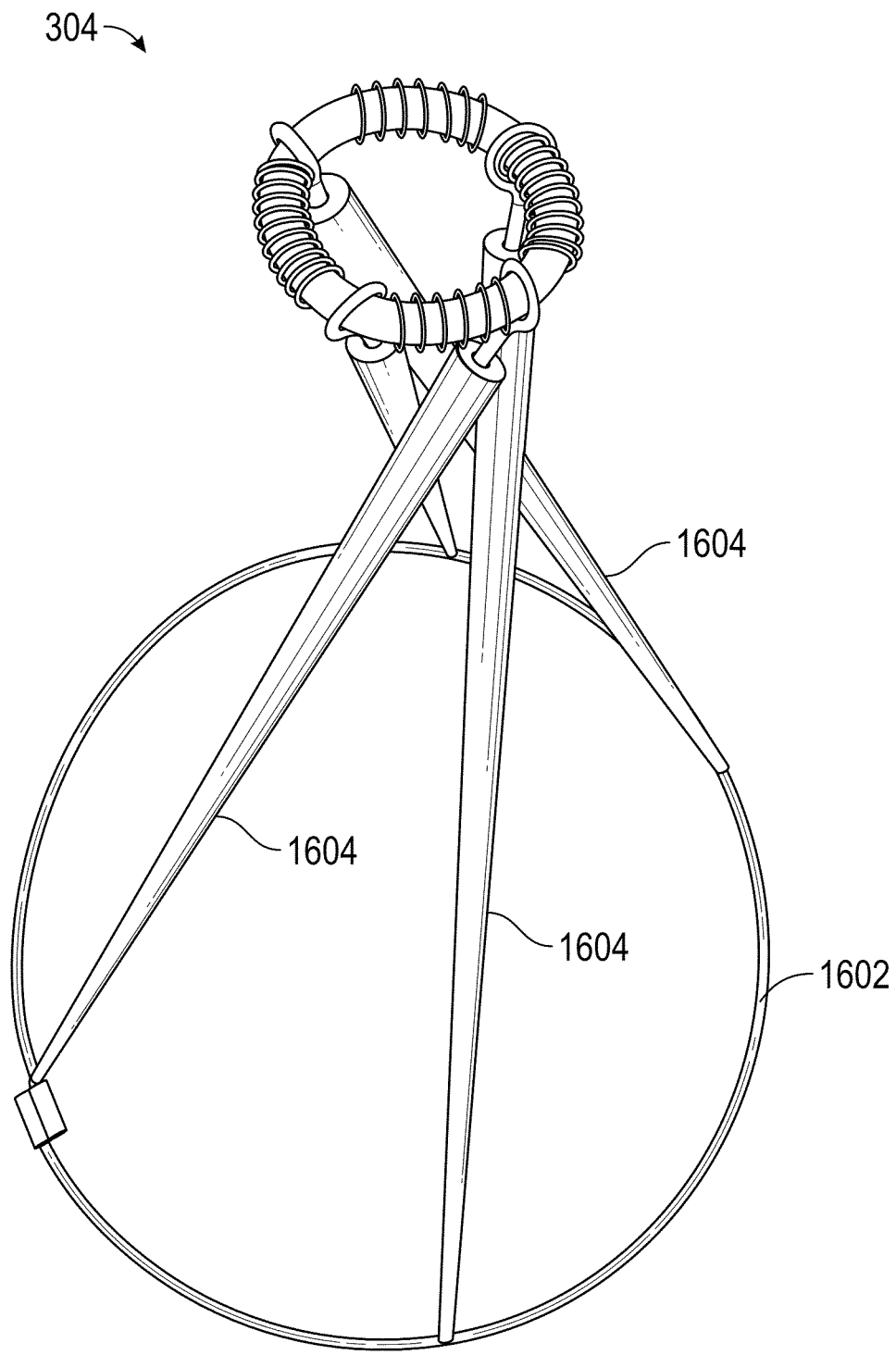
FIGS. 16A-16D illustrate another embodiment of a signaling device in accordance with aspects of this disclosure.
Figure 16C:
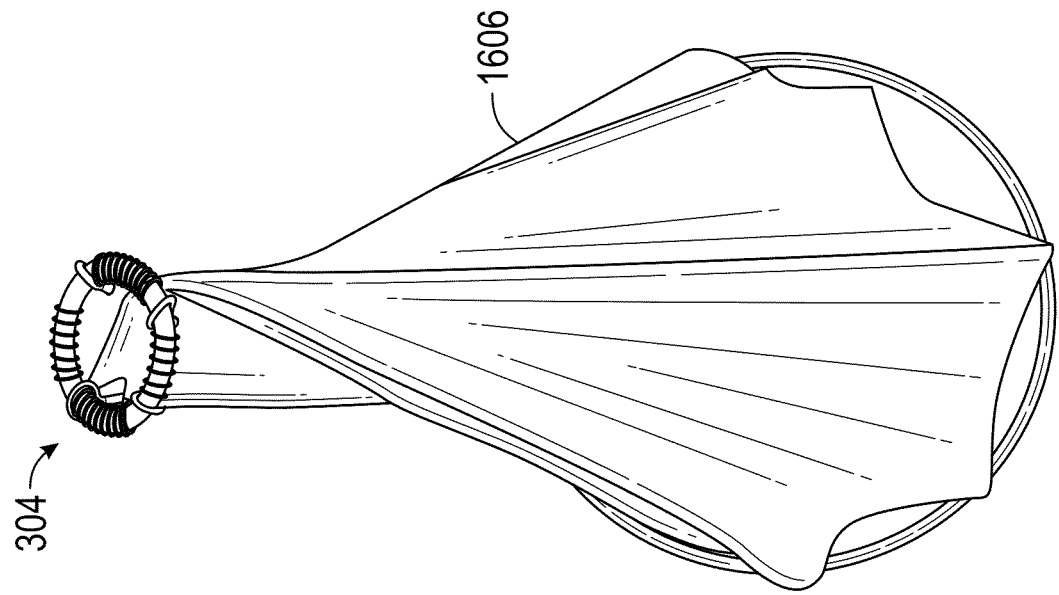
Figure 16B:
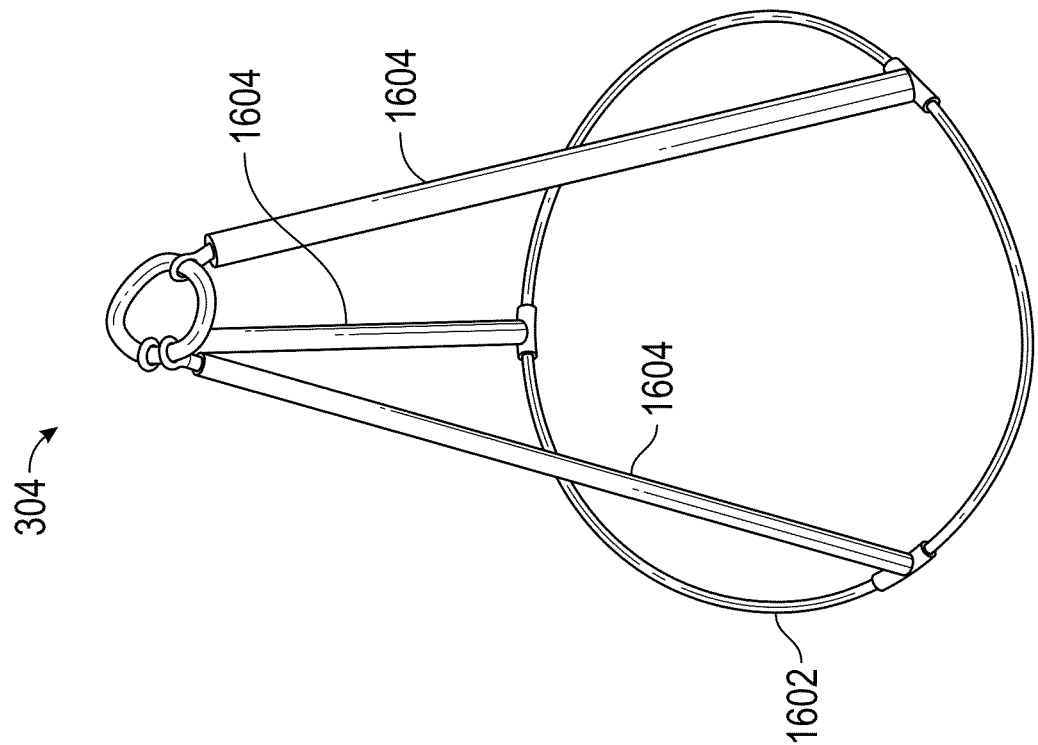
Figure 16D:
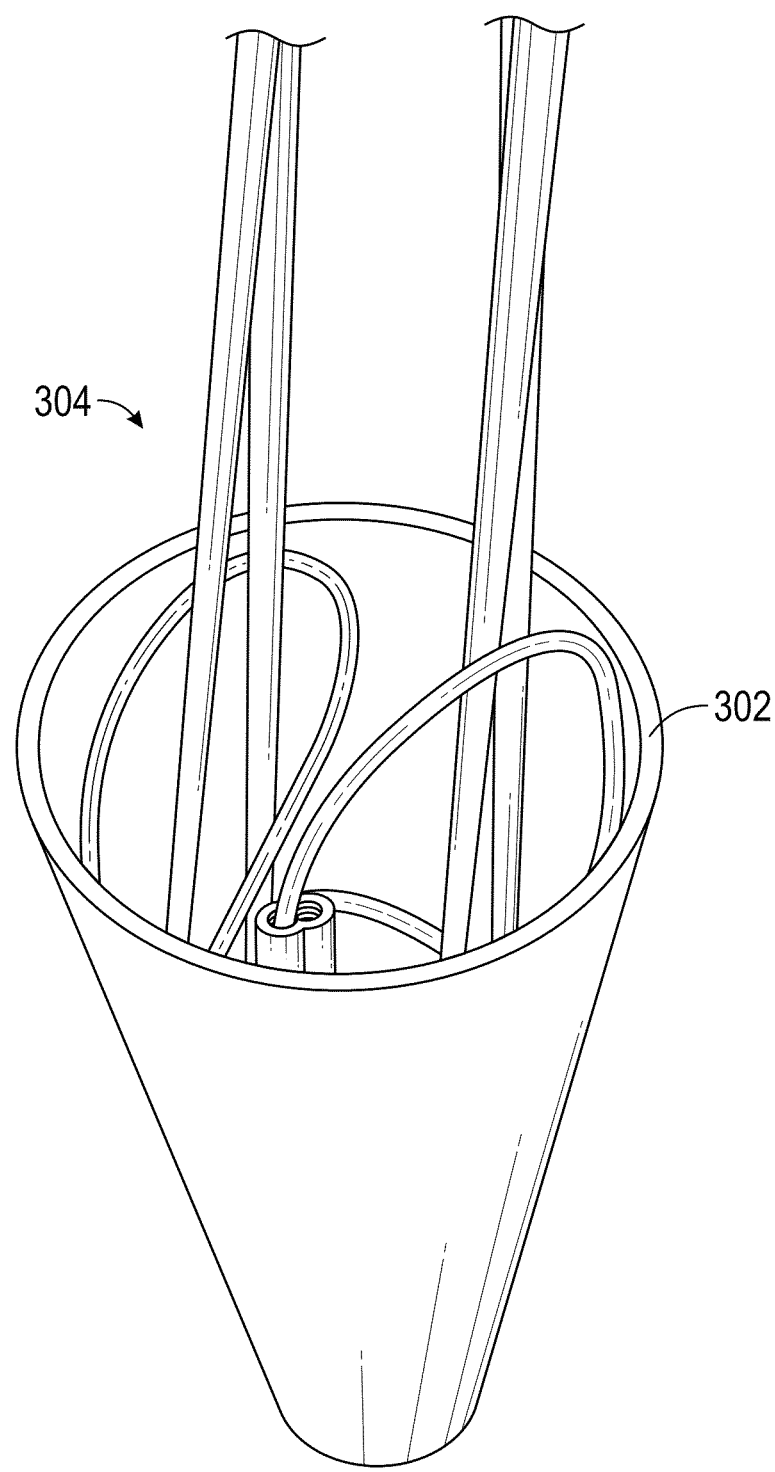

FIGS. 16A-16D illustrate another embodiment of a signaling device 304 in accordance with aspects of this disclosure. In particular, FIGS. 16A and 16B illustrate the internal structure of the signaling device 304 when deployed. FIG. 16C illustrates the deployed signaling device 304 include a reflective cover 1602. FIG. 16D illustrates the signaling device 304 when stored in a signaling device housing 302.

The signaling device 304 illustrated in FIGS. 16A-16D can include a wire rope cone that, when deployed, is configured to form a circle with the wire rope. The cone is configured to be collapsed and stowed in the signaling device housing 302 when not in use. With reference to FIGS. 16A-16D, the signaling device 304 can include a wire rope base 1602, a plurality of poles 1604, and/or a reflective outer cover 1606. In certain embodiments, the poles 1604 can be formed of fiberglass or another material having sufficient strength to support the signaling device 304 when deployed.

Figure 17A:
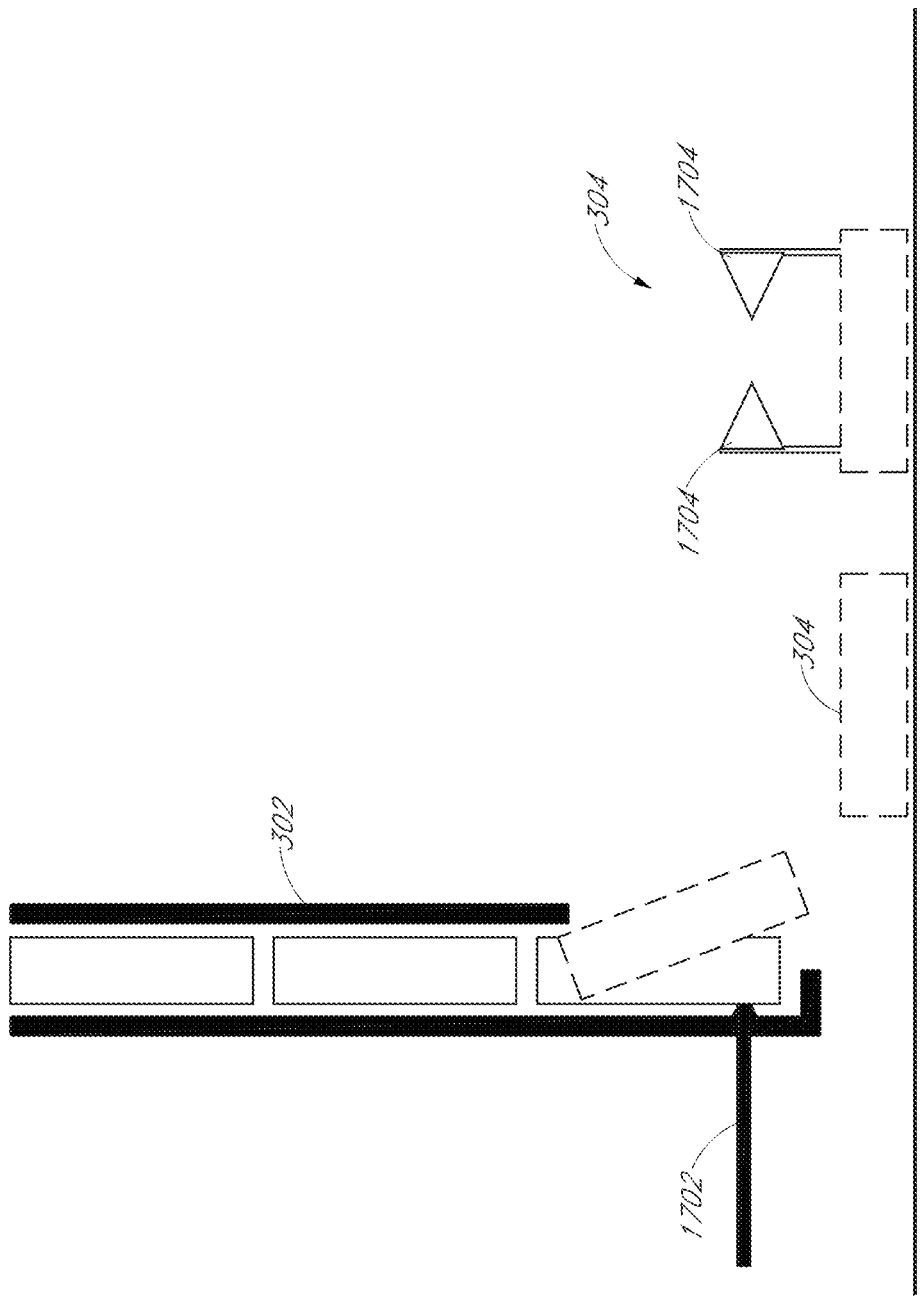
FIGS. 17A-17D illustrate yet another embodiment of a signaling device in accordance with aspects of this disclosure.
Figure 17B:
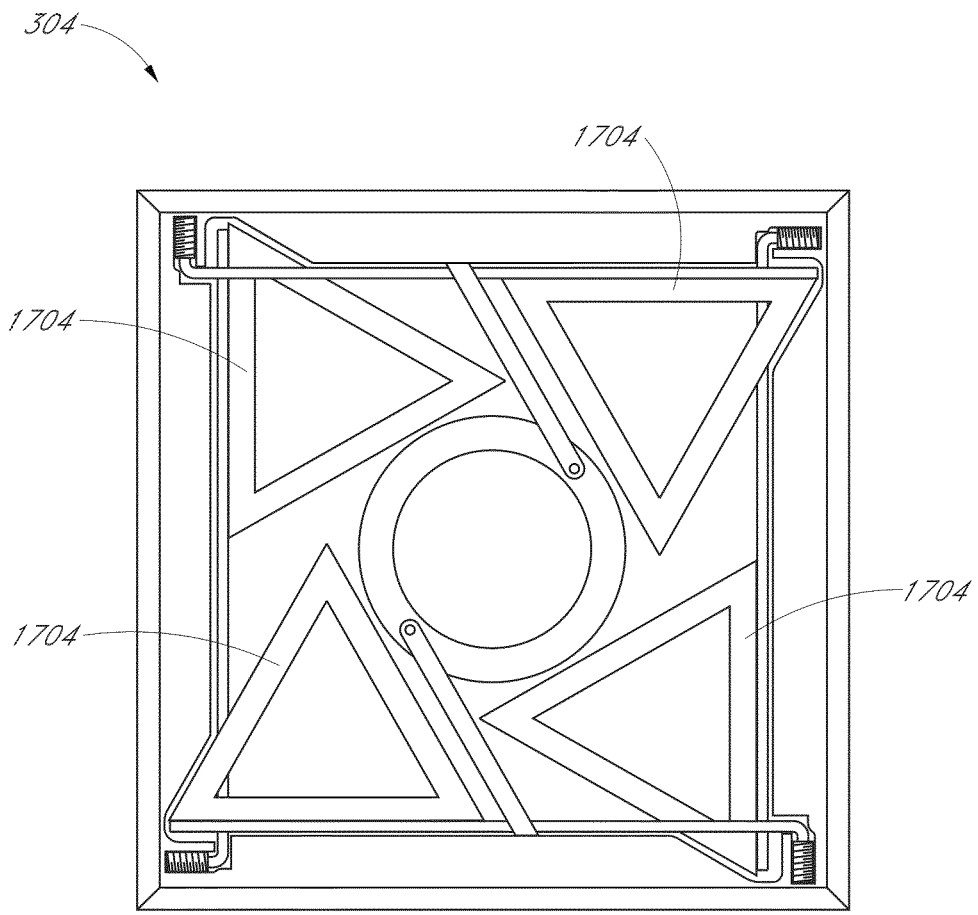
Figure 17C:
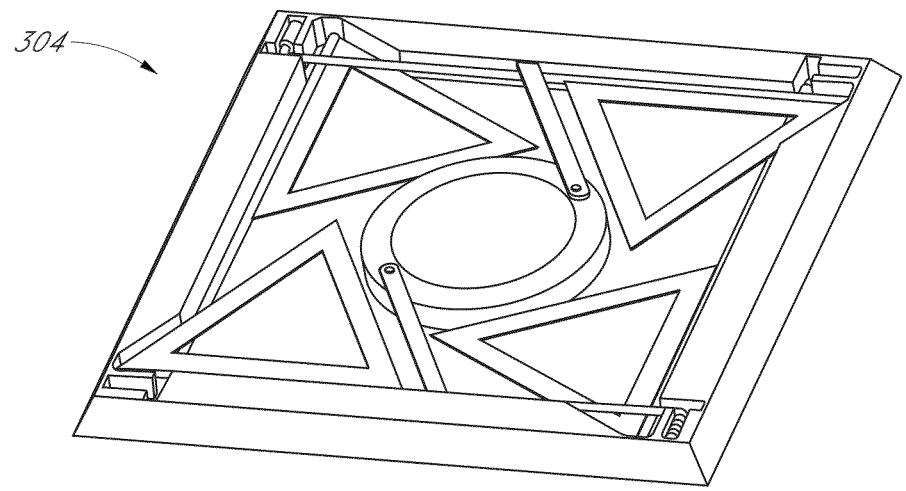
Figure 17D:
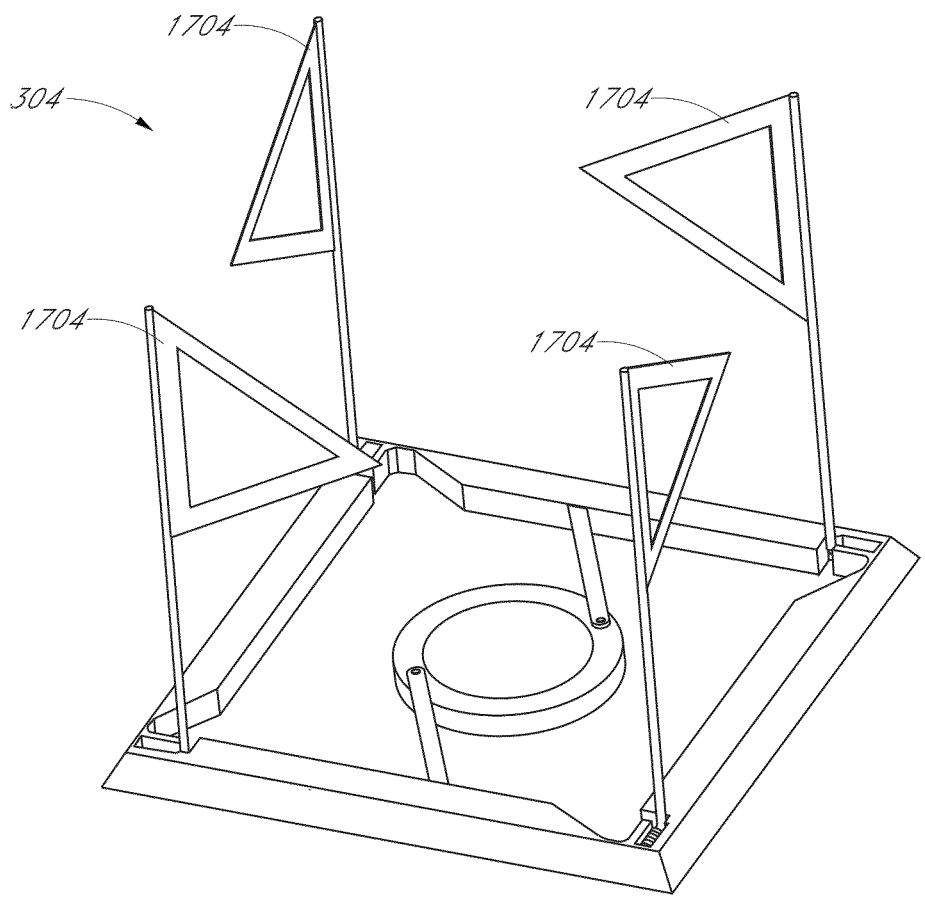

FIGS. 17A-17D illustrate yet another embodiment of a signaling device 304 in accordance with aspects of this disclosure. In particular, FIG. 17A illustrates a plurality of the signaling devices 304 stored within a signaling device housing 302. In certain embodiments, the signaling devices 304 can be deployed from the signaling device housing. FIG. 17B illustrates a plan view of the signaling device 304. FIG. 17C illustrates a perspective view of the signaling device 304 prior to full deployment. FIG. 17D illustrates a perspective view of the signaling device 304 after deployment.

In detail, the signaling device 304 of FIGS. 17A-17D includes a plurality of popup flags 1704. In certain embodiments, the plurality of popup flags 1704 are actuated using one or more torsion springs. The signaling device housing 302 can also include an opening on one side near the bottom and an ejection mechanism, such as a push rod 1702, configured to eject the signaling devices 304 from the signaling device housing 302. Similar to the embodiment of FIGS. 15A-15E, the signaling device 304 may include a delay mechanism coupled to the torsion springs such that the flags 1704 are not deployed until after the signaling device 304 has come to rest on the roadway 310 after being dropped from the autonomous vehicle 105.

Figure 18A:
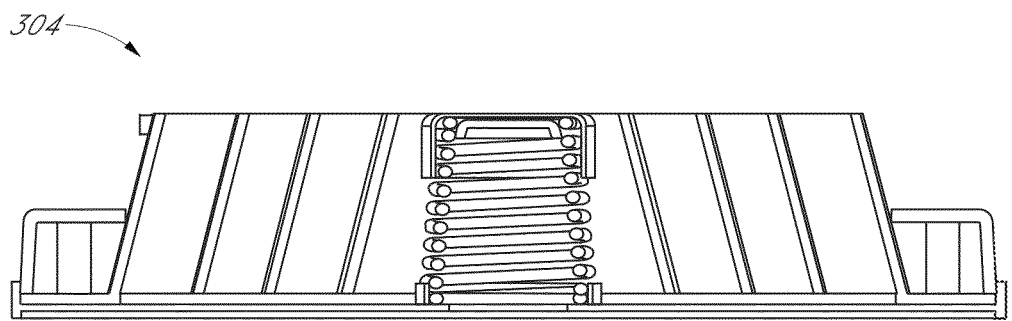
FIGS. 18A-18I illustrate still yet another embodiment of a signaling device in accordance with aspects of this disclosure.
Figure 18B:
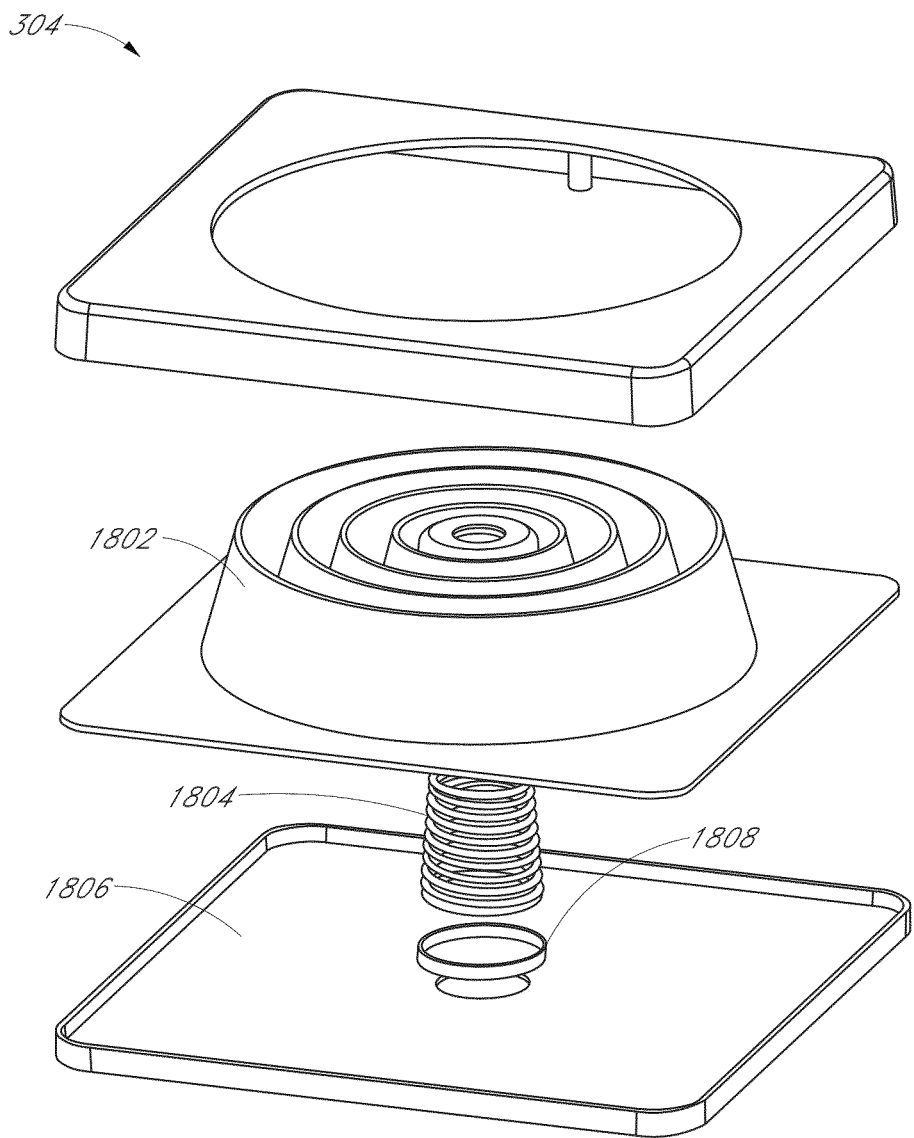
Figure 18C:
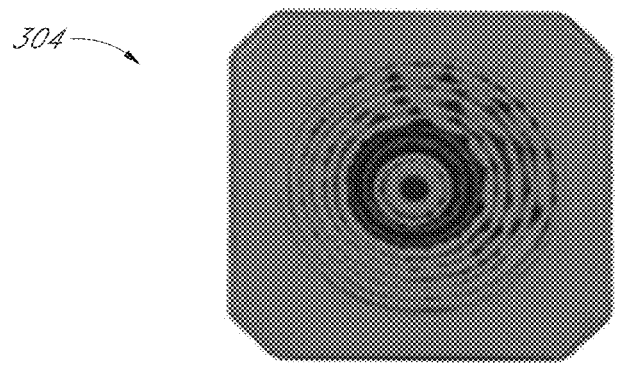
Figure 18D:
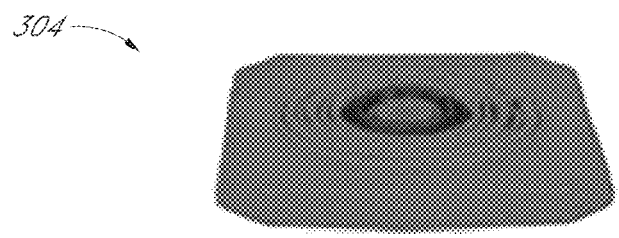
Figure 18E:
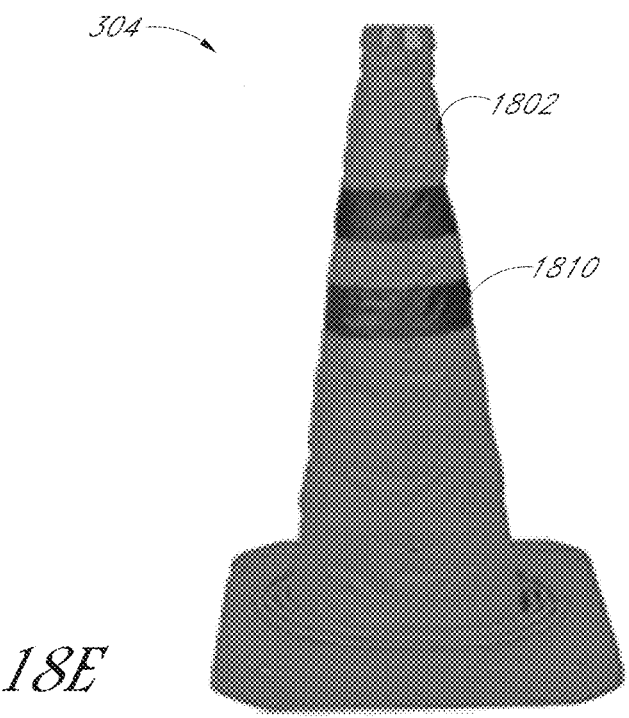
Figure 18F:
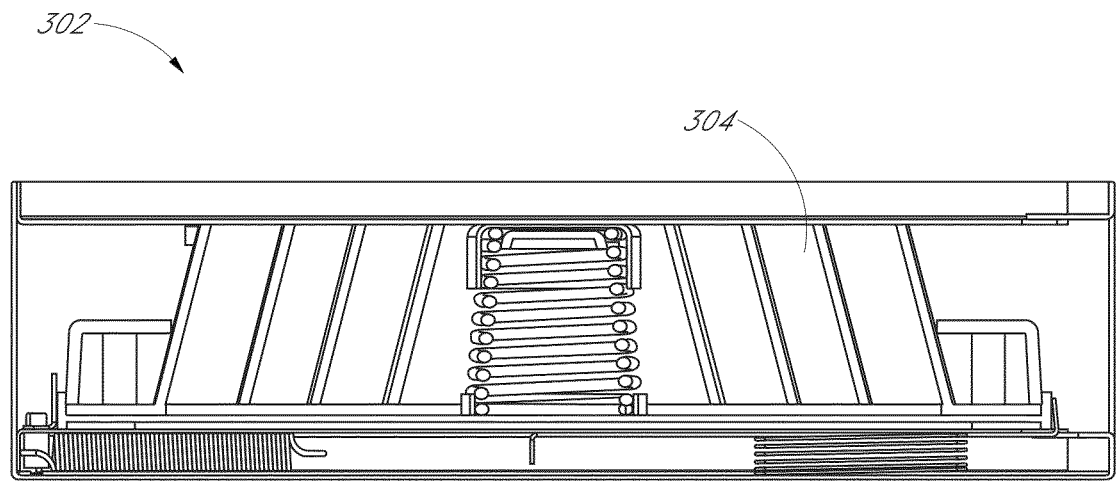
Figure 18G:
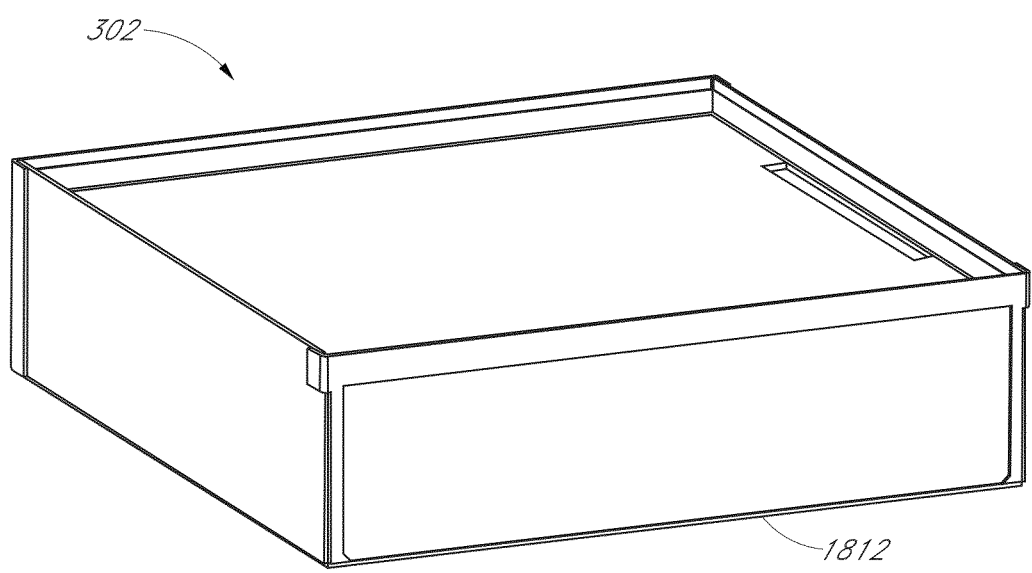
Figure 18H:
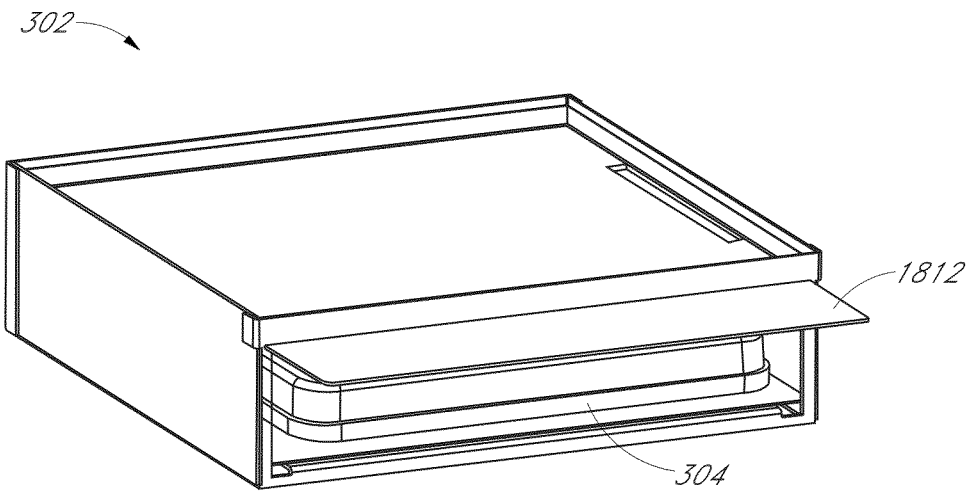
Figure 18I:
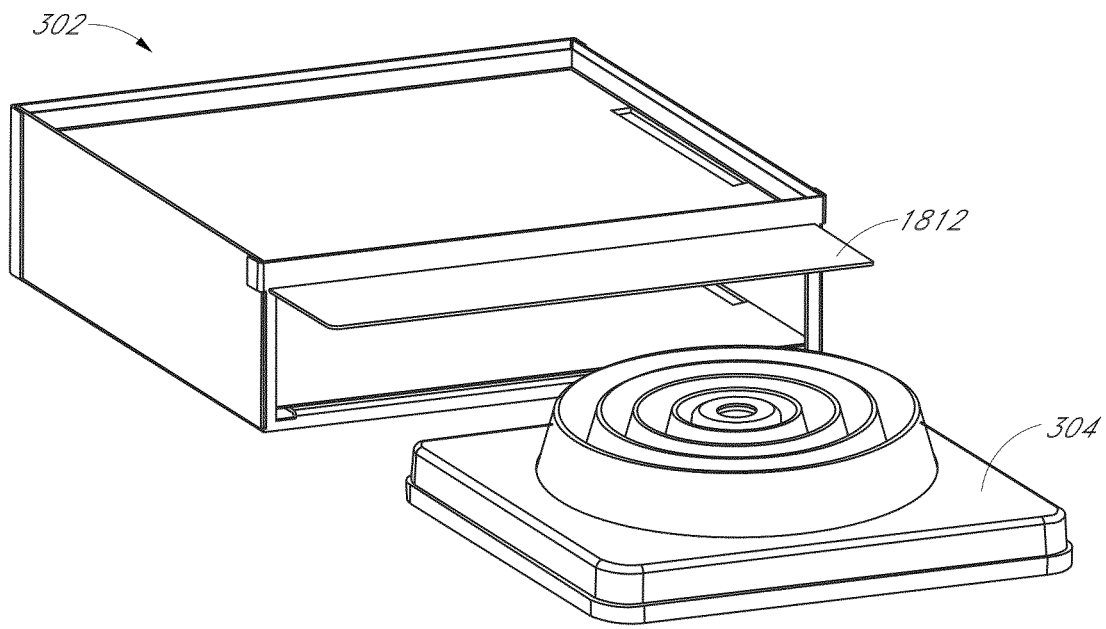

FIGS. 18A-18I illustrate still yet another embodiment of a signaling device 304 in accordance with aspects of this disclosure. In particular, FIG. 18A illustrates the signaling device 304 prior to deployment. FIG. 18B illustrates an exploded view of the signaling device 304. FIG. 18C illustrates a plan view of the signaling device 304 prior to full deployment. FIG. 18D illustrates a perspective view of the signaling device 304 prior to full deployment. FIG. 18E illustrates a perspective view of the signaling device 304 after deployment. FIG. 18F illustrates a cross-sectional view of the signaling device 304 when stored in a signaling device housing 302. FIG. 18G illustrates a perspective view of the signaling device housing 302. FIGS. 18H and 18I illustrates perspective views of the signaling device housing 302 at two stages during deployment of the signaling device 304.

With reference to FIGS. 18A-18I, the signaling device 304 comprises one or more of a spring loaded cone 1802, a spring 1804, a base 1806, and a solenoid 1808. In certain embodiments, the signaling device 304 is configured to be stored in a collapsed configuration. When expanded after deployment in certain embodiments, the signaling device 304 expands to expose reflective material 1810 on the cone 1802. In certain embodiments, the solenoid 1808 can be configured to activate the spring 1804 in order to fully deploy the signaling device 304.

In certain embodiments, the signaling device housing 302 can be configured to house a single signaling device 304 in the collapsed configuration. In certain embodiments, the signaling device housing 302 also includes a door 1812 which is configured to open in order to deploy the signaling device 304. Although not illustrated, the signaling device housing 302 can include an ejection mechanism. In certain embodiments, the ejection mechanism can be a push rod configured to eject the signaling devices 304 from the signaling device housing 302 similar to the embodiment of FIGS. 17A-17D. In certain embodiments, the signaling device housing 302 can be oriented either vertically or horizontally.

Figure 19A:
FIGS. 19A-19E illustrate another embodiment of a signaling device in accordance with aspects of this disclosure.
Figure 19B:
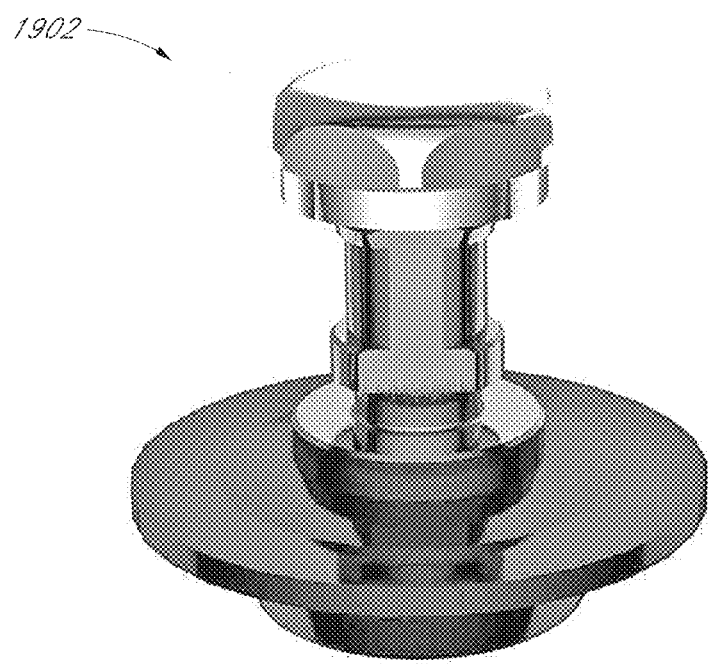
Figure 19C:
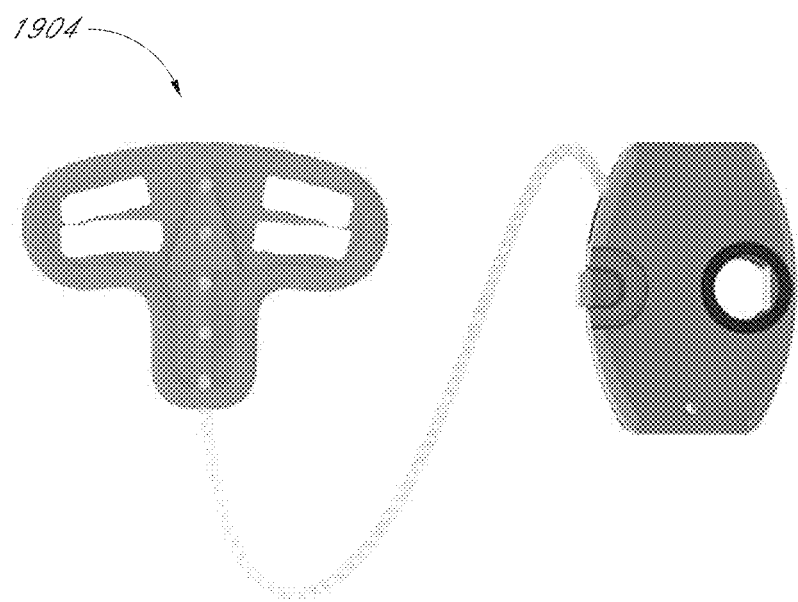
Figure 19D:
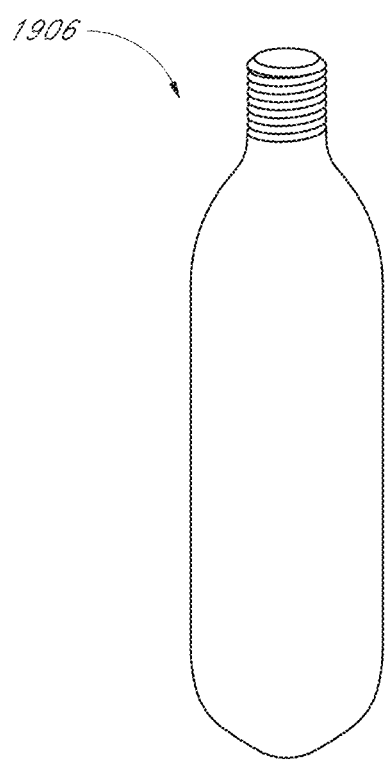
Figure 19E:
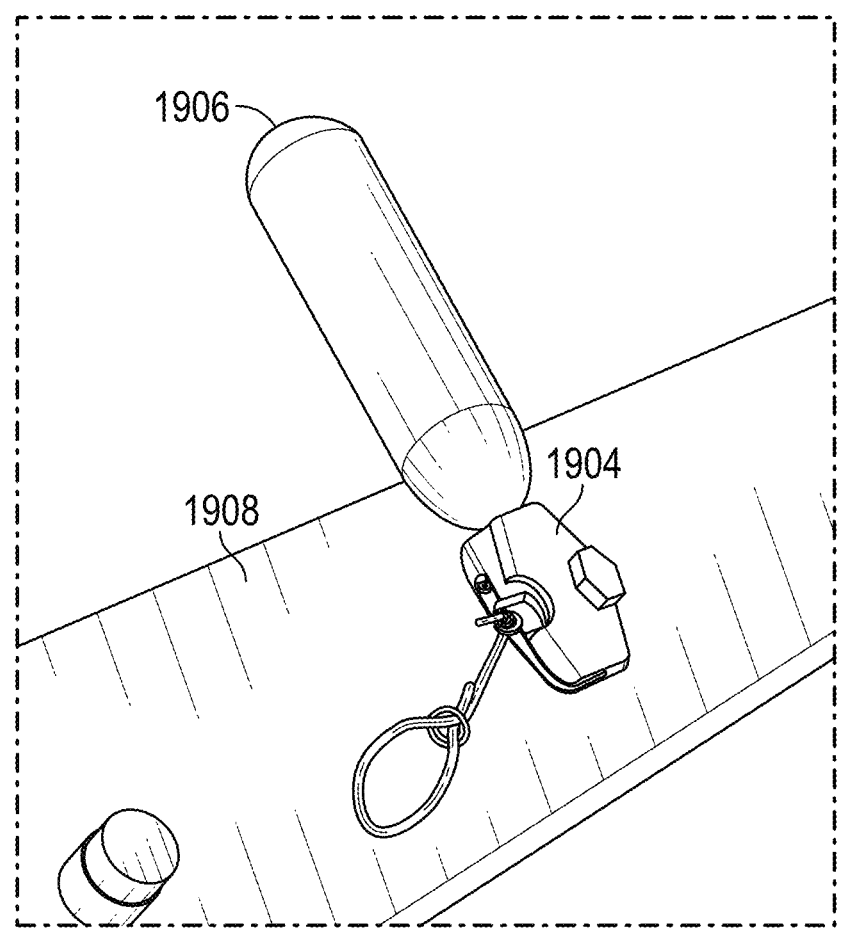

FIGS. 19A-19E illustrate another embodiment of a signaling device 304 in accordance with aspects of this disclosure. In particular, FIG. 19A illustrates the signaling device 304 after deployment. FIG. 19B illustrates a manifold 1902. FIG. 19C illustrates a manifold inflator 1904. FIG. 19C illustrates a pressurized gas cartridge 1906. FIG. 19E illustrates an inflatable bladder 1908.

The signaling device 304 of FIGS. 19A-19E may be similar to the signaling device 304 of FIGS. 18A-18I with the use of an inflatable bladder 1908 in place of the conical spring 1804. In particular, the inflatable bladder 1908 can be connected to the pressurized gas cartridge 1906 (e.g., a $CO_2$ cartridge) via the manifold 1902. The inflator 1904 can be configured to activate the manifold 1902 in order to inflate the inflatable bladder 1908 using the gas from the pressurized cartridge 1906.

Figure 20A:
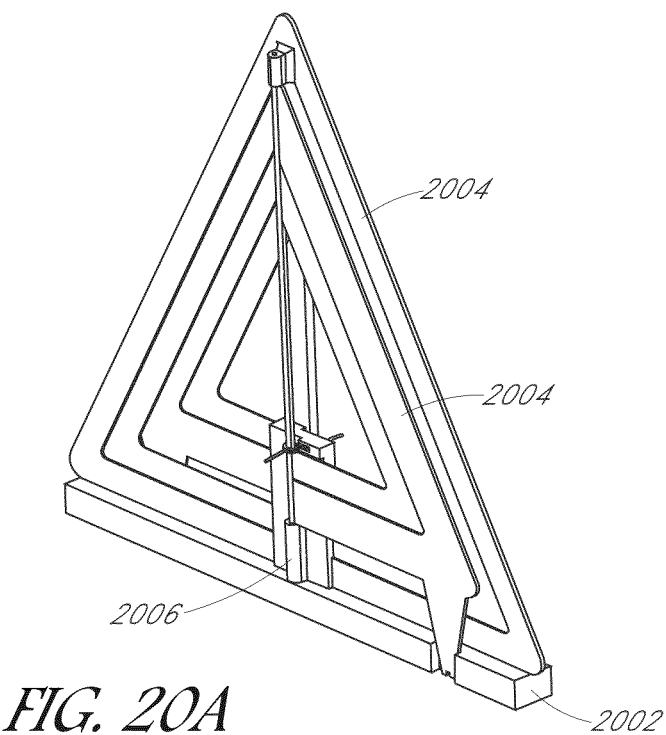
FIGS. 20A and 20B illustrate yet another embodiment of a signaling device in accordance with aspects of this disclosure.
Figure 20B:
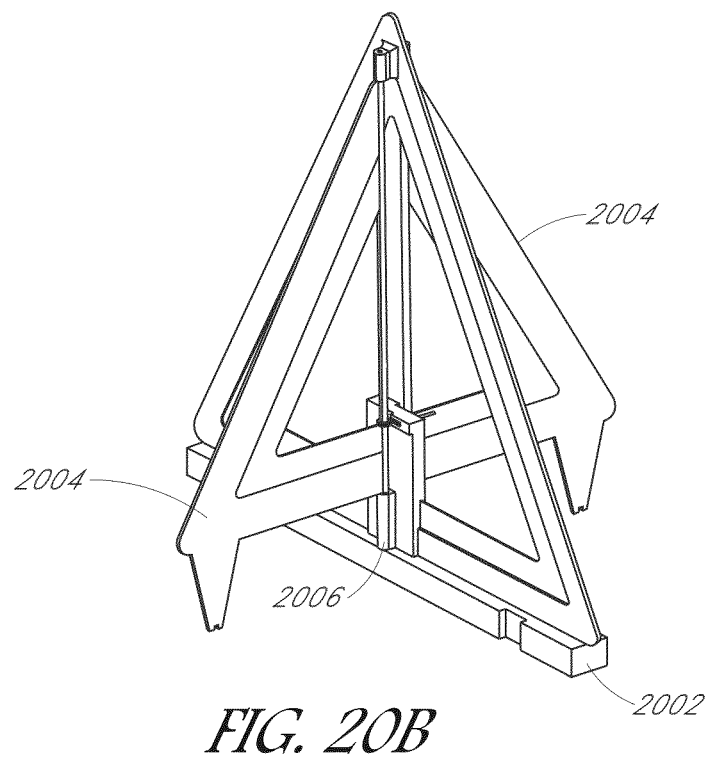

FIGS. 20A and 20B illustrate yet another embodiment of a signaling device 304 in accordance with aspects of this disclosure. In particular, FIG. 20A illustrates the signaling device 304 prior to deployment. FIG. 20B illustrates the signaling device 304 after deployment.

In the implementation of FIGS. 20A and 20B, the signaling device 304 includes a weighted base 2002 and a pair of reflective triangles 2004. In the illustrated embodiment, the signaling device 304 comprises a torsion spring 2006. In certain embodiments, the weighted base 2002 is configured to correctly orient the signaling device 304 after the signaling device 304 is dropped from the autonomous vehicle 105. In certain embodiments, the torsion spring 2006 is configured to rotate at least one of the reflective triangles 2004 such that the reflected triangles 2004 are substantially perpendicular.

Figure 21:
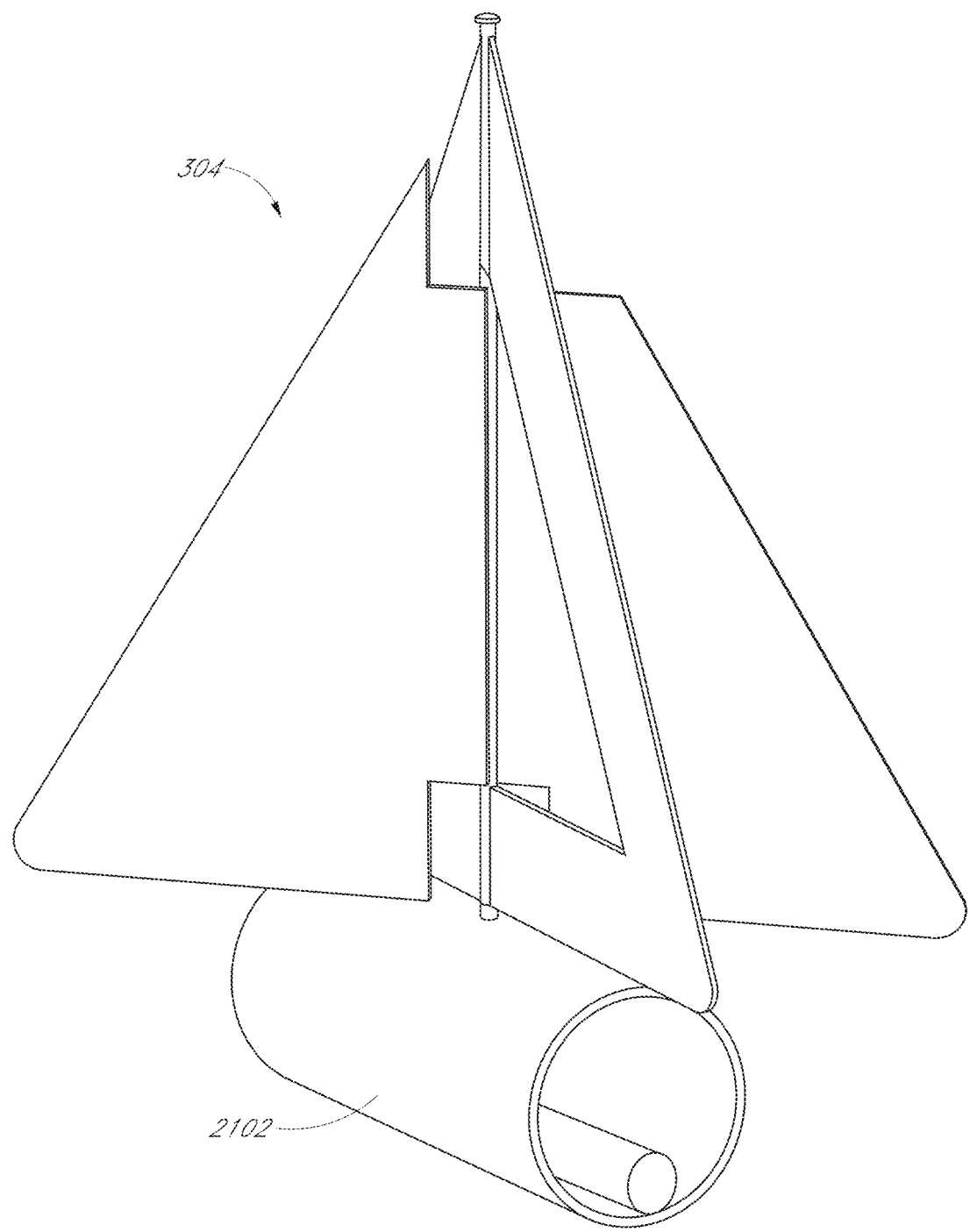
FIG. 21 illustrates still yet another embodiment of a signaling device in accordance with aspects of this disclosure.

FIG. 21 illustrates still yet another embodiment of a signaling device 304 in accordance with aspects of this disclosure. The signaling device 304 of FIG. 21 may be substantially similar to the implementation of FIGS. 20A and 20B with a modified weighted base 2102 and modified reflective triangles 2104. In particular, the weighted based 2102 may have a curved bottom, thereby allowing the signaling device to reorient itself even when dropped at an angle or during extreme weather conditions. Similar to the implementation of FIGS. 20A and 20B, the reflective triangles may be deployed via a torsion spring (not illustrated).

Figure 22A:
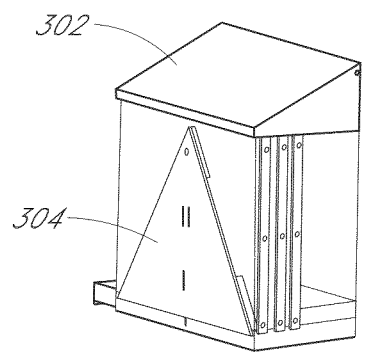
FIGS. 22A-22E illustrate an embodiment of a signaling device housing configured to house a plurality of signaling devices in accordance with aspects of this disclosure.
Figure 22B:
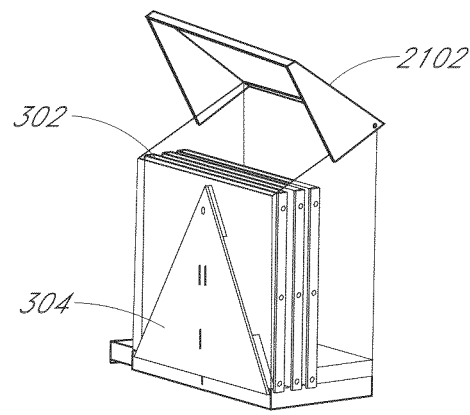
Figure 22C:
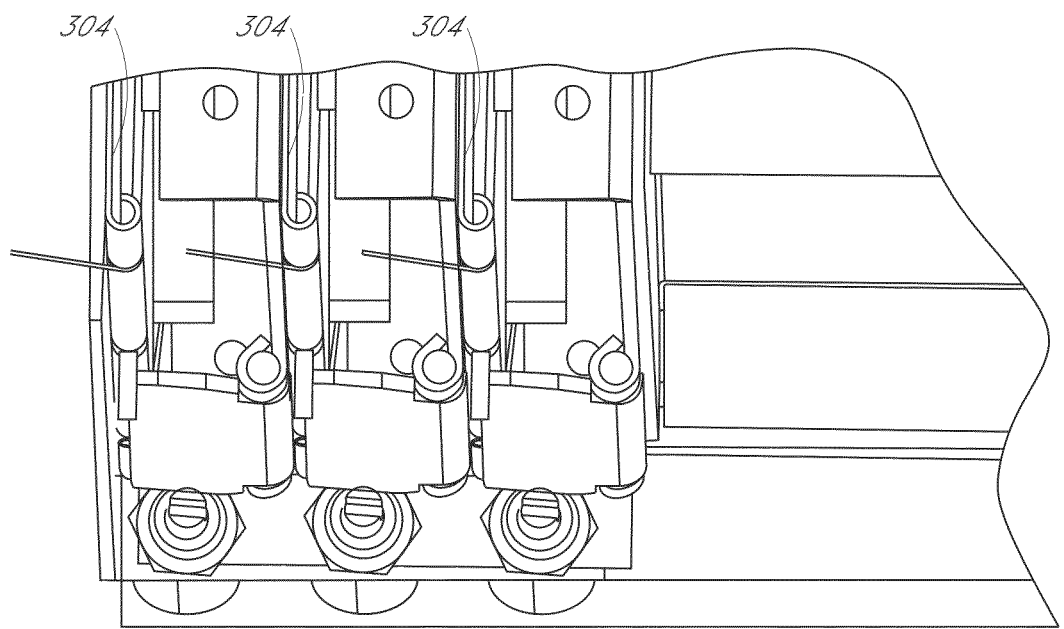
Figure 22D:
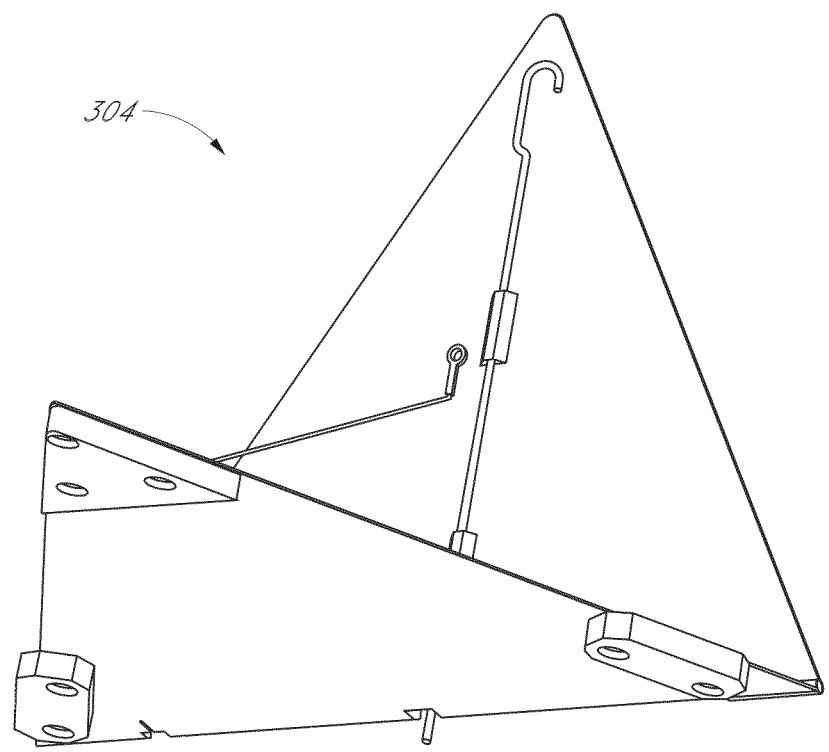
Figure 22E:
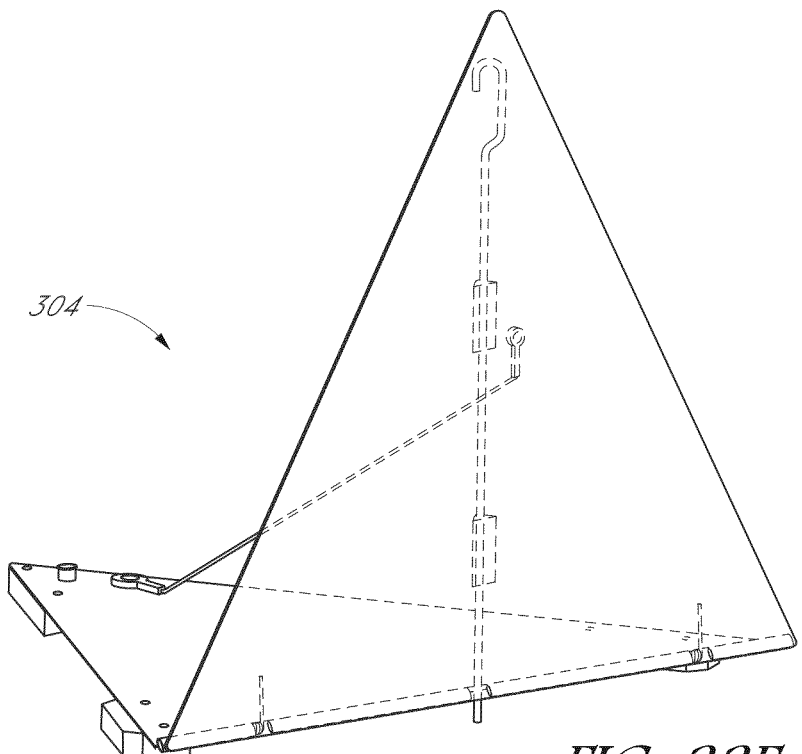

FIGS. 22A-22E illustrate an embodiment of a signaling device housing 302 configured to house a plurality of signaling devices 304 in accordance with aspects of this disclosure. In particular, FIG. 22A illustrates a perspective view of the signaling device housing 302 housing a plurality of signaling devices 304. FIG. 22B illustrates a perspective view of the signaling device housing 302 with an open door 2102. FIG. 22C illustrates a close up view of a portion of the signaling device housing 302. FIGS. 22D and 22E illustrate different perspective view of the signaling device 304. Although FIGS. 22D and 22E illustrate a particular implementation of the signaling device 304, the signaling device housing 302 may also house other signaling devices 304, such as those illustrated in FIGS. 20A, 20B, and 21.

Figure 23A:
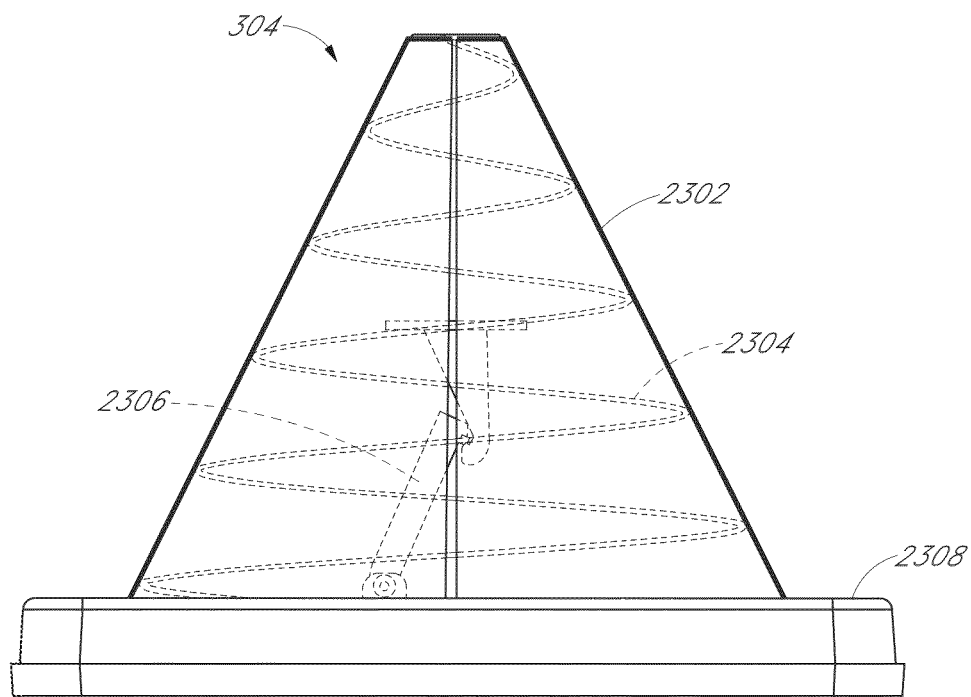
FIGS. 23A-23D illustrate another embodiment of a signaling device in accordance with aspects of this disclosure.
Figure 23B:
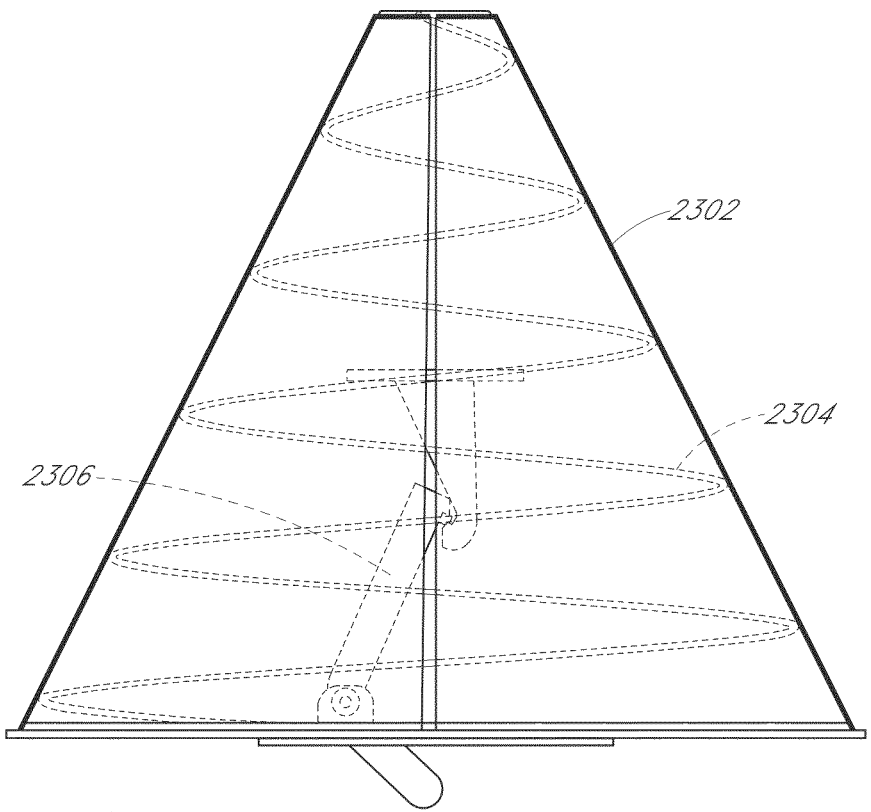
Figure 23C:
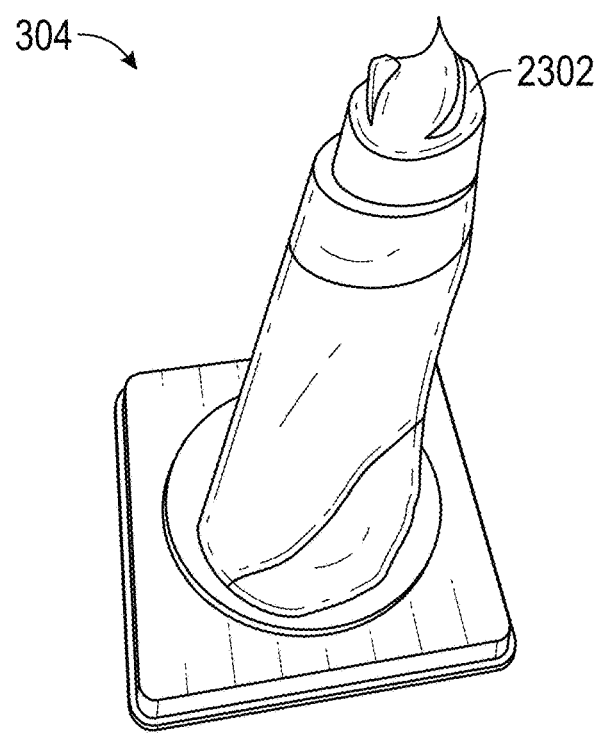
Figure 23D:
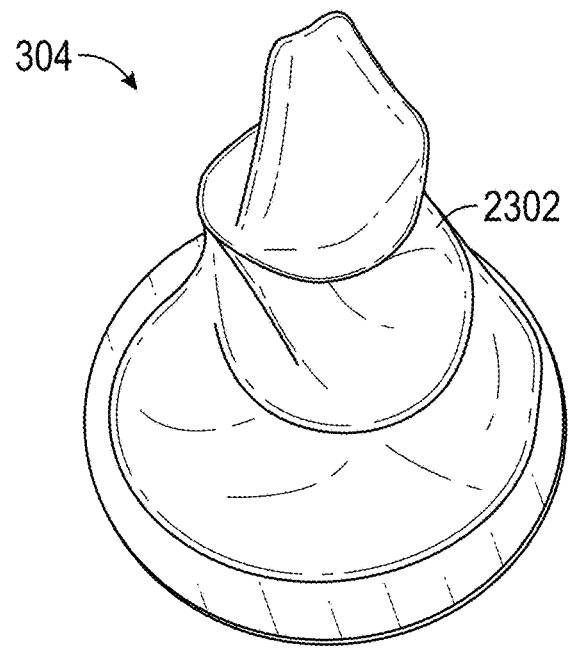

FIGS. 23A-23D illustrate another embodiment of a signaling device 304 in accordance with aspects of this disclosure. In particular, FIG. 23A illustrates a side view of the signaling device 304 after deployment. FIG. 23B illustrates a partial view of the signaling device 304 after deployment without a base 2308. FIGS. 23C and 23D illustrate perspective views of alternative implementations of the signaling device 304 of FIGS. 23A and 23B.

With reference to FIGS. 23A and 23B, in certain embodiments, the signaling device 304 includes one or more of a reflective cone 2302, a spring 2304, a deployment mechanism 2306, and a base 2308. As shown in FIGS. 23C and 23D, the reflective cone 2302 can have various shapes without departing from this disclosure.

Figure 24A:
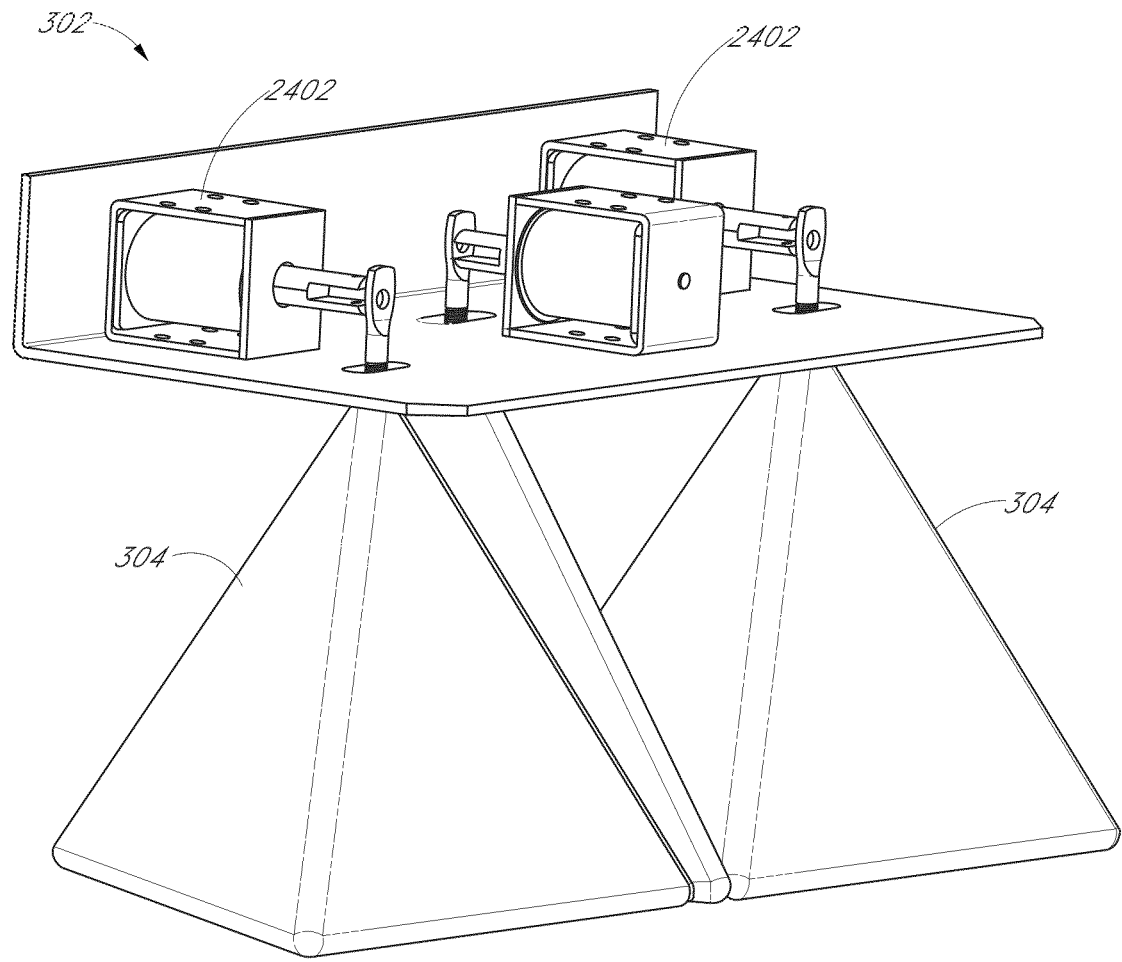
Figure 24D:
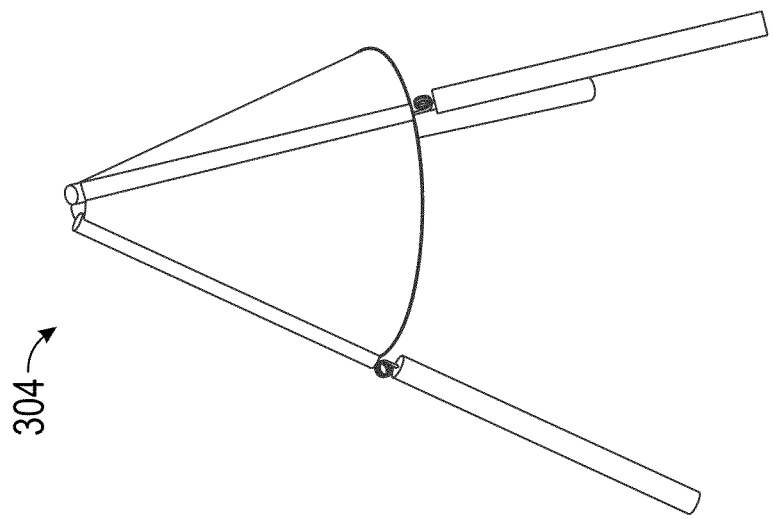
Figure 24C:
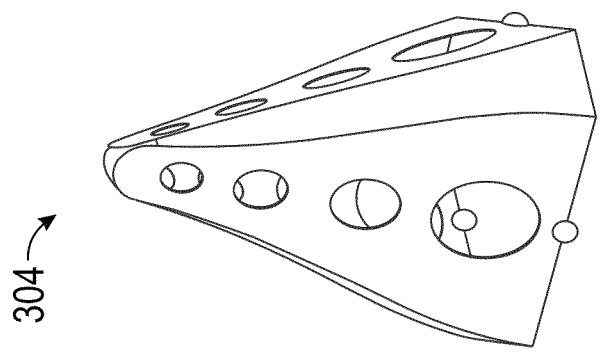
Figure 24B:
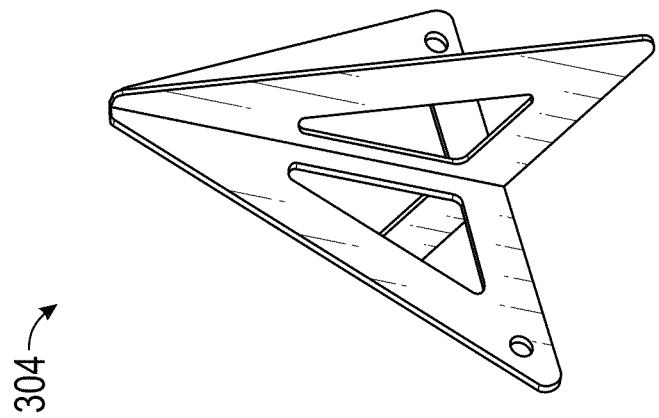

FIGS. 24A-24F illustrate yet another embodiment of a signaling device 304 and signaling device housing 302 in accordance with aspects of this disclosure. In particular, FIG. 24A illustrates a perspective view of a signaling device housing 302 configured to house a plurality of signaling devices 304. In certain embodiments, the plurality of signaling devices 304 do not expand or collapse when moved between stored and deployed states. FIGS. 24B-24F illustrate different embodiments of the signaling devices 304 which can be housed via the signaling device housing 302.

With reference to FIG. 24A, the signaling device housing 302 can be configured to couple to upper portions of the plurality of signaling devices 304. The signaling device housing 302 can include a plurality of actuators 2402 configured to release the corresponding signaling device 304 in accordance with the predefined criteria for the placement of the signaling devices 304.

In certain embodiments, the signaling device housing 302 can house different types of signaling devices 304. For example, in certain embodiments where the signaling device housing 302 couples to a common attachment point on the plurality of signaling devices 304, as long as the different signaling devices 304 have the same common attachment point the signaling device housing 302 can house the signaling device 304. FIGS. 24B-24F illustrate different embodiments of signaling devices 304 which can be housed by the signaling device housing 302 of FIG. 24A. FIGS. 24E and 24F illustrate an embodiment of a signaling device 304 that comprises a light configured to be activated once the signaling device 304 has been dropped from the signaling device housing 302 as shown in FIG. 24F.

Figure 25A:
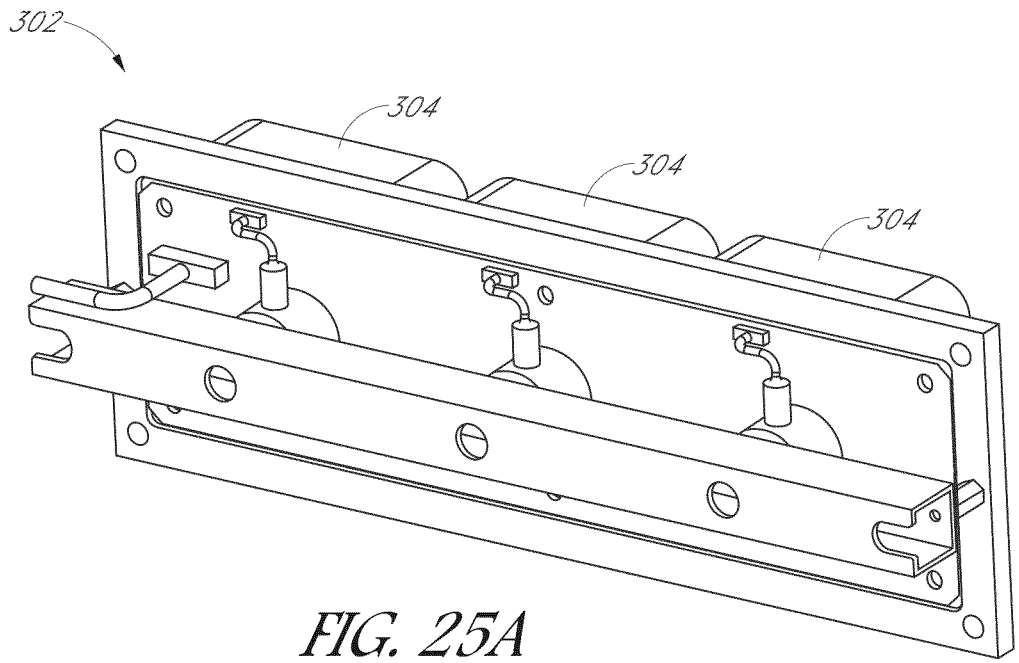
FIGS. 25A-25H illustrate still yet other embodiments of a signaling device and signaling device housing in accordance with aspects of this disclosure.
Figure 25B:
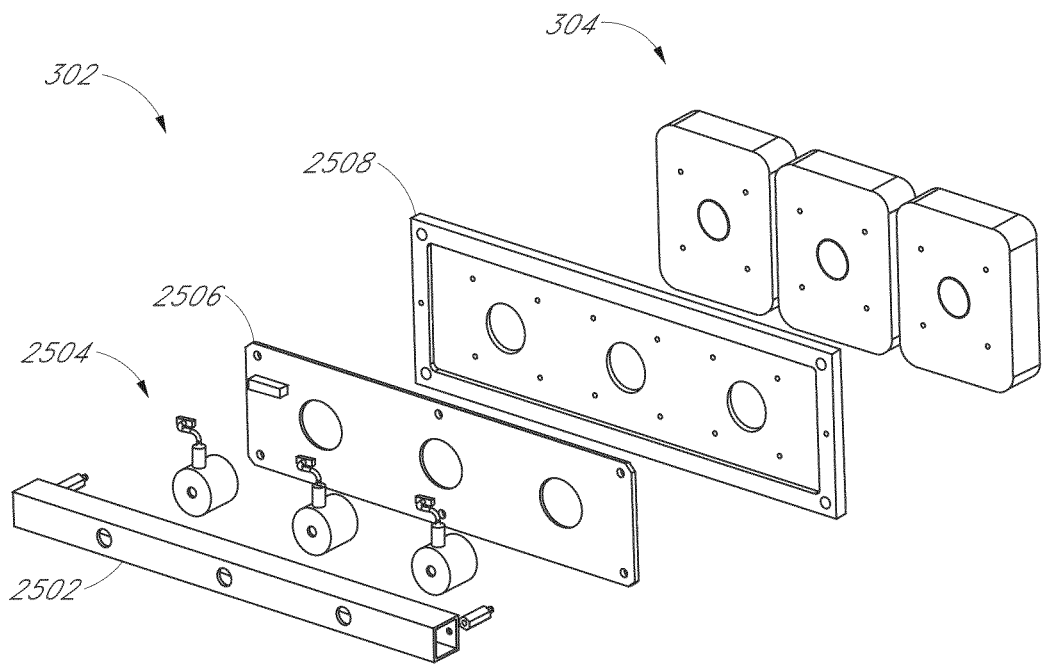
Figure 25C:
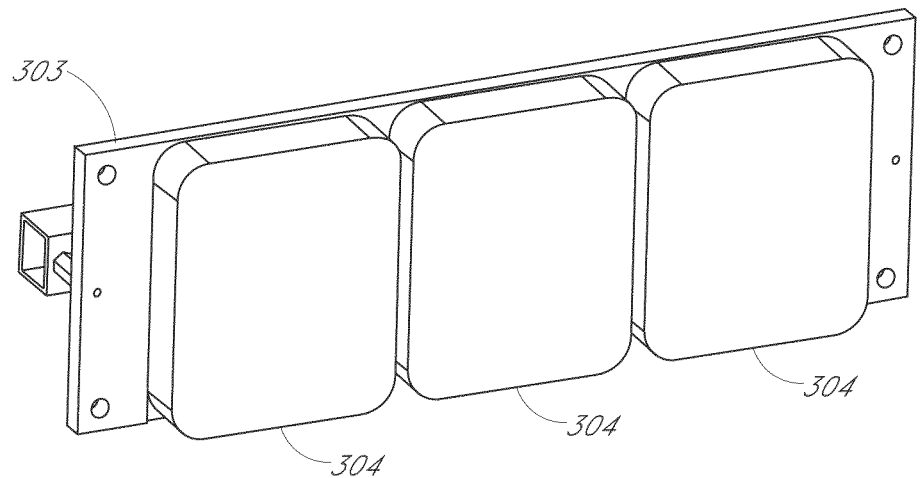
Figure 25D:
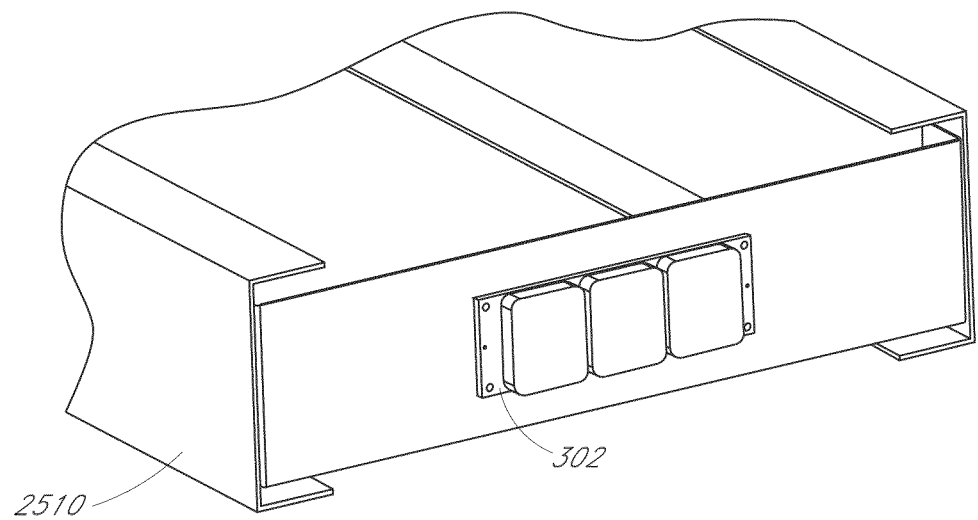
Figure 25E:
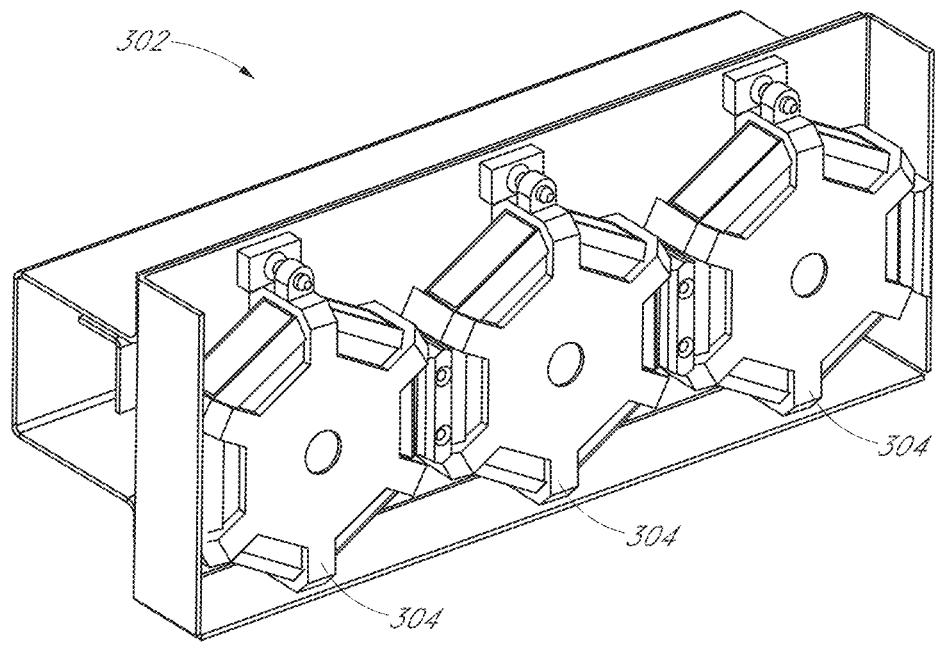
Figure 25F:
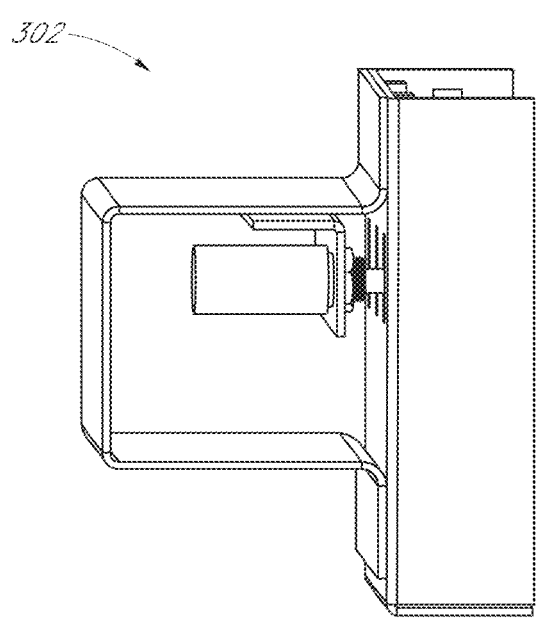
Figure 25G:
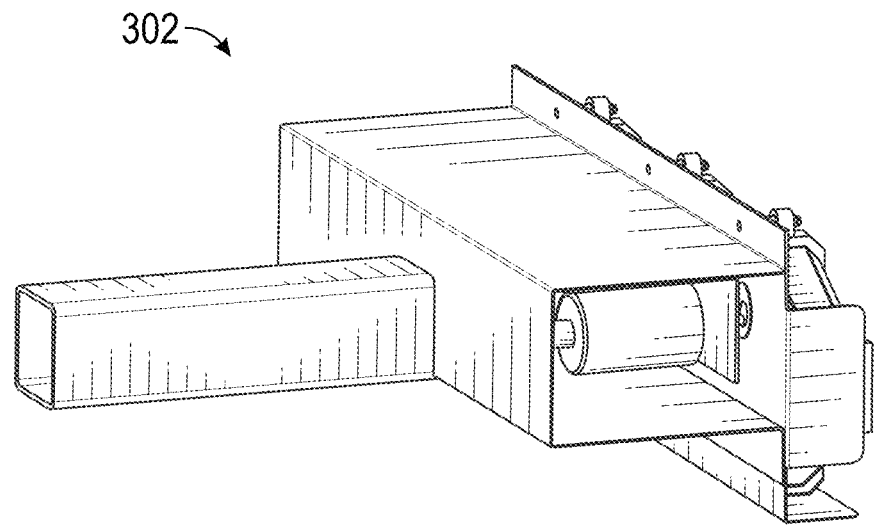
Figure 25H:
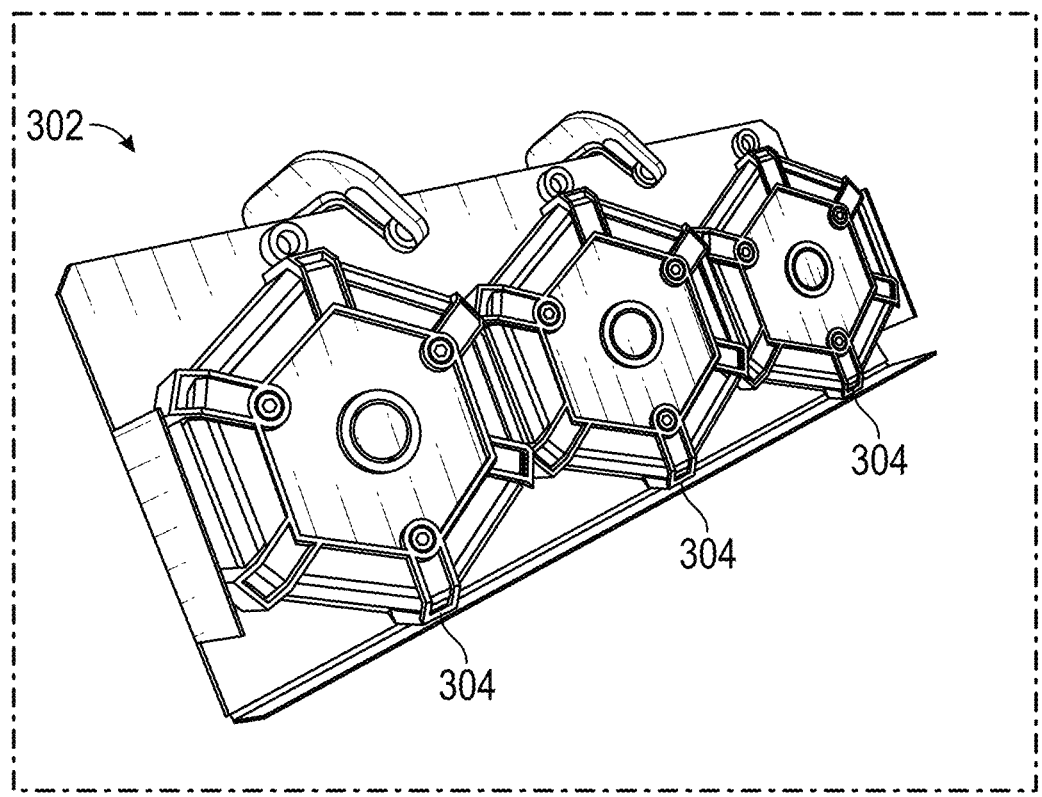

FIGS. 25A-25H illustrate still yet other embodiments of a signaling device 304 and signaling device housing 302 in accordance with aspects of this disclosure. In particular, FIG. 25A illustrates a perspective view of a signaling device housing 302 configured to house a plurality of signaling devices 304. FIG. 25B illustrates an exploded view of the signaling device housing 302. FIGS. 25C-25D provide perspective views of the signaling devices 304 when attached to the signaling device housing 302. FIGS. 25E-25H provide a plurality of views of a signaling device 304 and signaling device housing 302 according to an alternate embodiment.

In the embodiments of FIGS. 25A-25H, each of the signaling devices 304 may include an LED, a battery (not illustrated) configured to power the LED, and a travel solenoid (not illustrated) configured to push the LED out of a holding position. In some embodiments, the signaling devices 304 may not include an on/off switch and may be configured to automatically turn on when pushed out of the holding position. With reference to FIG. 25B, the signaling device housing 302 includes a bar 2502, a plurality of actuators and/or charging contacts 2504, a circuit board 2506, and a cover 2508. In certain embodiments, the circuit board 2506 and the cover 2508 each include a plurality of holes through which the signaling devices 304 can be connected to the actuators 2504. In certain embodiments, in response to receiving a signal to deploy the signaling devices 304, the actuators 2504 are configured to release the signaling devices 304 and drop the signaling devices 304 onto the roadway 310. The signal to deploy the signaling devices 304 may be configured to drop the signaling devices 304 in accordance with the predefined criteria for placement of the signaling devices 304. The signaling devices 304 may be configured to charge an internal battery when connected to the contacts 2504 and automatically turn on the LEDs when disconnected from the contacts 2504. The signaling devices 304 can further be configured to be held in the holding position without the use of magnets.

As shown in FIG. 25D, the signaling device housing 302 can be attached directly to the frame 2510 of an autonomous vehicle 105. For example, in certain implementations, the signaling device housing 302 is mounted on a trailer hitch of the autonomous vehicle 105. In certain embodiments, the travel solenoid may be activated in response to the corresponding signaling device 304 hitting the roadway 310. In some embodiments, one or more blocks may be formed on the cover 2508 with an O-ring grove around the outside to aid in holding the signaling devices 304 in place when not in use. In certain implementations, the blocks may be formed of a plastic material, however, other materials may also be used in accordance with aspects of this disclosure.

With continuing reference to FIGS. 25A-25D, the signaling devices 304 may have the LEDs positioned along the perimeter of the signaling devices 304. Thus, the LEDs of the signaling devices 304 may be visible regardless of whether the signaling device 304 comes to rest on its top surface or bottom surface. The signaling devices 304 may also include an optically transparent (e.g., acrylic) rod or other protrusion configured to prevent the signaling devices 304 from coming to rest on the edge or perimeter. In other embodiments, the outer perimeter of the signaling device 304 is curved to prevent the signaling devices 304 from coming to rest landing on the edge or perimeter. This is advantageous since if one of the signaling devices 304 falls on its edge, the LEDs of the signaling device 304 may not be visible from all angles (e.g., when viewed directly from the top or bottom).

Figure 26A:
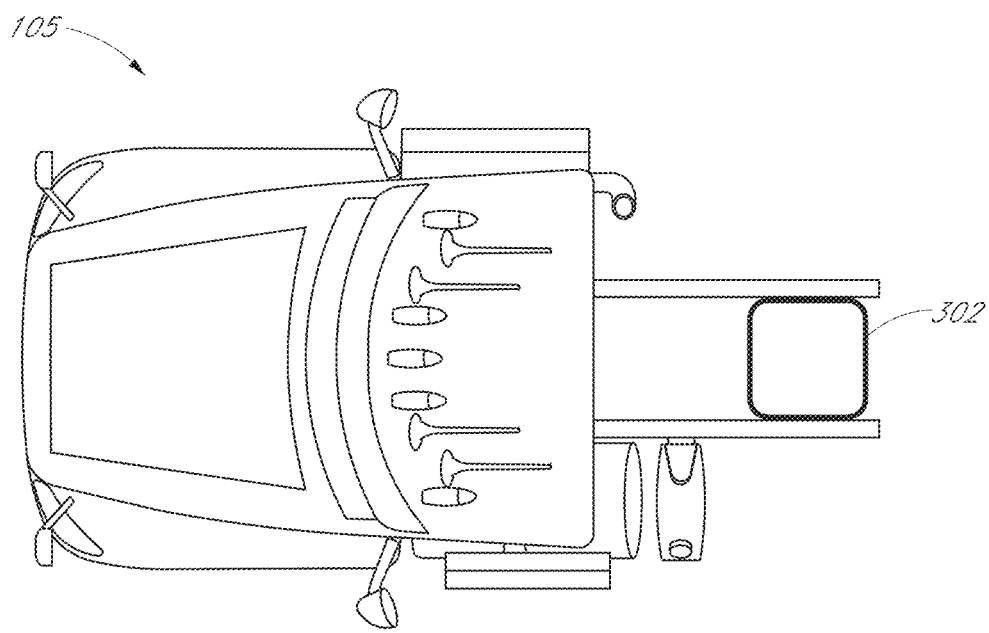
FIGS. 26A-26C illustrate another example location of the signaling device housing with respect to the autonomous vehicle in accordance with aspects of this disclosure.
Figure 26B:
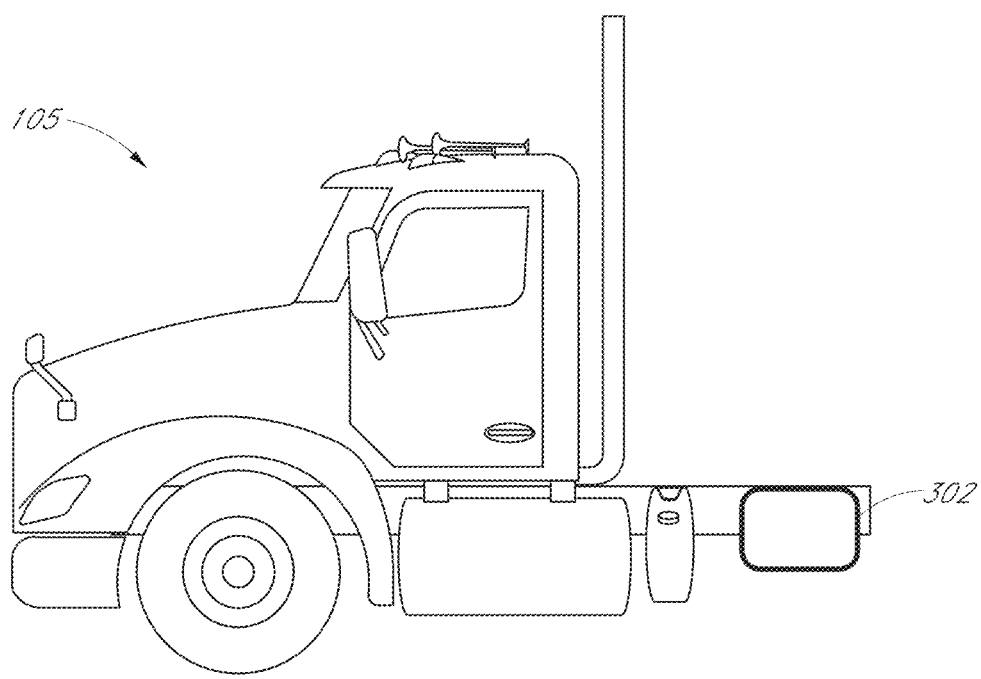
Figure 26C:
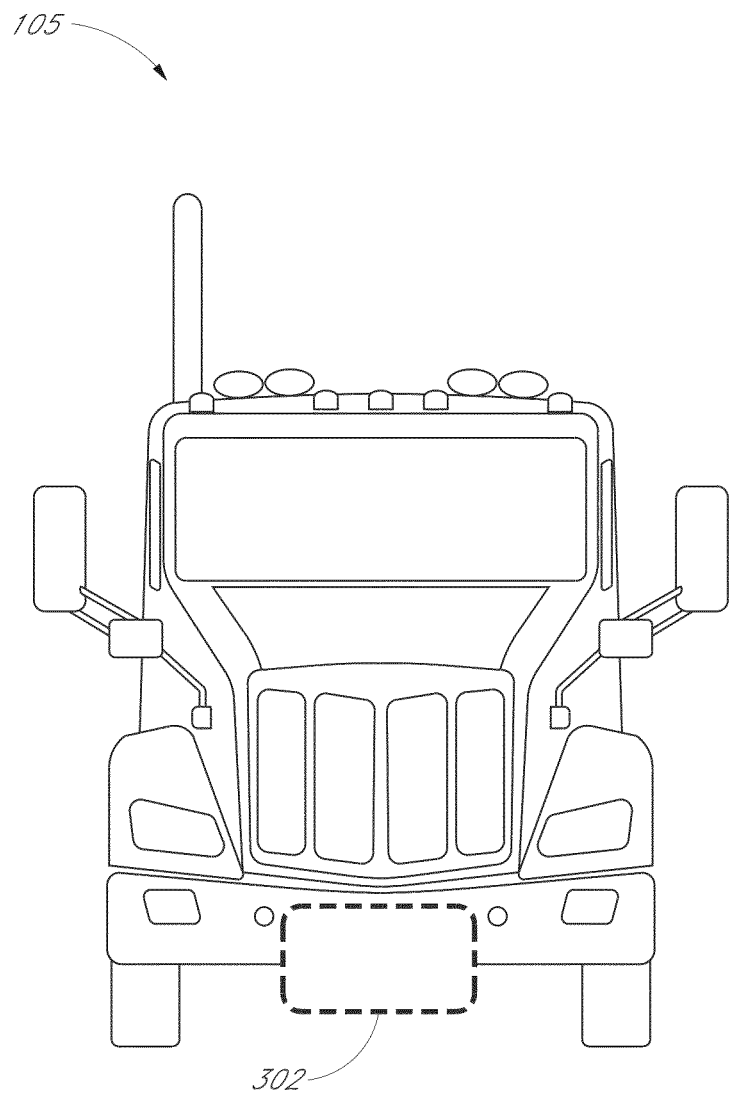

FIGS. 26A-26C illustrate another example location of the signaling device housing 302 with respect to the autonomous vehicle 105 in accordance with aspects of this disclosure. As shown in FIGS. 26A-26C, in certain embodiments, the signaling device housing 302 can be attached to the frame 2602 of the autonomous vehicle 105 behind the cab of the autonomous vehicle 105.

The example location for the signaling device housing 302 shown in FIGS. 26A-26C may be employed for embodiments in which one or more signaling device transportation vehicle(s) 306 are used to deploy the signaling devices 304. In some implementations, the signaling device transportation vehicles 306 may be embodied as remotely controlled road vehicles 2702, for example, as illustrated in FIGS. 27A-27D.

FIGS. 27A-27D illustrate an embodiment of a signaling device transportation vehicle 2702 and a signaling device housing 302 configured to house the signaling device transportation vehicle 2702. As shown in FIGS. 27A-27D, the signaling device transportation vehicle 2702 can be configured to transport a plurality of signaling devices 304. However, in other embodiments, the signaling device housing 302 can be configured to house a plurality of signaling device transportation vehicles 2702, each of which can be configured to transport one or more signaling devices 304.

In certain implementations, after the autonomous vehicle 105 has stopped or slowed on the roadway 310, the signaling device housing 302 can lower a ramp 2704 on which the signaling device transportation vehicle 2702 can travel to reach the roadway 310. After reaching one of the locations defined by the predefined criteria for the placement of the signaling devices 304, the signaling device transportation vehicle 2702 can place one of the signaling device 304 on the roadway 310. The signaling device transportation vehicle 2702 can then drive to the remaining locations defined by the predefined criteria for the placement of the signaling devices 304 to place the signaling devices 304 at each of the locations. The signaling device transportation vehicle 2702 can remain at the location of the last placed signaling device 304 or return to the autonomous vehicle 105.

In some embodiments, the signaling device transportation vehicle 2702 can include a GPS sensor (not illustrated) to aid in placing the signaling devices 304 and/or may have a wireless transceiver configured to communicate with the autonomous vehicle 105 and use signals received from the autonomous vehicle 105 in placing the signaling devices 304.

In certain embodiments, the signaling device transportation vehicle 2702 may include a stability system (e.g., Traxxas Stability Management® (TSM)) to improve control on slippery surfaces such as loose dirt, smooth concrete, and even ice and snow. In certain embodiments, the stability system can be configured to sense the signaling device transportation vehicle's 2702 direction and make steering corrections to provide straight-ahead full-throttle acceleration without fishtailing or spinouts. In certain embodiments, the stability system can also improve braking by keeping the signaling device transportation vehicle 2702 arrow straight until reaching a complete stop.

Figure 27A:
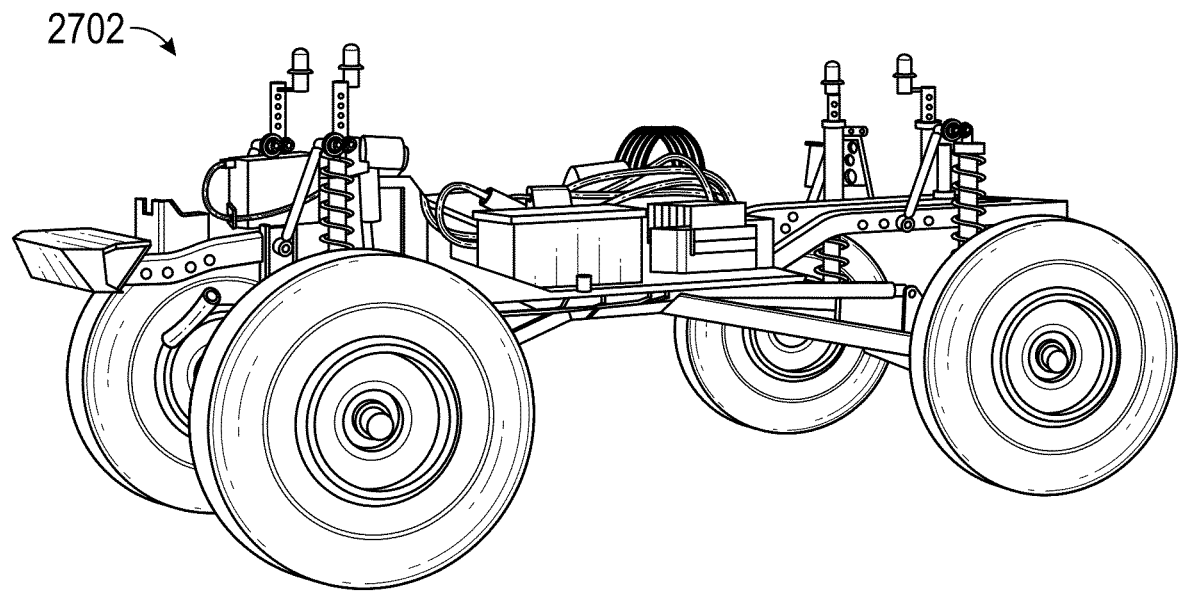
FIGS. 27A-27D illustrate an embodiment of a signaling device transportation vehicle and a signaling device housing configured to house the signaling device transportation vehicle.
Figure 27B:
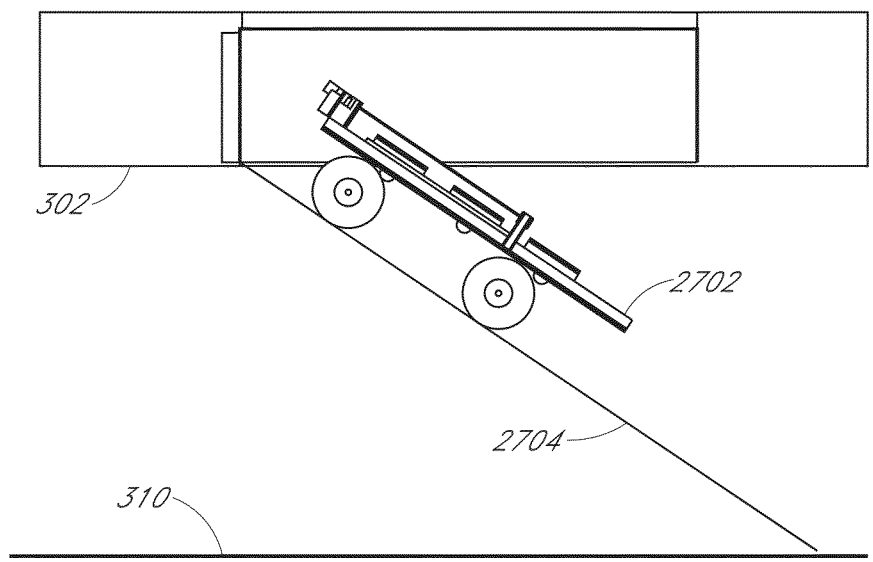
Figure 27C:
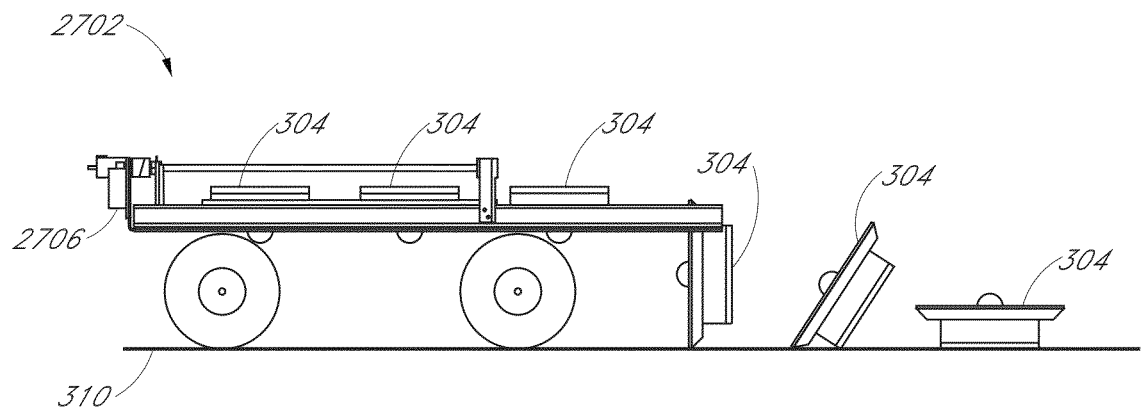

Depending on the implementation, different signaling devices 304 can be placed using the signaling device transportation vehicle 2702. For example, as shown in FIG. 27C, the signaling device may include an LED on one side of the device 304 and the signaling device 304 can be dropped from the signaling device transportation vehicle 2702 such that the LED is visible when the signaling device 304 is placed on the roadway 310. In certain embodiments, the signaling device transportation vehicle 2702 can include an actuator 2706 configured to push the signaling devices 304 off of the signaling device transportation vehicle 2702. In certain embodiments, the signaling devices 304 may be flipped in orientation as they fall to the roadway 310 in certain implementations.

Figure 27D:
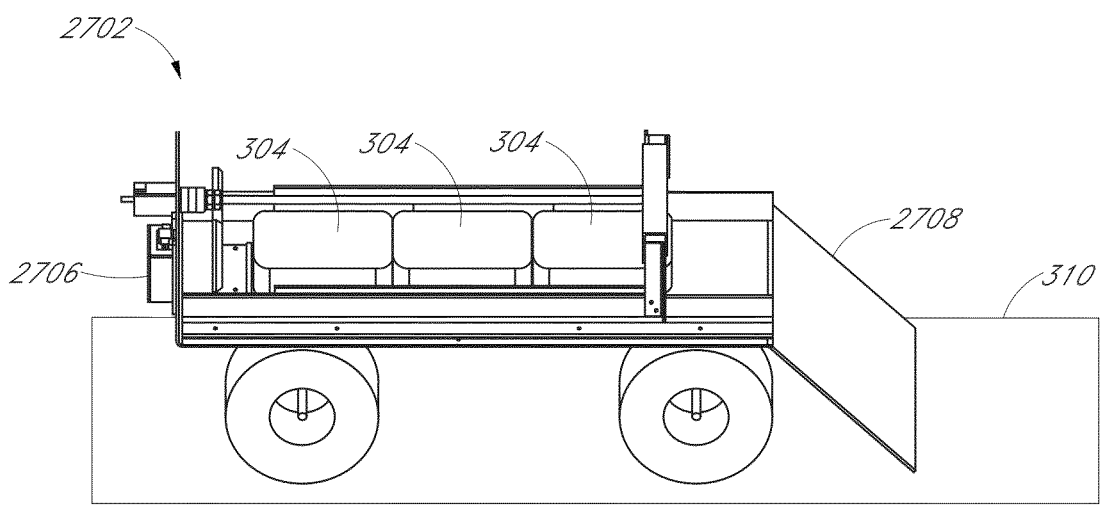

In another implementation as shown in FIG. 27D, the signaling device 304 may be substantially similar to the embodiments described in connection with FIGS. 25A-25H. In some implementations such as the implementation of FIG. 27D, the signaling device transportation vehicle 2702 can include a ramp 2708 configured to allow the signaling devices 304 to be placed on the roadway 310 without changing the orientation of the signaling devices 304.

The signaling device transportation vehicle 2702 may include contacts (not illustrated) configured to charge the signaling device 304 when positioned on the signaling device transportation vehicle 2702. The contacts may protrude from the surface of the signaling device transportation vehicle 2702 in order to electrically connect with the signaling devices 304. When the actuator 2706 pushes the signaling devices 304 off of the signaling device transportation vehicle 2702, the signaling devices 304 disconnect from the contacts and automatically turn on the LEDs, similar to the signaling devices 304 of FIGS. 24A-24H described above.

Additional Aspects

Aspect 1. An emergency signaling system for an autonomous vehicle, comprising: one or more signaling devices configured to visually notify other vehicles when placed on or near a roadway; one or more signaling device transportation vehicles configured to transport the one or more signaling devices; a housing configured to house the one or more signaling device transportation vehicles; a processor; and a computer-readable memory in communication with the processor and having stored thereon computer-executable instructions to cause the processor to: determine that the autonomous vehicle has stopped, and provide instructions to the one or more signaling device transportation vehicles to place the one or more signaling devices on or near the roadway.

Aspect 2. The system of Aspect 1, wherein the memory further has stored thereon computer-executable instructions to cause the processor to: determine one or more locations to place the one or more signaling devices, wherein the instructions provided to the one or more signaling device transportation vehicles comprise the determined locations.

Aspect 3. The system of any one of the previous Aspects, further comprising: a first Global Positioning System (GPS) transceiver configured to determine a current location of the autonomous vehicle, wherein the determining of the plurality of locations is further based on the current location of the autonomous vehicle.

Aspect 4. The system of Aspect 3, wherein the memory further has stored thereon a map of the roadway and computer-executable instructions to cause the processor to: select the plurality of locations within the map based at least in part on the current location of the autonomous vehicle and regulations for the placement of the one or more signaling devices.

Aspect 5. The system of Aspect 4, wherein the plurality of locations further comprise GPS locations for placement of each of the one or more signaling devices.

Aspect 6. The system of Aspect 5, wherein the one or more signaling device transportation vehicles comprises a second GPS transceiver, the one or more signaling device transportation vehicles configured to place the one or more signaling devices based on information received from the second GPS transceiver.

Aspect 7. The system of any one of the previous Aspects, wherein: the one or more signaling device transportation vehicles comprise a plurality of signaling device transportation vehicles, the one or more signaling devices comprise a plurality of signaling devices, and each of the signaling devices is mounted on an outer surface of one of the plurality of signaling device transportation vehicles.

Aspect 8. The system of Aspect 7, wherein each of the one or more signaling devices is mounted in an unobstructed location on the corresponding signaling device transportation vehicle and above other components of the corresponding signaling device transportation vehicle.

Aspect 9. The system of Aspect 1, wherein: the one or more signaling devices are detachable from the one or more signaling device transportation vehicles, and the memory further has stored thereon computer-executable instructions to cause the processor to place the one or more signaling devices directly on the ground.

Aspect 10. The system of any one of the previous Aspects, wherein the housing comprises a dock located on the exterior of the autonomous vehicle.

Aspect 11. The system of Aspect 10, wherein each of the one or more signaling device transportation vehicles comprises a battery and is configured to be electrically connected to the dock to charge the battery.

Aspect 12. The system of any one of the previous Aspects, wherein the memory further has stored thereon a map of the roadway and computer-executable instructions to cause the processor to: receive a signal indicating that the autonomous vehicle has stopped, wherein the determination that the autonomous vehicle has stopped is based at least in part on the received signal.

Aspect 13. A non-transitory computer readable storage medium having stored thereon instructions that, when executed, cause at least one computing device to: determining that an autonomous vehicle has stopped, the autonomous vehicle comprising an emergency signaling system including: a plurality of signaling devices configured to visually notify other vehicles when placed on or near a roadway; at least one signaling device transportation vehicle configured to transport at least one of the plurality of signaling devices; a dock configured to house the at least one signaling device transportation vehicle and the plurality of signaling devices; and provide instructions to the at least one signaling device transportation vehicle to place at least one of the plurality of signaling devices on or near the roadway.

Aspect 14. The non-transitory computer readable storage medium of Aspect 13, further having stored thereon instructions that, when executed, cause at least one computing device to: determine a plurality of locations to place the plurality of signaling devices based on Department of Transportation (DOT) regulations, wherein the instructions provided to the at least one signaling device transportation vehicle comprise the determined locations.

Aspect 15. The non-transitory computer readable storage medium of any one of Aspects 13-14, wherein the plurality of locations to place the plurality of signaling devices comprise: a first location on the traffic side of and approximately 10 feet from the autonomous vehicle in a direction of approaching traffic, a second location at approximately 100 feet from the autonomous vehicle in a center of the traffic lane or a shoulder occupied by the autonomous vehicle and in the direction of approaching traffic, and a third location approximately 100 feet from the autonomous vehicle in the center of the traffic lane or the shoulder occupied by the autonomous vehicle and in a direction away from approaching traffic.

Aspect 16. The non-transitory computer readable storage medium of Aspect 15, wherein the instructions provided to the at least one signaling device transportation vehicle further comprise instructions to place the plurality of signaling devices at the plurality of locations within 10 minutes of the autonomous vehicle stopping.

Aspect 17. The non-transitory computer readable storage medium of any one of Aspects 14-16, further having stored thereon instructions that, when executed, cause at least one computing device to: receive a Global Positioning System (GPS) signal indicated of a location of the autonomous vehicle from a GPS transceiver, and wherein the determining of the plurality of locations to place the plurality of signaling devices is further based on the GPS signal.

Aspect 18. The non-transitory computer readable storage medium of any one of Aspects 13-17, further having stored thereon instructions that, when executed, cause at least one computing device to: determine that communication with an autonomous driving control system of the autonomous vehicle has been lost, wherein the providing of the instructions to the at least one signaling device transportation vehicle is further based on the determination that communication with the autonomous driving control system has been lost.

Aspect 19. A method for autonomously placing a plurality of signaling device on a roadway, comprising: determining that an autonomous vehicle has stopped, the autonomous vehicle comprising an emergency signaling system including: a plurality of signaling devices configured to visually notify other vehicles when placed on or near the roadway; at least one signaling device transportation vehicle configured to transport the plurality of signaling devices; a dock configured to house the at least one signaling device transportation vehicle and the plurality of signaling devices; and providing instructions to the at least one signaling device transportation vehicle to place the plurality of signaling devices on or near the roadway.

Aspect 20. The method of Aspect 19, wherein the at least one signaling device transportation vehicle comprises a Global Positioning System (GPS) transceiver, the method further comprising: the GPS transceiver generating the signal indicating the autonomous vehicle has stopped.

Aspect 21. The method of any one of Aspects 19-20, further comprising: receiving a signal from a sensor indicative of a current location of the at least one signaling device transportation vehicle; and wirelessly providing the current location to the at least one signaling device transportation vehicle.

Aspect 22. The method of Aspect 21, wherein the sensor comprises at least one of the following: camera, radar, and lidar.

Aspect 23. An emergency signaling system for an autonomous vehicle, comprising: one or more signaling devices configured to visually notify other vehicles when placed on or near a roadway; a signaling device housing configured to house the one or more signaling devices; a processor; and a computer-readable memory in communication with the processor and having stored thereon computer-executable instructions to cause the processor to: determine that the autonomous vehicle has experienced a malfunction, and provide instructions to the signaling device housing to place the one or more signaling devices on or near the roadway.

Aspect 24. The system of Aspect 23, wherein the signaling device housing comprises a door configured to be opened to allow the one or more signaling devices to be placed onto the roadway.

Aspect 25. The system of any one of Aspects 23-24, wherein the signaling device housing comprises a shutter configured to drop the one or more signaling devices onto the roadway.

Aspect 26. The system of any one of Aspects 23-25, wherein the memory further has stored thereon computer-executable instructions to cause the processor to: determine a first location at which the autonomous vehicle will stop, determine one or more second locations at which to place the one or more signaling devices based on the first location.

Aspect 27. The system of Aspect 26, wherein the memory further has stored thereon computer-executable instructions to cause the processor to: determine a timing at which to drop the one or more signaling devices to land at the one or more second locations based on one or more of the following: a current speed of the autonomous vehicle, a rate of deceleration of the autonomous vehicle, a distance between a current location of the autonomous vehicle and the first location, and a distance between the signaling device housing and the roadway.

Aspect 28. The system of any one of Aspects 23-27, wherein the memory further has stored thereon computer-executable instructions to cause the processor to: determine one or more locations to place the one or more signaling devices, wherein the instructions provided to the signaling device housing comprise the determined one or more locations.

Aspect 29. The system of Aspect 28, further comprising: a Global Positioning System (GPS) transceiver configured to determine a current location of the autonomous vehicle, wherein the determining of the plurality of locations is further based on the current location of the autonomous vehicle.

Aspect 30. The system of Aspect 29, wherein the memory further has stored thereon a map of the roadway and computer-executable instructions to cause the processor to: select the one or more locations within the map based at least in part on the current location of the autonomous vehicle and regulations for the placement of the one or more signaling devices.

Aspect 31. The system of any one of Aspects 23-30, wherein each of the one or more signaling devices comprises a weighted bottom configured to orient the one or more signaling devices in a correct orientation after being dropped from the autonomous vehicle.

Aspect 32. The system of any one of Aspects 23-31, wherein each of the one or more signaling devices comprises a spring loaded tube and a delay mechanism configured to release the spring after the one or more signaling devices has been dropped onto the roadway.

Aspect 33. The system of any one of Aspect 23-32, wherein: the one or more signaling devices comprise three signaling devices, and the instructions to the signaling device housing to place the one or more signaling devices on or near the roadway include instructions for respectively placing the three signaling device within 10, 100, and 200 feet of a rear of a determined location at which the autonomous vehicle will be stopped.

Aspect 34. The system of any one of Aspects 23-33, wherein each of the one or more signaling devices is configured to have a first size prior to being placed on or near the roadway and have a second size after being placed on or near the roadway, the second size being larger than the first size to increase visibility of the one or more signaling devices after being placed.

Aspect 35. A non-transitory computer readable storage medium having stored thereon instructions that, when executed, cause at least one computing device to: determining that an autonomous vehicle has experienced a malfunction, the autonomous vehicle comprising an emergency signaling system including: one or more signaling devices configured to visually notify other vehicles when placed on or near a roadway, and a signaling device housing configured to house the one or more signaling devices; and provide instructions to the signaling device housing to place the one or more signaling devices on or near the roadway.

Aspect 36. The non-transitory computer readable storage medium of Aspect 35, further having stored thereon instructions that, when executed, cause at least one computing device to: determine a plurality of locations to place the one or more signaling devices based on Department of Transportation (DOT) regulations, wherein the instructions provided to the signaling device housing comprises the plurality of locations.

Aspect 37. The non-transitory computer readable storage medium of any one of Aspects 35-36, wherein the plurality of locations to place the one or more signaling devices comprise: a first location on the traffic side of and approximately 10 feet from the autonomous vehicle in a direction of approaching traffic, a second location at approximately 100 feet from the autonomous vehicle in a center of the traffic lane or a shoulder occupied by the autonomous vehicle and in the direction of approaching traffic, and a third location approximately 200 feet from the autonomous vehicle in a center of the traffic lane or a shoulder occupied by the autonomous vehicle and in the direction of approaching traffic.

Aspect 38. The non-transitory computer readable storage medium of any one of Aspects 35-37, further having stored thereon instructions that, when executed, cause at least one computing device to: select the plurality of locations within a map of the roadway based at least in part on the current location of the autonomous vehicle and regulations for the placement of the one or more signaling devices.

Aspect 39. The non-transitory computer readable storage medium of Aspect 38, further having stored thereon instructions that, when executed, cause at least one computing device to: determine a location at which the autonomous vehicle will stop, wherein the selecting of the plurality of locations within the map of the roadway is further based on the determined location at which the autonomous vehicle will stop.

Aspect 40. The non-transitory computer readable storage medium of any one of Aspects 35-39, wherein: the instructions provided to the signaling device housing further comprise instructions to place the one or more signaling devices at the plurality of locations within 10 minutes of the autonomous vehicle stopping.

Aspect 41. The non-transitory computer readable storage medium of any one of Aspects 35-40, further having stored thereon instructions that, when executed, cause at least one computing device to: receive a Global Positioning System (GPS) signal indicated of a location of the autonomous vehicle from a GPS transceiver, and determine a plurality locations to place the one or more signaling devices onto the roadway based on the GPS signal.

Aspect 42. The non-transitory computer readable storage medium of Aspect 41, further having stored thereon instructions that, when executed, cause at least one computing device to: determine a timing at which to drop the one or more signaling devices to land at the plurality of locations.

Aspect 43. A system for an autonomous vehicle, comprising: one or more signaling devices configured to visually notify other vehicles when placed on or near a roadway; an object placing device configured to place the one or more signaling devices; a processor; and a computer-readable memory in communication with the processor and having stored thereon computer-executable instructions to cause the processor to: determine that the autonomous vehicle has experienced a malfunction, and provide instructions to the object placing device to place the one or more signaling devices on or near the roadway.

Aspect 44. The system of Aspect 43 wherein the object placing device comprises one or more signaling device transportation vehicles configured to transport the one or more signaling devices, wherein the object placing device further comprises a housing configured to house the one or more signaling device transportation vehicles.

Aspect 45. The system of Aspect 44, wherein the memory further has stored thereon computer-executable instructions to cause the processor to: determine one or more locations to place the one or more signaling devices, wherein the instructions provided to the object placing device comprise the determined one or more locations.

Aspect 46. The system of Aspect 45, further comprising: a first Global Positioning System (GPS) transceiver configured to determine a current location of the autonomous vehicle, wherein the determining of the one or more locations is further based on the current location of the autonomous vehicle.

Aspect 47. The system of Aspect 46, wherein the memory further has stored thereon a map of the roadway and computer-executable instructions to cause the processor to: select the one or more locations within the map based at least in part on the current location of the autonomous vehicle and regulations for the placement of the one or more signaling devices.

Aspect 48. The system of Aspect 47, wherein the one or more signaling device transportation vehicles comprises a second GPS transceiver, the one or more signaling device transportation vehicles configured to place the one or more signaling devices based on information received from the second GPS transceiver.

Aspect 49. The system of Aspect 48, wherein: the one or more signaling device transportation vehicles comprise a plurality of signaling device transportation vehicles, the one or more signaling devices comprise a plurality of signaling devices, and each of the signaling devices is mounted on an outer surface of one of the plurality of signaling device transportation vehicles.

Aspect 50. The system of any one of Aspects 44-49, wherein the housing comprises a dock located on the exterior of the autonomous vehicle, wherein each of the one or more signaling device transportation vehicles comprises a battery and is configured to be electrically connected to the dock to charge the battery.

Aspect 51. The system of any one of Aspects 43-50, wherein the memory further has stored thereon computer-executable instructions to cause the processor to: determine a first location at which the autonomous vehicle will stop, and
determine one or more second locations at which to place the one or more signaling devices based on the first location.

Aspect 52. The system of any one of Aspect 51, wherein the memory further has stored thereon computer-executable instructions to cause the processor to: determine a timing at which to drop the one or more signaling devices to land at the one or more second locations based on one or more of the following: a current speed of the autonomous vehicle, a rate of deceleration of the autonomous vehicle, a distance between a current location of the autonomous vehicle and the first location, and a distance between the object placing device and the roadway.

Aspect 53. A non-transitory computer readable storage medium having stored thereon instructions that, when executed, cause at least one computing device to: determine that an autonomous vehicle has experienced a malfunction, the autonomous vehicle comprising an emergency signaling system comprising: one or more signaling devices configured to visually notify other vehicles when placed on or near a roadway, and an object placing device configured to place the one or more signaling devices; and provide instructions to the object placing device to place the one or more signaling devices on or near the roadway.

Aspect 54. The non-transitory computer readable storage medium of Aspect 53, further having stored thereon instructions that, when executed, cause at least one computing device to: determine one or more locations to place the one or more signaling devices, wherein the instructions provided to the object placing device comprise the determined one or more locations, wherein the one or more locations to place the one or more signaling devices comprise: a first location on the traffic side of and approximately 10 feet from the autonomous vehicle in a direction of approaching traffic, a second location at approximately 100 feet from the autonomous vehicle in a center of the traffic lane or a shoulder occupied by the autonomous vehicle and in the direction of approaching traffic, and a third location approximately 200 feet from the autonomous vehicle in a center of the traffic lane or a shoulder occupied by the autonomous vehicle and in the direction of approaching traffic.

Aspect 55. The non-transitory computer readable storage medium of any one of Aspects 53-54, wherein the object placing device comprises one or more signaling device transportation vehicles configured to transport the one or more signaling devices, wherein each of the one or more signaling devices is mounted in an unobstructed location on the corresponding signaling device transportation vehicle and above other components of the corresponding signaling device transportation vehicle.

Aspect 56. The non-transitory computer readable storage medium of any one of Aspects 53-55, wherein the object placing device is a signaling device housing further configured to house the one or more signaling devices.

Aspect 57. The non-transitory computer readable storage medium of Aspect 56, wherein the signaling device housing comprises a door configured to be opened to allow the one or more signaling devices to be placed onto the roadway, or a shutter configured to drop the one or more signaling devices onto the roadway.

Aspect 58. A method comprising: determining that an autonomous vehicle has experienced a malfunction, the autonomous vehicle comprising an emergency signaling system comprising: one or more signaling devices configured to visually notify other vehicles when placed on or near the roadway; and an object placing device configured to place the one or more signaling devices; and providing instructions to the object placing device to place the one or more signaling devices on or near the roadway.

Aspect 59. The method of Aspect 58 wherein the object placing device comprises one or more signaling device transportation vehicles configured to transport the one or more signaling devices, wherein the method further comprises: receiving a signal from a sensor indicative of a current location of the one or more signaling device transportation vehicles, wherein the sensor comprises at least one of the following: camera, radar, and lidar; and wirelessly providing the current location to the one or more signaling device transportation vehicles.

Aspect 60. The method of any one of Aspects 58-59, wherein each of the one or more signaling devices comprises a weighted bottom configured to orient the one or more signaling devices in a correct orientation after being dropped from the autonomous vehicle.

Aspect 61. The method of any one of Aspect 58-60, wherein each of the one or more signaling devices comprises a spring loaded tube and a delay mechanism configured to release the spring after the one or more signaling devices has been dropped onto the roadway.

Aspect 62. The method of any one of Aspect 58-61, wherein each of the one or more signaling devices is configured to have a first size prior to being placed on or near the roadway and have a second size after being placed on or near the roadway, the second size being larger than the first size to increase visibility of the one or more signaling devices after being placed.

Aspect 63. A control system for an object placing device of an autonomous vehicle, the system comprising: a processor; and a computer-readable memory in communication with the processor and having stored thereon computer-executable instructions to cause the processor to: receive a signal comprising instructions to activate the object placing device; and provide instructions to the object placing device to place a plurality of signaling devices in accordance with predetermined criteria.

Aspect 64. The system of Aspect 63, wherein the predetermined criteria comprise at least one of: a first set of criteria for the placement of the plurality of signaling devices when the autonomous vehicle is stopped on a two-way or undivided highway, a second set of criteria for the placement of the plurality of signaling devices when the autonomous vehicle is stopped on a hill, on a curve, or withing a predetermined distance of a visual obstruction, and a third set of criteria for the placement of the plurality of signaling devices when the autonomous vehicle is stopped on a divided or one-way roadway.

Aspect 65. The system of Aspect 64, wherein the predetermined criteria comprises at least the first set of criteria, and wherein the first set of criteria comprises: a first location for a first one of the plurality of signaling devices to be placed on a traffic side of a stopped location at which the autonomous vehicle is stopped and about 10 feet from the stopped location in a direction of approaching traffic, a second location for a second one of the plurality of signaling devices to be placed at about 100 feet from the stopped location in a center of a traffic lane or shoulder of the stopped location and in the direction of approaching traffic, and a third location for a third one of the plurality of signaling devices to be placed at about 100 feet from the stopped location in the center of the traffic lane or the shoulder of the stopped location and in a direction away from approaching traffic.

Aspect 66. The system of Aspect 65, wherein the first set of criteria further comprise criteria for placement of all of the first, second, and third signaling devices at the first, second, and third locations, respectively, within 10 minutes.

Aspect 67. The system of any one of Aspects 65-66, wherein: each of the plurality of signaling devices comprises a reflective side having a reflective material, and the first set of criteria further comprise criteria for placing the first, second, and third signaling devices such that the reflective side of the first, second, and third signaling devices faces the direction of approaching traffic.

Aspect 68. The system of any one of Aspects 65-67, wherein the object placing device comprises one or more signaling device ground transportation vehicles configured to transport the first, second, and third signaling devices to the first, second, and third locations, respectively.

Aspect 69. The system of any one of Aspects 65-68, wherein the object placing device comprises one or more battery powered air vehicles configured to transport the first, second, and third signaling devices to the first, second, and third locations, respectively.

Aspect 70. The system of any one of Aspects 64-69, wherein the predetermined criteria comprises at least the second set of criteria, and wherein the second set of criteria comprises: a first location for a first one of the plurality of signaling devices to be placed on a traffic side of a stopped location at which the autonomous vehicle is stopped and about 10 feet from the stopped location in a direction of approaching traffic, and a second location for a second one of the plurality of signaling devices to be placed at about 100 feet to about 500 feet from the stopped location in the direction of approaching traffic.

Aspect 71. The system of Aspect 70, wherein the memory further has stored thereon computer-executable instructions to cause the processor to: predict the stopped location at which the autonomous vehicle will stop prior to reaching the stopped location, and provide the instructions to the object placing device to place the first one of the plurality of signaling devices and the second one of the plurality of signaling devices before the autonomous vehicle stops at the stopped location.

Aspect 72. The system of Aspect 71, wherein the memory further has stored thereon computer-executable instructions to cause the processor to: determine a timing at which to drop the first one of the plurality of signaling devices and the second one of the plurality of signaling devices to land at the first and second locations, respectively.

Aspect 73. The system of any one of Aspects 64-72, wherein the predetermined criteria comprises at least the third set of criteria, and wherein the third set of criteria comprises: a first location for a first one of the plurality of signaling devices to be placed on a traffic side of a stopped location at which the autonomous vehicle is stopped and about 10 feet from the stopped location in a direction of approaching traffic, a second location for a second one of the plurality of signaling devices to be placed at about 100 feet from the stopped location in a center of the traffic lane or shoulder of the stopped location and in the direction of approaching traffic, and a third location for a third one of the plurality of signaling devices to be placed at about 200 feet from the stopped location in a center of the traffic lane or shoulder of the stopped location and in the direction of approaching traffic.

Aspect 74. The system of any one of Aspects 64-73, wherein the predetermined criteria further comprise a fourth set of criteria for the placement of the plurality of signaling devices when the autonomous vehicle is: i) stopped in a business district or residential area, ii) at a time when lighted lamps are required, and iii) when street or highway lighting is insufficient to make the autonomous vehicle clearly discernable at a distance of 500 feet from the autonomous vehicle.

Aspect 75. A non-transitory computer readable storage medium having stored thereon instructions that, when executed, cause at least one computing device to: receive a signal comprising instructions to activate the object placing device; and provide instructions to the object placing device to place a plurality of signaling devices in accordance with predetermined criteria.

Aspect 76. The non-transitory computer readable storage medium of Aspect 75, further having stored thereon instructions that, when executed, cause at least one computing device to: determine a plurality of locations to place the plurality of signaling devices in accordance with the predetermined criteria, wherein the instructions provided to the object placing device comprise the determined locations.

Aspect 77. The non-transitory computer readable storage medium of any one of Aspects 75-76, wherein the plurality of signaling devices comprise three bidirectional emergency reflective triangles that conform to the requirements of Federal Motor Vehicle Safety Standard.

Aspect 78. The non-transitory computer readable storage medium of any one of Aspects 75-77, wherein the plurality of signaling devices further comprise one or more additional signaling devices configured to not decrease the effectiveness of the three bidirectional emergency reflective triangles.

Aspect 79. A method comprising: receiving a signal comprising instructions to activate the object placing device; providing instructions to the object placing device to place a plurality of signaling devices in accordance with predetermined criteria.

Aspect 80. The method of Aspect 79, further comprising: determining a current location of the autonomous vehicle based on a signal received from a Global Positioning System (GPS) transceiver; determining a type of roadway associated with the current location of the autonomous vehicle; and selecting predetermined criteria for the placement of the plurality of signaling devices from a plurality of different predetermined criteria based on the determined type of roadway.

Aspect 81. The method of any one of Aspects 79-80, wherein the plurality of signaling devices comprise at least six fuses or at least three liquid-burning flares.

Aspect 82. The method of any one of Aspects 79-81, wherein the predetermined criteria define at least one of a size, a reflectivity, a color, a stability, a luminance, a configuration, and a storage of the plurality of signaling devices.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A system for an autonomous vehicle, comprising:
   one or more signaling devices configured to visually notify other vehicles when placed on or near a roadway;
   an object placing device configured to place the one or more signaling devices;
   a processor; and
   a computer-readable memory in communication with the processor and having stored thereon computer-executable instructions to cause the processor to:
      determine that the autonomous vehicle has experienced a malfunction, and
      provide instructions to the object placing device to place the one or more signaling devices on or near the roadway,
      wherein each of the one or more signaling devices comprises a spring loaded tube and a delay mechanism configured to release the spring after the one or more signaling devices has been dropped onto the roadway.

2. The system of claim 1 wherein the object placing device comprises one or more signaling device transportation vehicles configured to transport the one or more signaling devices, wherein the object placing device further comprises a housing configured to house the one or more signaling device transportation vehicles.

3. The system of claim 2, wherein the memory further has stored thereon computer-executable instructions to cause the processor to:
   determine one or more locations to place the one or more signaling devices, wherein the instructions provided to the object placing device comprise the determined one or more locations.

4. The system of claim 3, further comprising:
   a first Global Positioning System (GPS) transceiver configured to determine a current location of the autonomous vehicle,
   wherein the determining of the one or more locations is further based on the current location of the autonomous vehicle.

5. The system of claim 4, wherein the memory further has stored thereon a map of the roadway and computer-executable instructions to cause the processor to:
   select the one or more locations within the map based at least in part on the current location of the autonomous vehicle and regulations for the placement of the one or more signaling devices.

6. The system of claim 4, wherein the one or more signaling device transportation vehicles comprises a second GPS transceiver, the one or more signaling device transportation vehicles configured to place the one or more signaling devices based on information received from the second GPS transceiver.

7. The system of claim 2, wherein:
   the one or more signaling device transportation vehicles comprise a plurality of signaling device transportation vehicles, and
   the one or more signaling devices comprise a plurality of signaling devices.

8. The system of claim 2, wherein the housing comprises a dock located on the exterior of the autonomous vehicle, wherein each of the one or more signaling device transportation vehicles comprises a battery and is configured to be electrically connected to the dock to charge the battery.

9. The system of claim 1, wherein the memory further has stored thereon computer-executable instructions to cause the processor to:
- determine a first location at which the autonomous vehicle will stop, and
- determine one or more second locations at which to place the one or more signaling devices based on the first location.

10. The system of claim 9, wherein the memory further has stored thereon computer-executable instructions to cause the processor to:
- determine a timing at which to drop the one or more signaling devices to land at the one or more second locations based on one or more of the following: a current speed of the autonomous vehicle, a rate of deceleration of the autonomous vehicle, a distance between a current location of the autonomous vehicle and the first location, and a distance between the object placing device and the roadway.

11. A non-transitory computer readable storage medium having stored thereon instructions that, when executed, cause at least one computing device to:
- determine that an autonomous vehicle has experienced a malfunction, the autonomous vehicle comprising an emergency signaling system comprising:
  - one or more signaling devices configured to visually notify other vehicles when placed on or near a roadway, and
  - an object placing device configured to place the one or more signaling devices; and
- provide instructions to the object placing device to place the one or more signaling devices on or near the roadway,
- wherein each of the one or more signaling devices comprises a spring loaded tube and a delay mechanism configured to release the spring after the one or more signaling devices has been dropped onto the roadway.

12. The non-transitory computer readable storage medium of claim 11, further having stored thereon instructions that, when executed, cause at least one computing device to:
- determine one or more locations to place the one or more signaling devices,
- wherein the instructions provided to the object placing device comprise the determined one or more locations, wherein the one or more locations to place the one or more signaling devices comprise:
  - a first location on the traffic side of and approximately 10 feet from the autonomous vehicle in a direction of approaching traffic,
  - a second location at approximately 100 feet from the autonomous vehicle in a center of the traffic lane or a shoulder occupied by the autonomous vehicle and in the direction of approaching traffic, and
  - a third location approximately 200 feet from the autonomous vehicle in a center of the traffic lane or a shoulder occupied by the autonomous vehicle and in the direction of approaching traffic.

13. The non-transitory computer readable storage medium of claim 11, wherein the object placing device comprises one or more signaling device transportation vehicles configured to transport the one or more signaling devices, wherein each of the one or more signaling devices is mounted in an unobstructed location on the corresponding signaling device transportation vehicle and above other components of the corresponding signaling device transportation vehicle.

14. The non-transitory computer readable storage medium of claim 11, wherein the object placing device is a signaling device housing further configured to house the one or more signaling devices.

15. The non-transitory computer readable storage medium of claim 14, wherein the signaling device housing comprises a door configured to be opened to allow the one or more signaling devices to be placed onto the roadway, or a shutter configured to drop the one or more signaling devices onto the roadway.

16. A method comprising:
- determining that an autonomous vehicle has experienced a malfunction, the autonomous vehicle comprising an emergency signaling system comprising:
  - one or more signaling devices configured to visually notify other vehicles when placed on or near the roadway; and
  - an object placing device configured to place the one or more signaling devices; and
- providing instructions to the object placing device to place the one or more signaling devices on or near the roadway,
- wherein each of the one or more signaling devices comprises a spring loaded tube and a delay mechanism configured to release the spring after the one or more signaling devices has been dropped onto the roadway.

17. The method of claim 16 wherein the object placing device comprises one or more signaling device transportation vehicles configured to transport the one or more signaling devices, wherein the method further comprises:
- receiving a signal from a sensor indicative of a current location of the one or more signaling device transportation vehicles, wherein the sensor comprises at least one of the following: camera, radar, and lidar; and
- wirelessly providing the current location to the one or more signaling device transportation vehicles.

18. The method of claim 16, wherein each of the one or more signaling devices comprises a weighted bottom configured to orient the one or more signaling devices in a correct orientation after being dropped from the autonomous vehicle.

19. The method of claim 16, wherein each of the one or more signaling devices is configured to have a first size prior to being placed on or near the roadway and have a second size after being placed on or near the roadway, the second size being larger than the first size to increase visibility of the one or more signaling devices after being placed.

* * * * *